(12) United States Patent
Beausoleil et al.

(10) Patent No.: US 7,426,444 B2
(45) Date of Patent: Sep. 16, 2008

(54) METHODS FOR DETERMINING RELATIVE PHASE DIFFERENCES IN ENTANGLED QUANTUM STATES

(75) Inventors: Raymond G. Beausoleil, Redmond, WA (US); William J. Munro, Bristol (GB); Timothy P. Spiller, Bristol (GB); Pieter Kok, Oxford (GB); Sean D. Barrett, Bristol (GB); Kae Nemoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 343 days.

(21) Appl. No.: 11/407,600

(22) Filed: Apr. 19, 2006

(65) Prior Publication Data
US 2007/0250280 A1    Oct. 25, 2007

(51) Int. Cl.
*G01R 13/00*    (2006.01)
(52) U.S. Cl. .......................... 702/72; 359/107; 359/108
(58) Field of Classification Search .................. 702/72; 359/107, 108
See application file for complete search history.

(56) References Cited

U.S. PATENT DOCUMENTS 7,133,173 B2 *   11/2006   Beausoleil et al. .......... 359/108

* cited by examiner

*Primary Examiner*—John E Barlow, Jr.
*Assistant Examiner*—Stephen J Cherry

(57) ABSTRACT

Various embodiments of the present invention are directed to methods for determining a phase shift acquired by an entangled N-qubit system represented by a NOON state. In one embodiment, a probe electromagnetic field is coupled with each qubit system. The phase shift acquired by the qubit systems is transferred to the probe electromagnetic field by transforming each qubit-system state into a linear superposition of qubit basis states. An intensity measurement is performed on the probe electromagnetic field in order to obtain a corresponding measurement result. A counter associated with a measurement-result interval is incremented, based on the measurement result falling within the measurement-result interval. A frequency distribution is produced by normalizing the counter associated with each measurement-result interval for a number of trials. The phase shift is determined by fitting a probability distribution associated with the probe electromagnetic field to the frequency distribution as a function of the phase shift.

21 Claims, 25 Drawing Sheets

METHODS FOR DETERMINING RELATIVE PHASE DIFFERENCES IN ENTANGLED QUANTUM STATES

TECHNICAL FIELD

The present invention relates to quantum computing, quantum information, and quantum metrology, and, in particular, to methods for determining a phase shift acquired by entangled, quantum systems.

BACKGROUND OF THE INVENTION

Advancements in quantum physics have facilitated understanding and enhancement of existing technologies. For example, understanding the quantum behavior of electrons in semiconductor materials has made it possible to develop and produce smaller and faster semiconducting devices. Recent and promising advancements in quantum physics are now being exploited to produce new technologies. For example, certain quantum systems can be used to encode and transmit information in new ways. In addition, quantum systems can be used in optical lithographic and measuring devices to provide resolution and sensitivity limits that exceed those of non-quantum-based lithographic instruments and measuring devices.

Quantum systems comprising just two discrete states, represented by "$|0\rangle$" and "$|1\rangle$," are often employed in a variety of quantum-system-based applications including quantum information encoding and processing, optical quantum lithography, and metrology. Examples of two-state quantum systems include any two photon states of an electromagnetic field, vertically and horizontally polarized photons, and the two spin states of an electron. A quantum system with two discrete states is called a "qubit system," and the states $|0\rangle$ and $|1\rangle$, called "qubit basis states," can also be represented in set notation as $\{|0\rangle, |1\rangle\}$. A qubit system can exist in the state $|0\rangle$, the state $|1\rangle$, or in any of an infinite number of states that simultaneously comprise both $|0\rangle$ and $|1\rangle$. Any of the states that include both $|0\rangle$ and/or $|1\rangle$ can be represented mathematically as a linear superposition of states:

$$|\psi\rangle = \alpha|0\rangle + \beta|1\rangle$$

The state $|\psi\rangle$ is called a "qubit," and the parameters $\alpha$ and $\beta$ are complex-valued coefficients satisfying the condition:

$$|\alpha|^2 + |\beta|^2 = 1$$

In general, the sum of the square modulus of the coefficients is "1." Performing a measurement on a quantum system collapses the state of the quantum system onto a basis state and produces an associated real-valued quantity. Performing a measurement on a quantum system is mathematically equivalent to projecting the state of the quantum system onto one of the basis states, and, in general, the probability of projecting the state of the quantum system onto a basis state is equal to the square of the coefficient associated with the basis state. For example, when the state $|\psi\rangle$ of the qubit system is measured in the basis $\{|0\rangle,|1\rangle\}$, one has a probability $|\alpha|^2$ of finding the quantum system in the state $|0\rangle$ and a probability $|\beta|^2$ of finding the quantum system in the state $|1\rangle$.

The infinite number of states associated with a qubit system can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where
$0 \leq \theta < \pi$, and
$0 \leq \phi < 2\pi$.

FIGS. 1A-1C illustrate a Bloch sphere representation of a qubit system. In FIG. 1A, lines 101-103 are orthogonal x, y, and z Cartesian coordinate axes, respectively, and a Bloch sphere 106 is centered at the origin. There are an infinite number of points on the Bloch sphere 106, each point representing a unique state of a qubit system. For example, a point 108 on the Bloch sphere 106 represents a unique state of a qubit system that simultaneously comprises, in part, the state $|0\rangle$ and, in part, the state $|1\rangle$. However, once the state of the qubit system is measured in the basis $\{|0\rangle,|0\rangle\}$, the state of the qubit system is projected onto the state $|0\rangle$ 110, in FIG. 1B, or onto the state $|1\rangle$ 112, in FIG. 1C.

The state of a combined qubit system comprising two or more qubit systems is represented by a product of qubits, each qubit associated with one of the qubit systems. For example, consider a combined qubit system comprising a first qubit system and a second qubit system that is represented by the state:

$$|\psi\rangle_{12} = |\psi\rangle_1 |\psi\rangle_2$$

where the state of the first qubit system is:

$$|\psi\rangle_1 = \frac{1}{\sqrt{2}}(|0\rangle_1 + |1\rangle_1)$$

and the state of the second qubit system is:

$$|\psi\rangle_2 = \frac{1}{\sqrt{2}}(|0\rangle_2 + |1\rangle_2)$$

The state $|\psi\rangle_2$ can also be written as a linear superposition of states:

$$|\psi\rangle_{12} = |\psi\rangle_1 |\psi\rangle_2$$
$$= \frac{1}{2}(|0\rangle_1|0\rangle_2 + |0\rangle_1|1\rangle_2 + |1\rangle_1|0\rangle_2 + |1\rangle_1|1\rangle_2)$$

where the terms $|0\rangle_1|0\rangle_2$, $|0\rangle_1|1\rangle_2$, $|1\rangle_1|0\rangle_2$, and $|1\rangle_1|1\rangle_2$ are product states. Each product state in the state $|\psi\rangle_{12}$ has an associated coefficient of 1/2, which indicates that when the state of the first qubit system is measured in the bases $\{|0\rangle_1,|1\rangle_1\}$, and the state of the second qubit system is measured in the basis $\{|0\rangle_2,|1\rangle_2\}$, there is a 1/4 probability of the combined qubit systems being found in any one of the product states. For example, when the states of the first and the second qubit systems are measured in the bases $\{|0\rangle_1,|1\rangle_1\}$ and $\{|0\rangle_2,|1\rangle_2\}$, respectively, there is a 1/4 ($|1/2|^2$) probability of projecting the state of the combined qubit system onto the product state $|1\rangle_1|1\rangle_2$.

The state of certain combined qubit systems cannot be represented by a product of associated qubits. These qubit systems are said to be "entangled." Quantum entanglement is a property of quantum mechanics in which the states of two or more quantum systems are linked to one another, even though the quantum systems can be spatially separated. An example entangled state representation of an entangled two-qubit system is:

$$|\phi\rangle_{12} = \frac{1}{\sqrt{2}}(|0\rangle_1|1\rangle_2 + |1\rangle_1|0\rangle_2)$$

The entangled state $|\phi\rangle_{12}$ cannot be factored into a product of the qubits $\alpha_1|0\rangle_1+\beta_1|1\rangle_1$ and $\alpha_2|0\rangle_2+\beta_2|1\rangle_2$, for any choice of the parameters $\alpha_1$, $\beta_1$, $\alpha_2$, and $\beta_2$.

The state of an un-entangled, two-qubit system can be distinguished from the state of an entangled, two-qubit system as follows. Consider an un-entangled two-qubit system in the un-entangled state $|\psi\rangle_{12}$. Suppose a measurement performed on the first qubit system in the basis $\{|0\rangle_1,|1\rangle_1\}$ projects the state of the first qubit system onto the state $|0\rangle$. According to the state $|\psi\rangle_{12}$, the state of the un-entangled, two-qubit system just after the measurement is the linear superposition of states $(|0\rangle_1|0\rangle_2+|0\rangle_1|1\rangle_2)/\sqrt{2}$. When a second measurement is performed on the second qubit system in the basis $\{|0\rangle_2,|1\rangle_2\}$ immediately following the first measurement in an identical reference frame, there is a 1/2 probability of projecting the state of the second qubit system onto the state $|0\rangle_2$ and a 1/2 probability of projecting the state of the second qubit system onto the state $|1\rangle_2$. In other words, the state of the second qubit system is not correlated with the state of the first qubit system. By contrast, consider an entangled, two-qubit system in the entangled state $|\phi\rangle_{12}$. Suppose that a first measurement performed on the first qubit system in the basis $\{|0\rangle_1,|1\rangle_1\}$ also projects the state of the first qubit system onto the state $|0\rangle_1$. According to the entangled state $|\phi\rangle_{12}$, the state of the entangled, two-qubit system after the first measurement is the product state $|0\rangle_1|1\rangle_2$. When a second measurement is performed on the second qubit system in the basis $\{|0\rangle_2,|1\rangle_2\}$, the state of the second qubit system is $|1\rangle_2$ with certainty. In other words, the state of the first qubit system $|0\rangle_1$ is correlated with the state of the second qubit system $|1\rangle_2$.

Entangled quantum systems have a number of different and practical applications in disciplines such as metrology, cryptography, and many-qubit communications protocols. In metrology, for example, certain kinds of entangled quantum systems can be used to improve quantum-enhanced-phase measurements of a phase shift, $\phi$, induced by an optical element on a beam of electromagnetic radiation. One conventional method for determining the phase shift $\phi$ of an optical element is to place the optical element within an internal, optical path of an interferometer. FIG. 2A illustrates an interferometer 200. The interferometer 200 comprises a first beamsplitter 202, a second beamsplitter 204, two mirrors 206 and 208, a first photon detector 210, and a second photon detector 212. The first beam splitter 202 is a 50:50 beam splitter that receives photons in input paths 214 and 216 and outputs photons in a first internal path, identified by directional arrows 218 and 220, and a second internal path, identified by directional arrows 222 and 224. The second beam splitter 204 is also a 50:50 beam splitter that recombines the photons transmitted by the first and second internal paths and outputs photons to the detectors 210 and 212. An optical element 226 with an unknown and sought after phase shift $\phi$ is located within the second internal path. The first beamsplitter 202 receives a single photon from either the input path 214 or the input path 216 and outputs a photon in the linear superposition of states:

$$|\psi\rangle = \frac{1}{\sqrt{2}}(|0\rangle + |1\rangle)$$

where $|0\rangle$ is a state that represents a photon transmitted in the first internal path, and $|1\rangle$ is a state that represents a photon transmitted in the second internal path. Just before the second beamsplitter 204, the optical element 226 causes a photon in the state $|1\rangle$ to acquire the phase shift $\phi$, which places the qubit in the state:

$$|\psi\rangle = \frac{1}{\sqrt{2}}(|0\rangle + e^{i\phi}|1\rangle)$$

The phase shift $\phi$ is determined from a quantum interference pattern that is detected by the detectors 210 and 212 and is built-up over a large number of trails. The state just before the second beamsplitter 204 for N trials is a product of N qubits and is given by:

$$|\psi\rangle^N = \prod_{j=1}^{N} \frac{1}{2^{N/2}}(|0\rangle_j + e^{i\phi}|1\rangle_j)$$

Photon interference at the second beamsplitter 204 produces over N trials a sinusoidal interference pattern of the form N cos($\phi$) that is detected by the detectors 210 and 212. The phase shift $\phi$ can be read from the interference pattern, and the uncertainty associated with an N trial determination of the phase shift $\phi$, called the "shot-noise limit," is given by:

$$\Delta\varphi_{SL} = \frac{1}{\sqrt{N}}$$

The expression for the shot noise limit is determined in accordance with estimation theory, as described in the book "Quantum Detection and Estimation Theory," by C. W. Helstrom, Mathematics in Science and Engineering 123, Academic Press, New York, 1976. The shot noise limit is a value that represents the statistical dispersion, or standard deviation, in the experimentally determined value of the phase shift $\phi$. Because the shot noise limit is inversely proportional to the square root of the number of trials, the uncertainty in the phase shift $\phi$ decreases as the number of trials N increases.

However, methods and systems that employ entangled qubit systems, such as an entangled N-qubit system in a "NOON" state, can be used to improve upon the shot noise limit by providing the optimal obtainable accuracy in the value of the phase shift φ. The N-qubit NOON state is a member of a larger class of maximally entangled qubits called "Greenberger-Horne-Zeilinger" ("GHZ") states and is given by:

$$|\psi\rangle_{NOON} = \frac{1}{\sqrt{2}}(|N, 0\rangle + |0, N\rangle)$$

where

|N,0⟩ represents the product state $|0\rangle_1 \ldots |0\rangle_N$, and

|0,N⟩ represents the product state $|1\rangle_1 \ldots |1\rangle_N$.

FIG. 2B illustrates use of a NOON state to determine a phase shift induced by the optical medium 226. Each state in |N,0⟩ represents a photon transmitted in a path 230, and each state in |0,N⟩ represents a photon transmitted in a path 232. Each photon in the state |0,N⟩ passes through the optical medium 226 and acquires a phase shift φ, which results in the state:

$$|\psi_N\rangle = \frac{1}{\sqrt{2}}(|N, 0\rangle + e^{iN\varphi}|0, N\rangle)$$

where $e^{iN\varphi}$ represents a relative phase shift difference between the photons in the state |N,0⟩ and photons in the state |0,N⟩. The paths 230 and 232 intersect at a point on a substrate 234, which produces a detectable interference pattern of the form cos(Nφ) along the top surface of the substrate 234. The uncertainty associated with using the NOON state to determine the phase shift φ is, in accordance with estimation theory, given by:

$$\Delta\varphi_{HL} = \frac{1}{N}$$

The uncertainty $\Delta\varphi_{HL}$ is called the "Heisenberg limit" and is the optimal accuracy obtainable for an N-trial determination of the phase shift φ. In other words, by employing N-qubit systems entangled in the NOON state, the uncertainty associated with the experimentally determined value of the phase shift φ is minimized, which is an improvement over the shot noise limit by a factor of $\sqrt{N}$ for the same number of trials N. However, existing methods for determining a phase shift φ using a NOON state typically employ gates and/or qubit interactions that are often cumbersome and complicated to implement. Physicists, metrologists, cryptographers, computer scientists, and quantum-information users have recognized a need for new methods that can be used to determine a phase shift φ using NOON states.

SUMMARY OF THE INVENTION

Various embodiments of the present invention are directed to methods for determining a phase shift acquired by an entangled N-qubit system represented by a NOON state. In one embodiment of the present invention, for M trials, a probe electromagnetic field may be coupled with each qubit system in the entangled N-qubit system in order to produce a probe-qubit entangled quantum system. The phase shift acquired by the qubit systems may be transferred to the probe electromagnetic field by transforming the state of each qubit-system into a linear superposition of qubit basis states. An intensity measurement may be performed on the probe electromagnetic field in order to obtain a corresponding measurement result. The measurement result falls within a measurement-result interval of a larger continuous spectrum of measurement results, and a counter associated with the measurement-result interval is incremented after each trial. For the M trials, a frequency distribution may be produced by normalizing the counter associated with each measurement-result interval. A phase shift may be determined by fitting a probability distribution associated with the probe electromagnetic field to the frequency distribution as a function of the phase shift.

DETAILED DESCRIPTION OF THE INVENTION

Figure 1A:
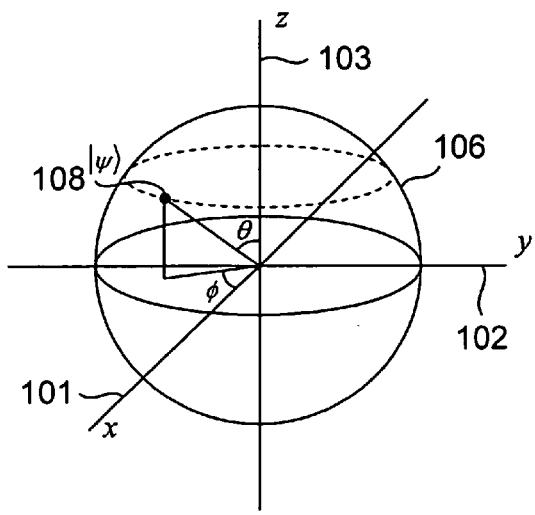
FIGS. 1A-1C illustrate a Bloch sphere representation of a qubit.
Figure 1B:
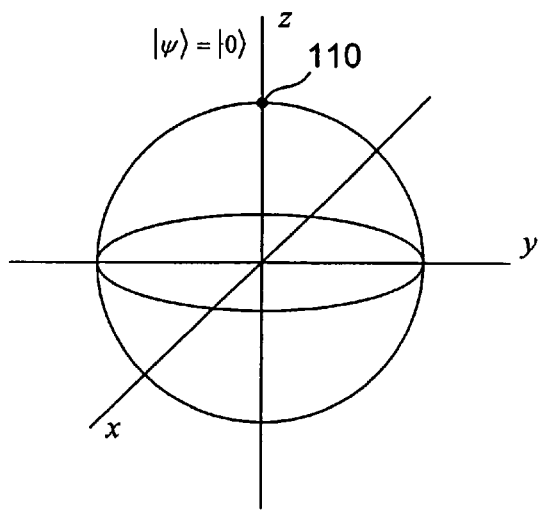
Figure 1C:
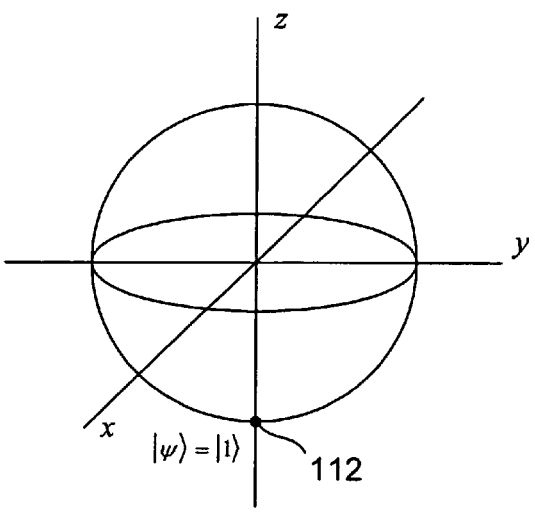
Figure 2A:
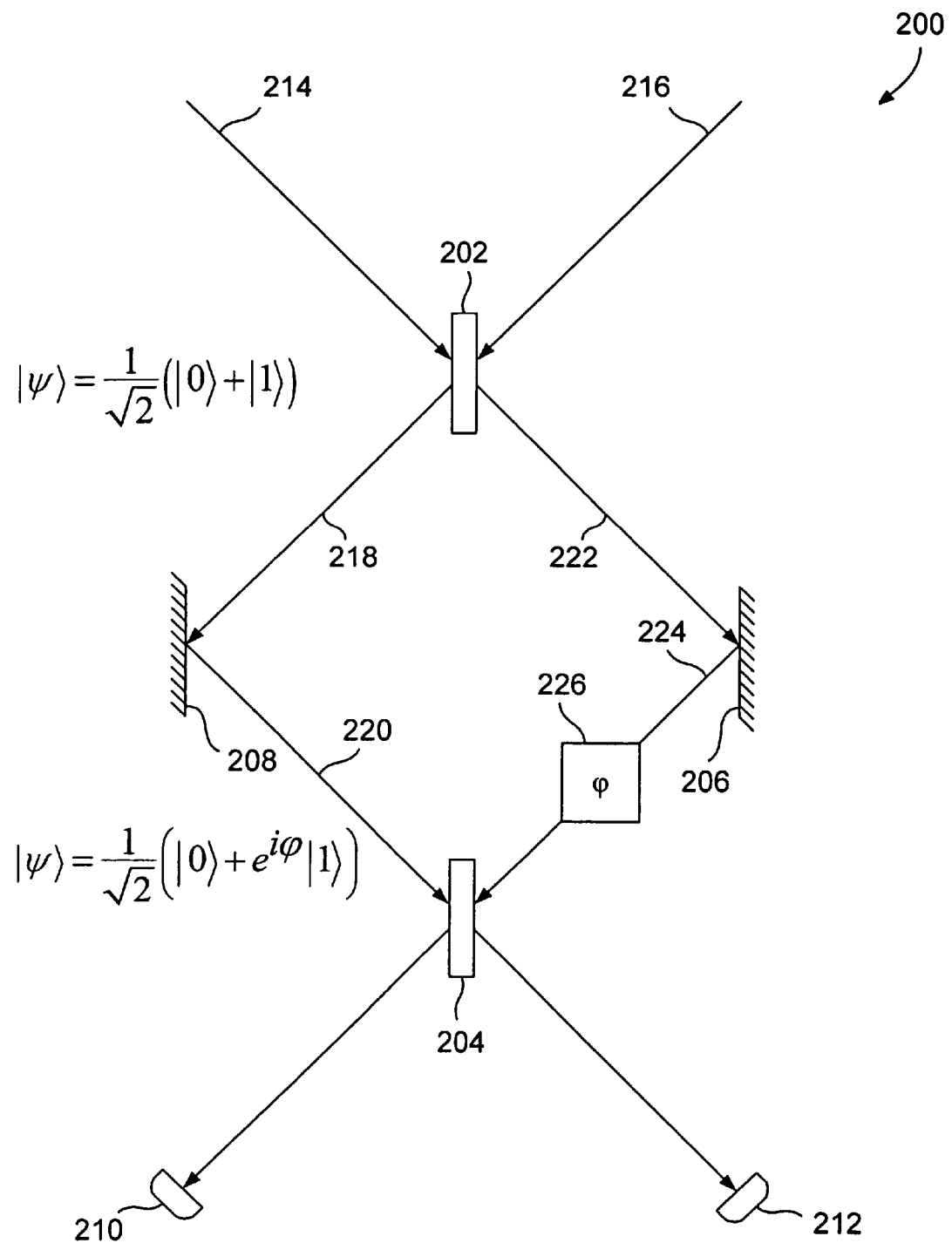
FIGS. 2A-2B illustrate two systems for determining a phase shift induced by an optical element on a beam of electromagnetic radiation.
Figure 2B:
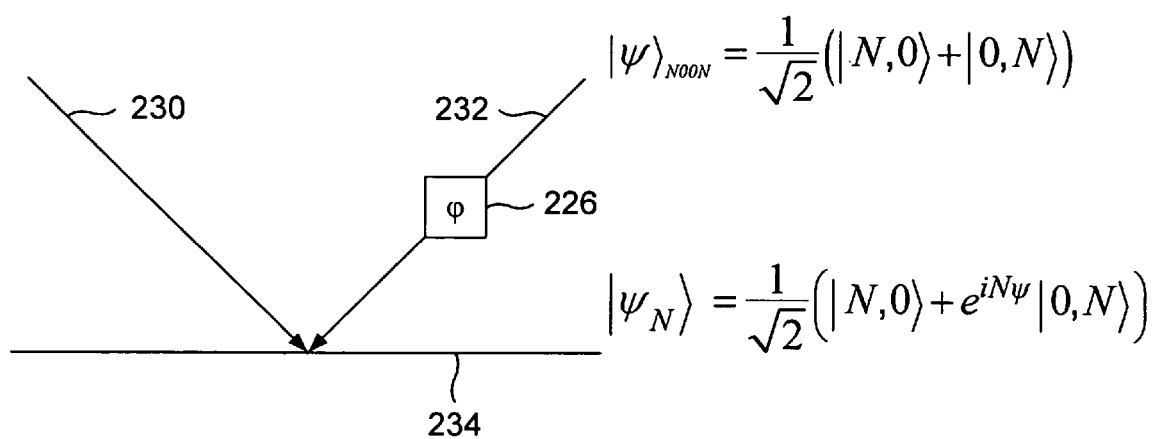

Various embodiments of the present invention are directed to methods for extracting a relative phase shift acquired by entangled, N-qubit systems. The N-qubit systems may be represented by a NOON state. Embodiments of the present invention are mathematical in nature and, for this reason, are described below with reference to numerous equations and numerous graphical illustrations. In order to assist in understanding descriptions of various embodiments of the present invention, an overview of quantum mechanics is provided below in a first subsection. An overview of electromagnetic radiation and quantum optics is provided in a second subsection. An overview of coherent states is provided in a third subsection. An overview of quantum entanglement is provided in a fourth subsection. Finally, various method embodiments of the present invention are described in a fifth subsection.

Overview of Quantum Mechanics

Embodiments of the present invention employ concepts in quantum mechanics. The textbook "Quantum Mechanics, Vol. I and II," by Claude Cohen-Tannoudji, Bernard Diu and Frank Laloe, Hermann, Paris, France, 1977, is one of many references for the field of quantum mechanics. In this subsection, topics in quantum mechanics that relate to embodiments of the present invention are described. Additional details can be obtained from the above-referenced textbook, or from many other textbooks, papers, and journal articles related to quantum mechanics.

Quantum mechanics models the observed behavior, atomic and subatomic levels, of systems comprising photons, electrons, atoms, and molecules. Quantum systems exist in discrete states that are characterized by discrete measurable quantities. A state of a quantum system is represented by a ket and is denoted $|\Psi\rangle$, where $\Psi$ is a label that represents a state of a quantum system. For example, an electron has two intrinsic spin-angular-momentum states that correspond to two measurable spin-angular-momentum values $\hbar/2$ and $-\hbar/2$, where $\hbar$ is approximately $1.0546 \times 10^{-34}$ Js. The spin state that corresponds to the spin-angular momentum $\hbar/2$ is referred to as "spin up" and is denoted $|\uparrow\rangle$, and the spin state that corresponds to the spin angular momentum $-\hbar/2$ is referred to as "spin down" and is denoted $|\downarrow\rangle$. Various different labels can be assigned to various different quantum states. For example, the spin up and spin down states $|\uparrow\rangle$ and $|\downarrow\rangle$ can also be represented by the kets $|1/2\rangle$ and $|-1/2\rangle$, respectively. Also, a single label can be used to represent different states in entirely different quantum systems. For example, the ket "$|1\rangle$" can represent a first quantized vibrational level of a diatomic molecule and can also be used to represent a single photon, as described below, in a following subsection.

A measurement employed to determine a measurable quantity of a quantum system, such as the spin angular momentum of an electron, is represented by an operator $\hat{\Psi}$, where the symbol "^" denotes an operator. In general, an operator operates on a ket from the left as follows:

$$\hat{\Psi}(|\Psi\rangle) = \hat{\Psi}|\Psi\rangle$$

where $\hat{\Psi}|\Psi\rangle$ is a ket representing an observed quantum state. Typically, an operator $\hat{\Psi}$ is associated with a set of states called "eigenstates." An eigenstate is represented as "$|\psi_i\rangle$" with the following property:

$$\hat{\Psi}|\psi_i\rangle = \psi_i|\psi_i\rangle$$

where i is a non-negative integer, and $\psi_i$ is a real value, called an "eigenvalue," that corresponds to a discrete measurable quantity that is observed when the quantum system is in the eigenstate $|\psi_i\rangle$.

For example, a measurement employed to determine the spin angular momentum of an electron is represented by $\hat{S}_z$, and the eigenvalue-eigenstate representations of observed spin-angular-momentum values are:

$$\hat{S}_z|\uparrow\rangle = \frac{\hbar}{2}|\uparrow\rangle, \text{ and}$$

$$\hat{S}_z|\downarrow\rangle = -\frac{\hbar}{2}|\downarrow\rangle$$

The eigenstates are basis vectors of a complex vector space called a "Hilbert space," and the number of eigenstates is the dimension of the Hilbert space. For example, a Hilbert space of an electron is two-dimensional, with eigenstates $|\uparrow\rangle$ and $|\downarrow\rangle$. A Hilbert space with N eigenstates $\{|\psi_i\rangle\}$ is N-dimensional, and any state $|\Psi\rangle$ in the Hilbert space can be written as a linear superposition of the eigenstates as follows:

$$|\Psi\rangle = \sum_{i=1}^{N} c_i|\psi_i\rangle$$

where $c_i$ is a complex valued coefficient called the "amplitude." A Hilbert space also includes a mathematical operation called the "inner product." The inner product of two states $|\Psi\rangle$ and $|\Xi\rangle$ is represented by:

$$\langle\Xi|\Psi\rangle$$

where $\langle\Xi|$ is called a "bra," and represents the complex conjugate and transpose of the state $|\Xi\rangle$. The inner product has the following property:

$$\langle\Xi|\Psi\rangle=\langle\Psi|\Xi\rangle*$$

where "*" represents the complex conjugate. The basis eigenstates of a Hilbert space are orthonormal, or in mathematical notation:

$$\langle\psi_i|\psi_j\rangle=\delta_{ij}$$

where $\delta_{ij}$ is 1 when i equals j, and 0 otherwise. For example, the inner product of the eigenstates of a single electron Hilbert space are:

$$\langle\uparrow|\uparrow\rangle=\langle\downarrow|\downarrow\rangle=1, \text{ and}$$

$$\langle\uparrow|\downarrow\rangle=\langle\downarrow|\uparrow\rangle=0$$

The orthonomality property of the eigenstates of a Hilbert space can be used to determine the coefficients of the linear superposition of states $|\Psi\rangle$. Taking the inner product of $|\Psi\rangle$ with $\langle\psi_j|$ gives the corresponding coefficient:

$$\langle\psi_j|\Psi\rangle = \sum_{i=1}^{N} c_i \langle\psi_j|\psi_i\rangle = \sum_{i=1}^{N} c_i \delta_{ij} = c_j$$

Substituting for the coefficients in the linear superposition gives:

$$|\Psi\rangle = \sum_{i=1}^{N} |\psi_i\rangle\langle\psi_i|\Psi\rangle$$

Because $|\Psi\rangle$ is an arbitrary ket in the Hilbert space, $$\sum_{i=1}^{N} |\psi_i\rangle\langle\psi_i| = \hat{1}$$

where "$\hat{1}$" is the identity operator. The summation is called the "completeness relation," and the eigenstates $\{|\psi_i\rangle\}$ are said to be "complete."

Because eigenstates of a Hilbert space are orthonormal and provide a basis for the Hilbert space, the eigenstates can be represented by orthogonal normalized column vectors and an operator can be represented by square matrix. For example, the eigenstates of a single electron Hilbert space are represented by the column vectors:

$$|\uparrow\rangle \doteq \begin{bmatrix} 1 \\ 0 \end{bmatrix}, \text{ and } |\downarrow\rangle \doteq \begin{bmatrix} 0 \\ 1 \end{bmatrix}$$

where the symbol "$\doteq$" stands for "is represented by." The transposed complex conjugates of the eigenstates are represented by the row vectors:

$$\langle\uparrow| \doteq [1\ 0], \text{ and } \langle\downarrow| \doteq [0\ 1]$$

Using the completeness relation, an operator $\hat{O}$ on the basis $\{|\psi_i\rangle\}$ can also be represented by:

$$\hat{O} = \sum_{i=1}^{N} \sum_{j=1}^{N} |\psi_i\rangle\langle\psi_i|\hat{O}|\psi_j\rangle\langle\psi_j|$$

where $\langle\psi_i|\hat{O}|\psi_j\rangle$ is a matrix element. The matrix corresponding to the operator $\hat{O}$ on the basis $\{|\psi_i\rangle\}$ can be represented as follows:

$$\hat{O} \doteq \begin{bmatrix} \langle\psi_1|\hat{O}|\psi_1\rangle & \langle\psi_1|\hat{O}|\psi_2\rangle & \ldots & \langle\psi_1|\hat{O}|\psi_N\rangle \\ \langle\psi_2|\hat{O}|\psi_1\rangle & \langle\psi_2|\hat{O}|\psi_2\rangle & & \vdots \\ \vdots & & \ddots & \\ \langle\psi_N|\hat{O}|\psi_1\rangle & \ldots & & \langle\psi_N|\hat{O}|\psi_N\rangle \end{bmatrix}$$

The matrix representation of the operator $\hat{O}$ equal to $\hat{\Psi}$ has zero off diagonal elements, and the diagonal elements are the eigenvalues $\{\psi_i\}$. For example, the electron spin operator can be given by:

$$\hat{S}_z = \frac{\hbar}{2}\hat{\sigma}_z$$

where $$\hat{\sigma}_z = |\uparrow\rangle\langle\uparrow| - |\downarrow\rangle\langle\downarrow|.$$

The matrix representation of the electron spin operator $\hat{S}_z$ is given by:

$$\hat{S}_z \doteq \begin{bmatrix} \langle\uparrow|\hat{S}_z|\uparrow\rangle & \langle\uparrow|\hat{S}_z|\downarrow\rangle \\ \langle\downarrow|\hat{S}_z|\uparrow\rangle & \langle\downarrow|\hat{S}_z|\downarrow\rangle \end{bmatrix}$$

$$= \frac{\hbar}{2}\begin{bmatrix} 1 & 0 \\ 0 & -1 \end{bmatrix}$$

An operator $\hat{O}$ is called a "Hermitian operator" if $$\hat{O}=\hat{O}^{\dagger}$$

The corresponding matrix elements satisfies the condition:

$$\langle\psi_i|\hat{O}|\psi_j\rangle=\langle\psi_j|\hat{O}^{\dagger}|\psi_i\rangle$$

Prior to a measurement, a quantum system can simultaneously exist in all of the eigenstates of a corresponding Hilbert space, which is represented by the (pure state) linear superposition of states:

$$|\Psi\rangle = \sum_{i=1}^{N} c_i|\psi_i\rangle = \sum_{i=1}^{N} |\psi_i\rangle\langle\psi_i|\Psi\rangle$$

A measurement performed on the quantum system projects the state $|\Psi\rangle$ of the quantum system onto one of the eigenstates. In other words, a measurement on a quantum system is essentially a filtering process that places the quantum system in one of the eigenstates in the linear superposition at the time of the measurement. For example, an electron with an unknown spin orientation prior to a measurement is represented in a linear superposition of states:

$$|\Psi\rangle = c_1|\uparrow\rangle + c_2|\downarrow\rangle$$

A spin determination measurement $\hat{S}_z$ projects the state of the electron onto either the state $|\uparrow\rangle$ or the state $|\downarrow\rangle$ at the time of the measurement. In other words, just after the spin determination measurement, the electron is either in the state $|\uparrow\rangle$ or the state $|\downarrow\rangle$.

There is a corresponding irreversible change to the state of a quantum system as a result of a measurement. Irreversibility can only be avoided when the quantum system is already in one of the quantum states before the measurement is performed. As a result, one cannot infer the prior state of a quantum system based on the outcome of a single measurement. For example, if the outcome of a spin measurement is $\hbar/2$, it is not possible to determine whether the system was already in the state $|\uparrow\rangle$ or in a linear superposition of the spin states $|\uparrow\rangle$ and $|\downarrow\rangle$ at the time of the measurement.

Although it is not possible to know in advance which of the various states $|\psi_i\rangle$ the state of a quantum system will be projected onto, the probability of the quantum system being found in a particular state $|\psi_i\rangle$ immediately after the measurement is given by:

Probability for $\psi_i = |c_i|^2 = |\langle\psi_i|\Psi\rangle|^2$ where $|\Psi\rangle$ is normalized, and $|c_i|^2$ equals $c_i^* c_i$ and gives the outcome probability. For example, prior to a spin determination measurement in the spin basis $\{|\uparrow\rangle, |\downarrow\rangle\}$, consider an electron coherently prepared with a 1/2 probability of being found in the spin state $|\uparrow\rangle$ and a 1/2 probability of being found in the spin state $|\downarrow\rangle$. The state associated with the electron in such as spine state prior to a spin determination measurement can be represented by:

$$|\Psi\rangle = \frac{1}{\sqrt{2}}|\uparrow\rangle + \frac{1}{\sqrt{2}}|\downarrow\rangle$$

The expectation value of a measurement performed on an ensemble of quantum systems that are represented by the linear superposition of states $|\Psi\rangle$ is mathematically represented by:

$$\langle\hat{\Psi}\rangle = \langle\Psi|\hat{\Psi}|\Psi\rangle$$

and is determined by applying the completeness relation as follows:

$$\langle\hat{\Psi}\rangle = \sum_{i=1}^{N}\sum_{j=1}^{N}\langle\Psi|\psi_i\rangle\langle\psi_i|\hat{\Psi}|\psi_j\rangle\langle\psi_j|\Psi\rangle$$

$$= \sum_{i=1}^{N}\psi_i|\langle\psi_i|\Psi\rangle|^2$$

The expectation value represents the weighted eigenvalue average result expected from measurements on the quantum systems in the ensemble, where the initial state $|\Psi\rangle$ of the quantum system is the same for each member of the ensemble. In other words, the linear superposition of states representing each quantum system is identical prior to the measurement. In practice, such an ensemble could be realized by preparing many identical and independent quantum systems all in the same state, or by repeatedly preparing a single system in the same state. Note that the expectation value may not be the value obtained for each measurement and, therefore, is not to be confused with the eigenvalue obtained from the measurement. For example, the expectation value of $\hat{S}_z$ can be any real value between the eigenvalues $\hbar/2$ and $-\hbar/2$, but the actual measured value of $\hat{S}_z$ for an electron is always either $\hbar/2$ or $-\hbar/2$ in each individual measurement.

A tensor product is a way of combining Hilbert spaces of different quantum systems to form Hilbert spaces that represent combined quantum systems. For example, $H_\Psi$ is a Hilbert space of a first quantum system, and $H_\Xi$ is a Hilbert space of a second quantum system. The Hilbert space denoted by $H_\Psi \otimes H_\Xi$ represents a combined Hilbert space, where the symbol $\otimes$ represents a tensor product. The operators $\hat{\Psi}$ and $\hat{\Xi}$ correspond to the Hilbert spaces $H_\Psi$ and $H_\Xi$, respectively, and each operates only on the corresponding eigenstates as follows:

$$(\hat{\Psi}\otimes\hat{\Xi})(|\psi\rangle\otimes|\xi\rangle) = (\hat{\Psi}|\psi\rangle)\otimes(\hat{\Xi}|\xi\rangle)$$

where $|\psi\rangle$ represents a state in the Hilbert space $H_\Psi$, and $|\xi\rangle$ represents a state in the Hilbert space $H_\Xi$. The tensor product $|\psi\rangle\otimes|\xi\rangle$ can be abbreviated as $|\psi\rangle|\xi\rangle$, $|\psi,\xi\rangle$ or $|\psi\xi\rangle$. The spin states of two electrons in an atomic orbital is an example of a combined Hilbert space. The two electrons can either both be spin up, both be spin down, the first electron spin up and the second electron spin down, or the first electron spin down and the second electron spin up. The various tensor product representations of two spin up electrons are given by:

$$|\uparrow\rangle_1 \otimes |\uparrow\rangle_2 = |\uparrow\rangle_1|\uparrow\rangle_2 = |\uparrow,\uparrow\rangle_{12}$$

where the subscripts 1 and 2 refer to the first and second electrons.

In quantum mechanics, there are also measurable quantities with continuous eigenvalue spectrums. The dimensionality of the corresponding Hilbert spaces are infinite and many of the properties described above for discrete quantum systems can be generalized for continuous quantum systems. A continuous eigenvalue equation is:

$$\hat{\zeta}|\zeta\rangle = \zeta|\zeta\rangle$$

where $\zeta$ represents a continuous eigenvalue, and the ket $|\zeta\rangle$ is a continuous eigenstate of the operator $\hat{\zeta}$. For example, for an unbound particle in one dimension, both position q and momentum p are continuous eigenvalues of the position and momentum operators $\hat{q}$ and $\hat{p}$, respectively, and can assume any real value between $-\infty$ and $\infty$.

The properties of the continuous variable $\zeta$ can be generalized as follows:

$$\langle\zeta|\zeta'\rangle = \delta(\zeta - \zeta'),$$

$$\int_{-\infty}^{\infty} d\zeta|\zeta\rangle\langle\zeta| = 1, \text{ and}$$

-continued $$\langle \zeta | \hat{\zeta} | \zeta' \rangle = \zeta' \delta(\zeta - \zeta'),$$

where $\delta(\zeta-\zeta')$ is the delta function, which has numerous limit representations, such as $$\delta(\zeta - \zeta') = \lim_{\Delta \to 0} \frac{1}{\sqrt{2\pi\Delta^2}} \exp\left(-\frac{(\zeta-\zeta')^2}{2\Delta^2}\right)$$

A state ket for an arbitrary physical state can be expanded in terms of the states $\{|\zeta\rangle\}$ as follows:

$$|\alpha\rangle = \int_{-\infty}^{\infty} d\zeta |\zeta\rangle\langle\zeta|\alpha\rangle$$

For example, consider placing in the path of a particle a detector that outputs the position of the particle when the particle is at the position q. Immediately after the measurement is taken, the system, initially in the state $|\alpha\rangle$, is projected onto the state represented by $|q\rangle$ in much the same way an arbitrary electron-spin state is projected onto one of the two spin states when a spin detection measurement is performed. Other properties of the continuous variable $\zeta$ are given by:

$$\int_{-\infty}^{\infty} d\zeta |\langle\zeta|\alpha\rangle|^2 = 1, \text{ and}$$

$$\langle\beta|\alpha\rangle = \int_{-\infty}^{\infty} d\zeta \langle\beta|\zeta\rangle\langle\zeta|\alpha\rangle$$

The momentum operator $\hat{p}$ can also be represented by a differential operator $-i\hbar \partial/\partial q$. As a result, both the position and momentum operators satisfy the canonical commutation relations:

$$[\hat{q}_i, \hat{q}_j] = 0$$

$$[\hat{p}_i, \hat{p}_j] = 0, \text{ and}$$

$$[\hat{q}_i, \hat{p}_j] = i\hbar \delta_{ij}$$

where
  i and j represent orthogonal coordinates, such as the Cartesian x, y, and z coordinates, and
  the commutator is defined as $[A, B] = AB - BA$.

An Overview of Electromagnetic Radiation and Quantum Optics

In this subsection, a brief description of electromagnetic radiation and quantum optics that relates to embodiments of the present invention is described. The textbooks "Quantum Optics," M. O. Scully and M. S. Zubairy, Cambridge University Press, Cambridge, United Kingdom, 1997, and "The Quantum Theory of Light (3rd Edition)," R. Loudon, Oxford University Press, New York, 2000 are two of many references for quantum optics. Additional details can be obtained from the above-referenced textbooks, or from many other textbooks, papers, and journal articles in this field.

Quantum optics is a field of physics that relates the application of quantum mechanics to electromagnetic radiation. Electromagnetic radiation confined to a cavity with perfectly reflecting walls is quantized. Quantized electromagnetic radiation can be applied to more general unconfined optical systems, such as electromagnetic radiation propagating in free space or in an optical fiber.

Electromagnetic radiation confined to a cavity, with no free charges and currents, comprises an electric field component $\vec{E}(\vec{r},t)$ and a magnetic field component $\vec{B}(\vec{r},t)$ that are related in terms of a vector potential $\vec{A}(\vec{r},t)$ satisfying the wave equation:

$$\nabla^2 \vec{A} - \frac{1}{c^2} \frac{\partial^2 \vec{A}}{\partial t^2} = 0$$

and the Coulomb, non-relativistic gauge condition:

$$\nabla \cdot \vec{A}(\vec{r},t) = 0$$

where the electric and magnetic field components are determined by:

$$\vec{E}(\vec{r}, t) = -\frac{\partial \vec{A}(\vec{r},t)}{\partial t}, \text{ and}$$

$$\vec{B}(\vec{r}, t) = \nabla \times \vec{A}(\vec{r}, t)$$

Figure 3:
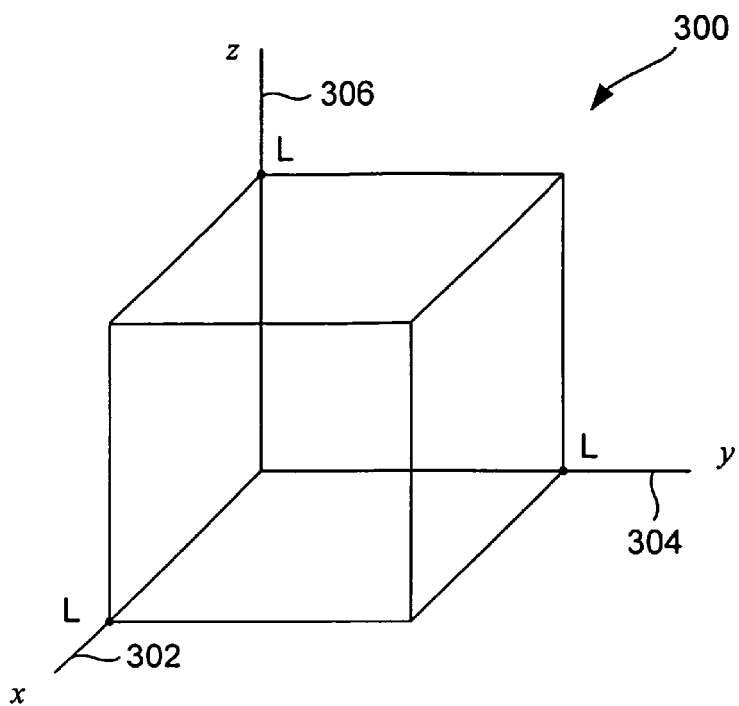
FIG. 3 illustrates a cubic cavity.

The electromagnetic radiation is assumed to be propagating but is subject to periodic boundary conditions imposed by a cubic, or quantization, cavity with perfectly reflecting walls, where the walls are of length L. FIG. 3 illustrates a cubic cavity 300. Orthogonal axes 302, 304, and 306 represent the x, y, and z Cartesian coordinate axes. The finite dimensional cubic cavity 300 imposes periodic boundary conditions on solutions to the wave equation. For example, in the x, y, and z-directions, plane wave solutions to the vector potential wave equation satisfy the condition:

$$\exp(i\vec{k} \cdot \vec{r}) = \exp(i\vec{k} \cdot (\vec{r} + \vec{L}))$$

where $\vec{L}$ is vector (L, L, L), and
$\vec{k}$ is called the "wavevector" with components:

$$\vec{k} = \frac{2\pi}{L}(m_x, m_y, m_z), \text{ and}$$

$m_x$, $m_y$, and $m_z$ are integers.

Each set of integers $(m_x, m_y, m_z)$ specifies a normal mode of the electromagnetic radiation, and the magnitude of the wavevector $\vec{k}$, k, is equal to $\omega_k/c$, where c represents the speed of light in free space and $\omega_k$ is the angular frequency. Note that in real life the spectrum of normal modes of an electromagnetic field is actually continuous and a discrete spectrum of normal modes suggested by the wavevector $\vec{k}$ is an approximation to the continuous spectrum.

A propagating vector potential solution to the wave equation above that satisfies the periodic boundary conditions is:

$$A(r,t) = \sum_{\vec{k},s} \vec{e}_{\vec{k}s}\left(A_{\vec{k}s} e^{i(\vec{k}\cdot\vec{r}-\omega_k t)} + A^*_{\vec{k}s} e^{-i(\vec{k}\cdot\vec{r}-\omega_k t)}\right)$$

where $A_{\vec{k}s}$ is a complex amplitude of the electromagnetic radiation;

$\vec{e}_{\vec{k}s}$ represents two unit-length polarization vectors; and $m_x, m_y, m_z = 0, \pm 1, \pm 2, \pm 3 \ldots$ The sum over $\vec{k}$ represents the sum over the integers ($m_x, m_y, m_z$), and the sum over s is the sum over the two independent polarizations that are associated with each $\vec{k}$. The two polarization vectors are orthogonal as indicated by:

$$\vec{e}_{\vec{k}s} \cdot \vec{e}_{\vec{k}s'} = \delta_{ss'},$$

and from the gauge condition given above:

$$\vec{k} \cdot \vec{e}_{\vec{k}s} = 0,$$

for both polarization directions s. The two polarization vectors $\vec{e}_{\vec{k}1}$ and $\vec{e}_{\vec{k}2}$ form a right-handed coordinate system with a normalized wavevector given by:

$$\vec{e}_{\vec{k}1} \times \vec{e}_{\vec{k}2} = \frac{\vec{k}}{|\vec{k}|} = \vec{\kappa}$$

Figure 4:
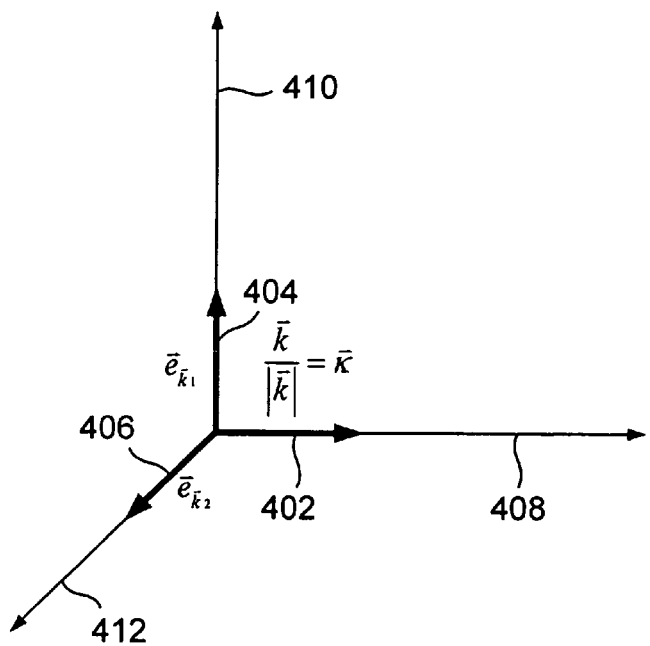
FIG. 4 illustrates a three-dimensional coordinate system with two independent polarization vectors and a normalized wavevector as basis vectors.

FIG. 4 illustrates a three-dimensional right-handed coordinate system with two independent polarization vectors $\vec{e}_{\vec{k}s}$ and a normalized wavevector $\vec{\kappa}$ as basis vectors. In FIG. 4, the wavevector $\vec{k}$ 402, and the polarization vectors, $\vec{e}_{\vec{k}1}$ 404 and $\vec{e}_{\vec{k}2}$ 406, are three orthogonal unit length basis vectors of a coordinate system with coordinate axes represented by lines 408, 410, and 412, respectively.

The propagating electric and magnetic field components of the vector potential are:

$$\vec{E}(\vec{r},t) = i\sum_{\vec{k},s} \omega_k \vec{e}_{\vec{k}s}\left[A_{\vec{k}s}e^{i(\vec{k}\cdot\vec{r}-\omega_k t)} - A^*_{\vec{k}s}e^{-i(\vec{k}\cdot\vec{r}-\omega_k t)}\right], \text{ and}$$

$$\vec{B}(\vec{r},t) = \frac{i}{c}\sum_{\vec{k},s} \omega_k(\vec{\kappa} \times \vec{e}_{\vec{k}s})\left[A_{\vec{k}s}e^{i(\vec{k}\cdot\vec{r}-\omega_k t)} - A^*_{\vec{k}s}e^{-i(\vec{k}\cdot\vec{r}-\omega_k t)}\right]$$

Both the electric field $\vec{E}(\vec{r},t)$ and magnetic field $\vec{B}(\vec{r},t)$ are propagating wave solutions referred to as the "classical" representation of the electric and magnetic field, are orthogonal to one another, and are both orthogonal to the wavevector $\vec{k}$.

Figure 5:
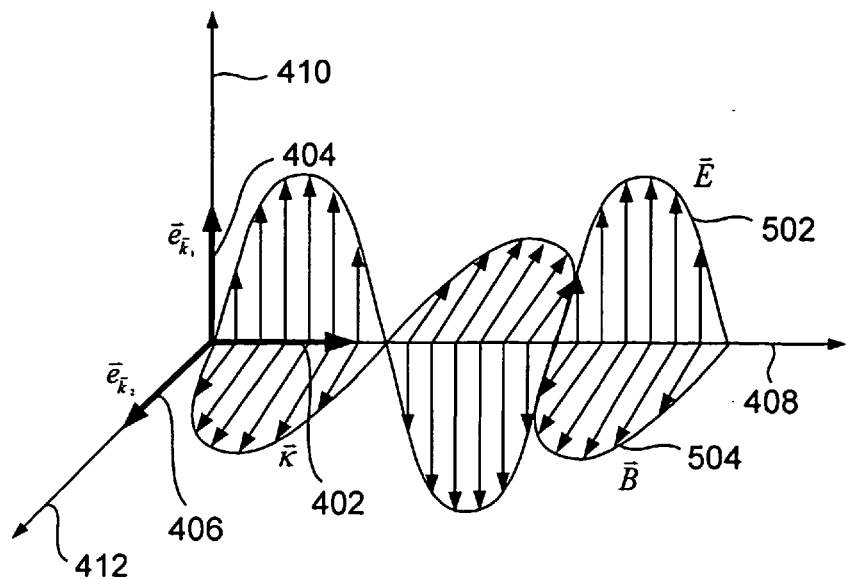
FIG. 5 illustrates a representation of electric and magnetic field components of electromagnetic radiation in the coordinate system shown in FIG. 4.

FIG. 5 illustrates a representation of electric and magnetic field components of electromagnetic radiation in the right-handed coordinate system shown in FIG. 4. The electromagnetic radiation is directed along the wavevector $\vec{\kappa}$ 402 axis.

The electric field component $\vec{E}(\vec{r},t)$ 502 and magnetic field component $\vec{B}(\vec{r},t)$ 504 are directed along the orthogonal polarization vectors $\vec{e}_{\vec{k}1}$ 404 and $\vec{e}_{\vec{k}2}$ 406, respectively, and appear frozen at a particular time t.

The energy of the electromagnetic radiation can be determined by evaluating the Hamiltonian:

$$H = \frac{1}{2}\int_V \left(\varepsilon_0 \vec{E}\cdot\vec{E} + \frac{1}{\mu_0}\vec{B}\cdot\vec{B}\right)dV$$

$$= 2\varepsilon_0 V \sum_{\vec{k},s} \omega_k^2 A_{\vec{k}s} A^*_{\vec{k}s},$$

$\varepsilon_0$ is the electric permittivity of free space,
$\mu_0$ is the magnetic permeability of free space, and
V is the volume of the cavity.

The electric permittivity $\varepsilon_0$ represents the degree to which a vacuum space can store electrical potential energy under the influence of an electric field, and the magnetic permeability $\mu_0$ represents the degree to which the vacuum modifies the flux of a magnetic field. In a non-conducting medium, the electric permittivity is further multiplied by $\varepsilon$, which is the degree to which the medium enhances the storage of electrical potential energy, and the magnetic permeability is further multiplied by $\mu$, which is the degree to which the medium further enhances the flux of a magnetic field.

In order to quantize the electric field $\vec{E}(\vec{r},t)$ and magnetic field $\vec{B}(\vec{r},t)$ components, the canonical variables for position, $q_{\vec{k}s}$, and momentum, $p_{\vec{k}s}$, are introduced into the Hamiltonian by setting:

$$A_{\vec{k}s} = \frac{1}{2\omega_k\sqrt{\varepsilon_0 V}}(\omega_k q_{\vec{k}s} + ip_{\vec{k}s})$$

As a result, the Hamiltonian for the electromagnetic radiation becomes:

$$H = \frac{1}{2}\sum_{\vec{k},s}(p_{\vec{k}s}^2 + \omega_k^2 q_{\vec{k}s}^2)$$

Each term in the Hamiltonian is the energy of a harmonic oscillator with vibrational mode $\vec{k}s$, where the term $p_{\vec{k}s}^2/2$ is the kinetic energy, and the term $\omega_k q_{\vec{k}s}^2/2$ is the potential energy of a harmonic oscillator with a unit mass. The Hamiltonian is quantized by replacing the position and momentum variables $q_{\vec{k}s}$ and $p_{\vec{k}s}$ with quantum mechanical position and momentum operators $\hat{q}_{\vec{k}s}$ and $\hat{p}_{\vec{k}s}$, respectively, to give the quantum Hamiltonian operator:

$$\hat{H} = \frac{1}{2}\sum_{\vec{k},s}\left(\hat{p}_{\vec{k}s}^2 + \omega_k^2 \hat{q}_{\vec{k}s}^2\right)$$

Annihilation and creation operators are defined by:

$$\hat{a}_{\vec{k}s} = \frac{1}{\sqrt{2\hbar\omega_k}}(\omega_k \hat{q}_{\vec{k}s} + i\hat{p}_{\vec{k}s}), \text{ and}$$

$$\hat{a}_{\vec{k}s}^\dagger = \frac{1}{\sqrt{2\hbar\omega_k}}(\omega_k \hat{q}_{\vec{k}s} - i\hat{p}_{\vec{k}s}),$$

and substituting the annihilation and creation operators in the quantum Hamiltonian operator gives:

$$\hat{H} = \sum_{\vec{k},s} \hbar\omega_k \left(\hat{a}_{\vec{k}s}^\dagger \hat{a}_{\vec{k}s} + \frac{1}{2}\right),$$

where $\hat{a}_{\vec{k}s}^\dagger \hat{a}_{\vec{k}s}$ is called the "number operator" and is also denoted by $\hat{n}_{\vec{k}s}$. Using the canonical commutation relations for the position and momentum operators, the annihilation and creation operators satisfy the commutation relations given by:

$$[\hat{a}_{\vec{k}s}, \hat{a}_{\vec{k}'s'}] = 0 = [\hat{a}_{\vec{k}s}^\dagger, \hat{a}_{\vec{k}'s'}^\dagger], \text{ and}$$

$$[\hat{a}_{\vec{k}s}, \hat{a}_{\vec{k}'s'}^\dagger] = \delta_{\vec{k}\vec{k}'} \delta_{ss'}$$

When the electromagnetic radiation is quantized, the amplitudes $A_{\vec{k}s}$ become operators:

$$\hat{A}_{\vec{k}s} = \sqrt{\frac{\hbar}{2\omega_k \varepsilon_0 V}} \hat{a}_{\vec{k}s},$$

which can be substituted in the classical electric and magnetic field equations above to obtain electric and magnetic field operators:

$$\hat{E}(\vec{r},t) = i \sum_{\vec{k},s} \sqrt{\frac{\hbar\omega}{2\varepsilon_0 V}} e_{\vec{k}s} [\hat{a}_{\vec{k}s} e^{i(k\cdot r - \omega_k t)} - \hat{a}_{\vec{k}s}^\dagger e^{-i(k\cdot r - \omega_k t)}], \text{ and}$$

$$\hat{B}(\vec{r},t) = \frac{i}{c} \sum_{\vec{k},s} (\vec{K} \times e_{\vec{k}s}) \sqrt{\frac{\hbar\omega}{2\varepsilon_0 V}} e_{\vec{k}s} [\hat{a}_{\vec{k}s} e^{i(k\cdot r - \omega_k t)} - \hat{a}_{\vec{k}s}^\dagger e^{-i(k\cdot r - \omega_k t)}]$$

Both the electric and magnetic field operators are Hermitian and represent measurable electric and magnetic fields.

The electric field accounts for most of the interactions with charged matter, because the magnitude of the magnetic field is smaller than the electric field by the factor 1/c. As a result, the electric field alone is generally used to characterize the behavior of electromagnetic radiation and any interactions with charged matter, and the magnetic field component can be ignored.

Quantum computation and quantum information processing systems can be operated using a single-mode $\vec{k}$ s of electromagnetic radiation. As a result, the Hamiltonian operator for a single-mode of electromagnetic radiation reduces to:

$$\hat{H} = \hbar\omega\left(\hat{a}^\dagger \hat{a} + \frac{1}{2}\right),$$

where $\hat{a}$ and $\hat{a}^\dagger$ replace the mode-dependent operators $\hat{a}_{\vec{k}_j s_j}$ and $\hat{a}_{\vec{k}_j s_j}^\dagger$ in the Hamiltonian above. The eigenstates and the corresponding energy eigenvalues of the single-mode Hamiltonian are:

$$\hat{H}|n\rangle = \hbar\omega\left(\hat{a}^\dagger \hat{a} + \frac{1}{2}\right)|n\rangle = E_n|n\rangle,$$

where $|n\rangle$ is called a "number state," n is a nonnegative integer called a "photon number," and $E_n$ is an energy eigenvalue.

The annihilation and creation operators operate on a number state as follows:

$$\hat{a}|n\rangle = \sqrt{n}|n-1\rangle,$$

$$\hat{a}^\dagger|n\rangle = \sqrt{n+1}|n+1\rangle, \text{ and}$$

$$\hat{n}|n\rangle = n|n\rangle,$$

where $\hat{n}$ represents the operator $\hat{a}^\dagger \hat{a}$ and is called the "number operator." The number states can be generated by repeated application of the annihilation and creation operators to the number states. For example, repeated application of the annihilation operator to a number state lowers the photon number:

$$|0\rangle = \frac{\hat{a}^n}{\sqrt{n!}}|n\rangle,$$

where $|0\rangle$ is called the "vacuum state" and represents the lowest energy state of the electromagnetic radiation. Beginning with the vacuum state, and repeatedly applying the creation operator gives:

$$|n\rangle = \frac{(\hat{a}^\dagger)^n}{\sqrt{n!}}|0\rangle$$

The number states are orthogonal and form a compete set represented by:

$$\langle n'|n\rangle = \delta_{n'n}, \text{ and}$$

$$\sum_{n=0}^{\infty} |n\rangle\langle n| = 1$$

In general, the energy eigenvalue equation associated with a number state $|n\rangle$ is:

$$\hat{H}|n\rangle = \hbar\omega\left(n + \frac{1}{2}\right)|n\rangle = E_n|n\rangle.$$

Applying the annihilation and creation operators to the energy eigenvalue equation gives:

$$\hat{H}(\hat{a}|n\rangle) = \hbar\omega\left(n - \frac{1}{2}\right)|n-1\rangle = (E_n - \hbar\omega)|n-1\rangle, \text{ and}$$

$$\hat{H}(\hat{a}^\dagger|n\rangle) = \hbar\omega\left(n + \frac{3}{2}\right)|n+1\rangle = (E_n + \hbar\omega)|n+1\rangle,$$

which shows that the energy levels of electromagnetic radiation are equally spaced by a quantum of energy $\hbar\omega$. In other words, the excitations of electromagnetic radiation occur in discrete amounts of energy $\hbar\omega$ called "photons." The photon number n refers to the number of photons has comprising the electromagnetic radiation.

Figure 6:
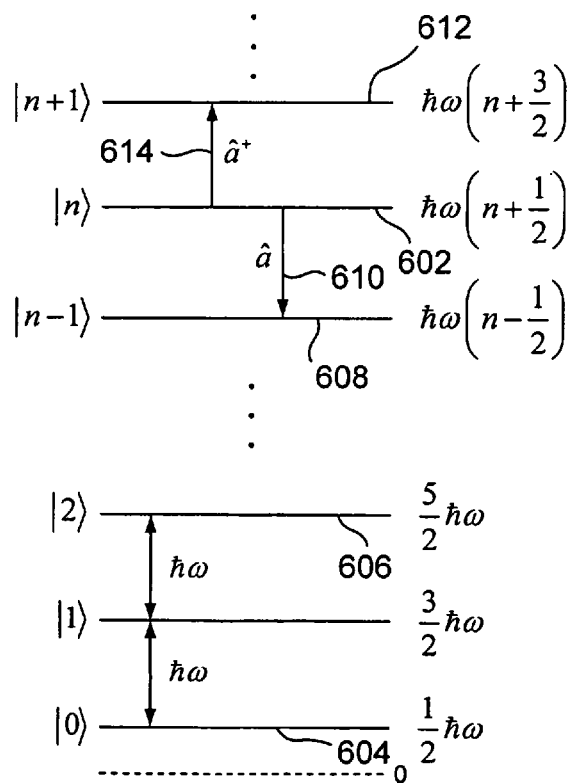
FIG. 6 is an energy-level diagram of quantized electromagnetic radiation.

FIG. 6 is an energy level diagram of quantized electromagnetic radiation. Horizontal lines, such as horizontal line 602, represent energy levels of electromagnetic radiation. Energy level 604 is the lowest energy level, which corresponds to the vacuum state $|0\rangle$. The energy of the vacuum state is $\hbar\omega/2$ or 1/2 the energy of a single photon. Higher energy levels of electromagnetic radiation are each separated by the same quantum of energy $\hbar\omega$. For example, the energy level 606 represents electromagnetic radiation with a total electromagnetic energy of $5\hbar\omega/2$, which can be thought of as the energy of two photons plus the vacuum state energy $\hbar\omega/2$. The annihilation operator corresponds to removal of a photon from the electromagnetic radiation, and the creation operator corresponds to addition of a photon to the electromagnetic radiation. For example, the annihilation operator â represents an electromagnetic-radiation transition 610 from the state $|n\rangle$ 602 to the lower energy state $|n-1\rangle$ 608. The transition 610 is achieved by giving up a photon to the surroundings. By contrast, the creation operator $\hat{a}^\dagger$ represents an electromagnetic-radiation transition 614 from the state $|n\rangle$ 602 to the higher energy state $|n+1\rangle$ 612. The transition 614 is achieved by accepting a photon from the surroundings. Note that typically the surroundings can be an atom, a quantum dot, or any other system that couples to the field through a dipole interaction. Loss or absorption of a photon will involve a simultaneous excitation of the surrounding system and creation or emission of a photon will involve a corresponding de-excitation of the surrounding system.

Both the creation and annihilation operators are not Hermitian. As a result, the operators â and $\hat{a}^\dagger$ cannot represent measurable quantities. However, the annihilation and creation operators can be used to construct the following Hermitian quadrature operators:

$$\hat{X} = \sqrt{\frac{m\omega}{2\hbar}}\hat{q} = (\hat{a} + \hat{a}^\dagger), \text{ and}$$

$$\hat{Y} = \frac{\hat{p}}{\sqrt{2m\hbar\omega}} = i(\hat{a}^\dagger - \hat{a})$$

The quadrature operators are essentially dimensionless position and momentum operators and are associated with the electric field amplitudes oscillating out of phase with each other by 90°. The energy eigenvalue can be rewritten in terms of the quadrature operators as:

$$\hat{H} = \hbar\omega(\hat{X}^2 + \hat{Y}^2)|n\rangle = \hbar\omega\left(n + \frac{1}{2}\right)|n\rangle.$$

The number states have the quadrature-operator eigenvalue property:

$$(\hat{X}^2 + \hat{Y}^2)|n\rangle = \left(n + \frac{1}{2}\right)|n\rangle,$$

and the number states have identical properties for the $\hat{X}$ and $\hat{Y}$ quadrature operators. For example, the quadrature-operator-expectation values:

$$\langle n|\hat{X}|n\rangle = \langle n|\hat{Y}|n\rangle = 0$$

The quadrature operators can be used to construct a phase-space diagram of the number states.

Figure 7:
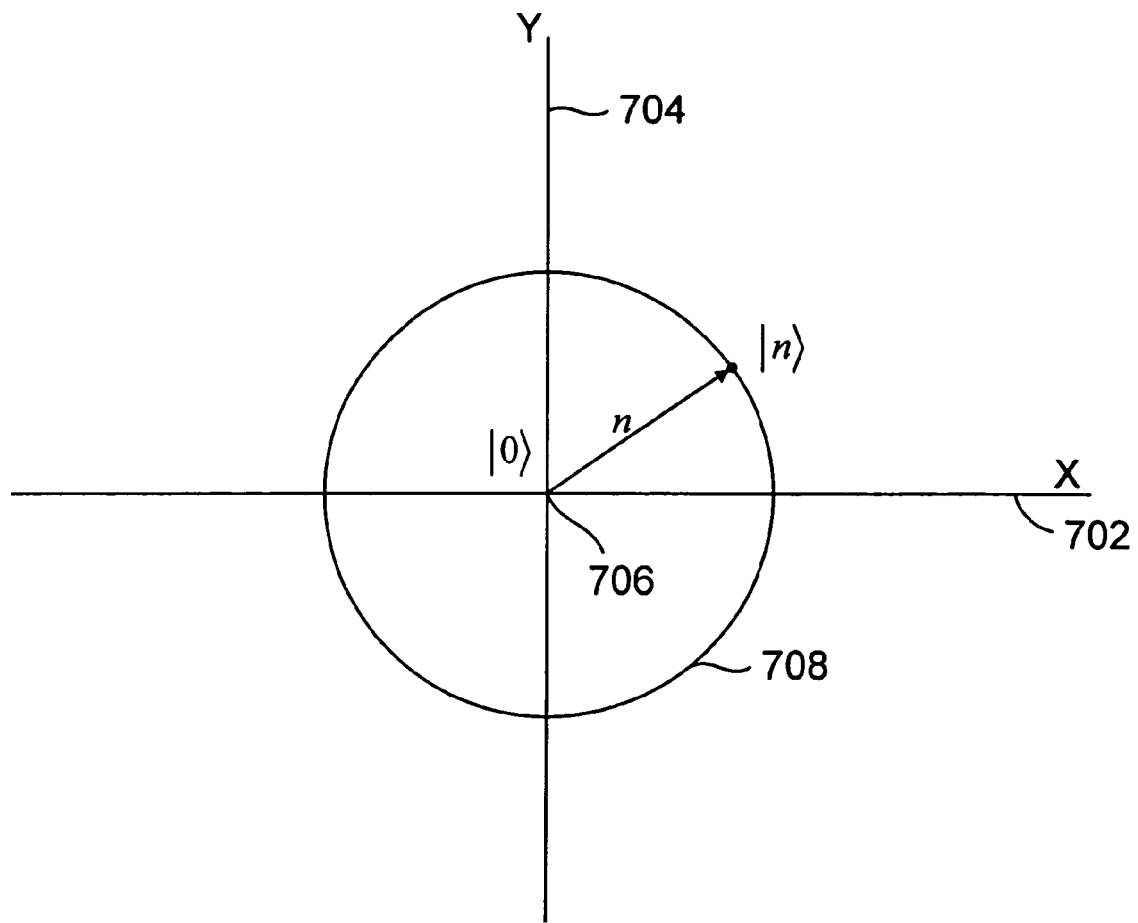
FIG. 7 is a phase space diagram of a number state.

FIG. 7 is a phase space diagram of a number state. Horizontal line 702 is the X quadrature axis, and vertical line 704 is the Y quadrature axis. The origin 706 corresponds to the vacuum state $|0\rangle$, and circle 708 is a qualitative representation of a number state $|n\rangle$, where the radius of the circle 708 is the number of photons n. The number state $|n\rangle$ can be located anywhere on the circle 708, which indicates that uncertainty in the number of photons is zero, but the phase angle associated with the number state is entirely undefined, so measurement will give all possible outcomes with equal probability.

The number states also have the property:

$$\Sigma = \langle n|\hat{E}(t)|n\rangle = 0,$$

where $\Sigma$ is called a "coherent signal." The zero valued coherent signal of a photon state is consistent with the sinusoidal variation of the electric field with time at a fixed observation point.

Photons can be generated by a photon source and transmitted through free space or in an optical fiber. The photon source can be a pulsed laser that generates a single pulse or a train of pulses, each pulse containing one or more photons that all have the same optical properties, such as wavelength and direction. Photons with the same optical properties are called "coherent." However, the source, the detector, and a medium, such as an optical fiber, separating the source from the detector do not define an optical cavity. The source and the detector are parts of a continuous unidirectional flow of optical energy with no significant reflection or recycling of the optical energy. A pulse transmitted through free space or an optical fiber is described by a wavepacket that can be represented by a time-dependent, Gaussian-shaped function given by:

$$\xi(t) = \left(\frac{2\Delta^2}{\pi}\right)^{1/4} \exp\{-i\omega_0 t - \Delta^2(t_0 - t)^2\},$$

where
  $\omega_0$ is the central frequency of the pulse spectrum,
  t is time,
  $t_0$ is the time at which the peak of the wavepacket is located at a distance $z_0$ from the photon source, and
  $\Delta^2$ is the variance of the intensity spectrum.

The time to can be determined by $z_0/v$, where v is the velocity of the pulse traveling through free space or in an optical fiber.

The wavepacket $\xi(t)$ is the amplitude of the pulse, and $|\xi(t)|^2$ is a photodetection probability density function of the pulse, where the photodetection probability density function $|\xi(t)|^2$ satisfies the normalization condition:

$$\int_{-\infty}^{\infty} dt |\xi(t)|^2 = 1$$

The probability of photodetection of a photon in the time interval $(t_1, t_2)$ at a distance $z_0$ from the photon source is given by:

$$\text{Probability of } (t_1 < t_2) = \int_{t_1}^{t_2} dt |\xi(t)|^2$$

Figure 8:
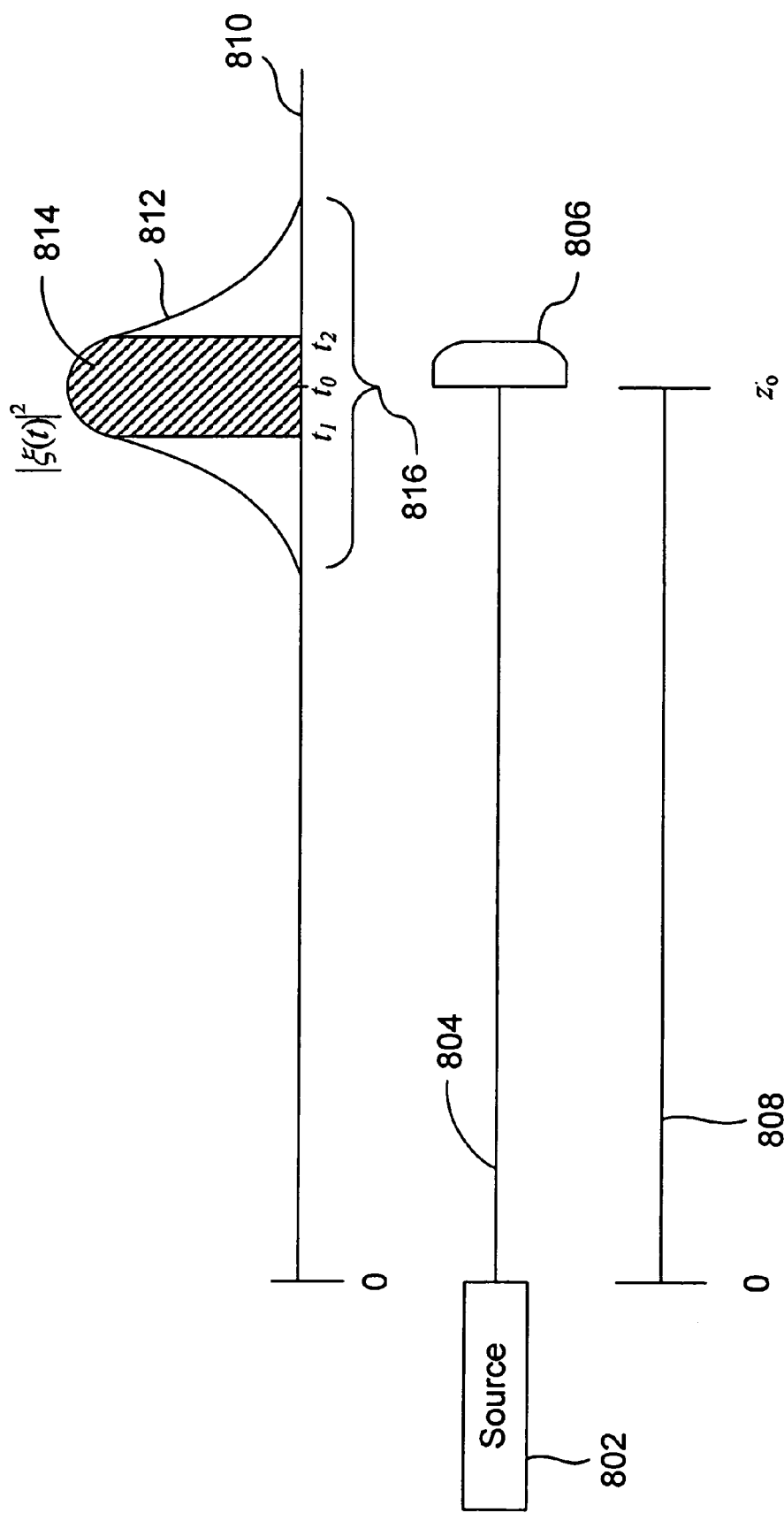
FIG. 8 illustrates a probability distribution function associated with a pulse output from a source and transmitted to a detector.

FIG. 8 illustrates a probability distribution associated with a pulse output from a source 802 and transmitted in an optical fiber 804 to a detector 806. The horizontal line 808 represents the distance $z_0$ the photon travels from the source 802 to the detector 806, and the horizontal line 810 is a time axis. The curve 812 represents the photodetection probability density function $|\xi(t)|^2$. In FIG. 8, the photodetection probability density function $|\xi(t)|^2$ 812 is centered at the time $t_O$, which corresponds to the time a pulse takes to travel the distance $z_0$. An area under the curve 812 represents the probability of detecting the pulse within a particular time period. For example, hash-marked region 814 represents the probability of detecting the photon within the time period $t_1 < t_0 < t_2$. Time period 816 is called a "time bin" and corresponds to the time period within which the photon is detected at the detector 806.

The time dependent creation operators can be used to generate a photon wavepacket creation operator as follows:

$$\hat{a}_\xi^\dagger = \int_{-\infty}^{\infty} dt \xi(t) \hat{a}^\dagger(t)$$

The creation operator can be used to construct continuous-mode number states that represent photons transmitted through free space or in an optical fiber as follows:

$$|n_\xi\rangle = \frac{(\hat{a}_\xi^\dagger)^n}{\sqrt{n!}} |0\rangle,$$

where $|0\rangle$ is the continuous-mode vacuum state. The continuous-mode number states satisfy the following same conditions:

$$\hat{n}|n_\xi\rangle = n|n_\xi\rangle,$$

$$\langle n'_\xi | n_\xi \rangle = \delta_{n'n}, \text{ and}$$

$$\sum_{n_\xi=0}^{\infty} |n_\xi\rangle\langle n_\xi| = 1$$

As a result, the subscript $\xi$ used to identify continuous-mode number states can be dropped. Note that the wavepacket constructed photon is not an eigenstate of any Hamiltonian.

An Overview of Coherent States

The most common kind of single-mode states are linear superpositions of the number states. There are a number of different possible linear superpositions of the number states, but the coherent state:

$$|\alpha\rangle = \exp\left(-\frac{1}{2}|\alpha|^2\right) \sum_{n=0}^{\infty} \frac{\alpha^n}{\sqrt{n!}} |n\rangle$$

is a linear superposition of the number states used in many applications of quantized electromagnetic radiation. The coherent states are eigenstates of the annihilation operator:

$$\hat{a}|\alpha\rangle = \alpha|\alpha\rangle,$$

where taking the complex conjugate gives:

$$\langle\alpha|\hat{a}^\dagger = \langle\alpha|\alpha^*$$

However, the coherent state $|\alpha\rangle$ is not an eigenstate of the creation operator at because the summation over a cannot be rearranged to give the coherent state from at $\hat{a}^\dagger$.

The coherent state expectation value for the number operator:

$$\langle n \rangle = \langle\alpha|\hat{n}|\alpha\rangle = |\alpha|^2$$

indicates that $|\alpha|^2$ is the mean number of photons. The probability of detecting n photons in a measurement of the number of photons is a Poisson distribution:

$$P_n = |\langle n | \alpha \rangle|^2 = \exp(-|\alpha|^2) \frac{|\alpha|^2}{n!}$$

The Poisson distribution approaches a Gaussian distribution for large values of $|\alpha|^2$.

The coherent state is a quantum state whose properties most closely resemble a classical electromagnetic wave of stable amplitude and fixed phase. For example, the electric field operator corresponding to an electric field propagating in the z direction, with the mode subscripts k and s removed, is:

$$\hat{E}(\Omega) = \frac{1}{2}\left(\hat{a}e^{-i\Omega} + \hat{a}^\dagger e^{i\Omega}\right)$$

$$= \hat{X}\cos\Omega + \hat{Y}\sin\Omega$$

where the time t and displacement z are contained in the phase angle:

$$\Omega(z, t) = \omega t - kz - \frac{\pi}{2},$$

and the electric field is measured in units of $\sqrt{\hbar\omega/2\epsilon_0 V}$.

The coherent state is a nearly classical state because it gives the correct sinusoidal form for the electric field expectation value or coherent signal:

$$\Sigma = \langle \alpha | \hat{E}(\Omega) | \alpha \rangle$$
$$= |\alpha| \cos(\Omega - \phi)$$

where $\alpha = |\alpha| e^{i\phi}$, and $\phi$ is the mean phase angle of the coherent state excitation of the mode.

Figure 9:
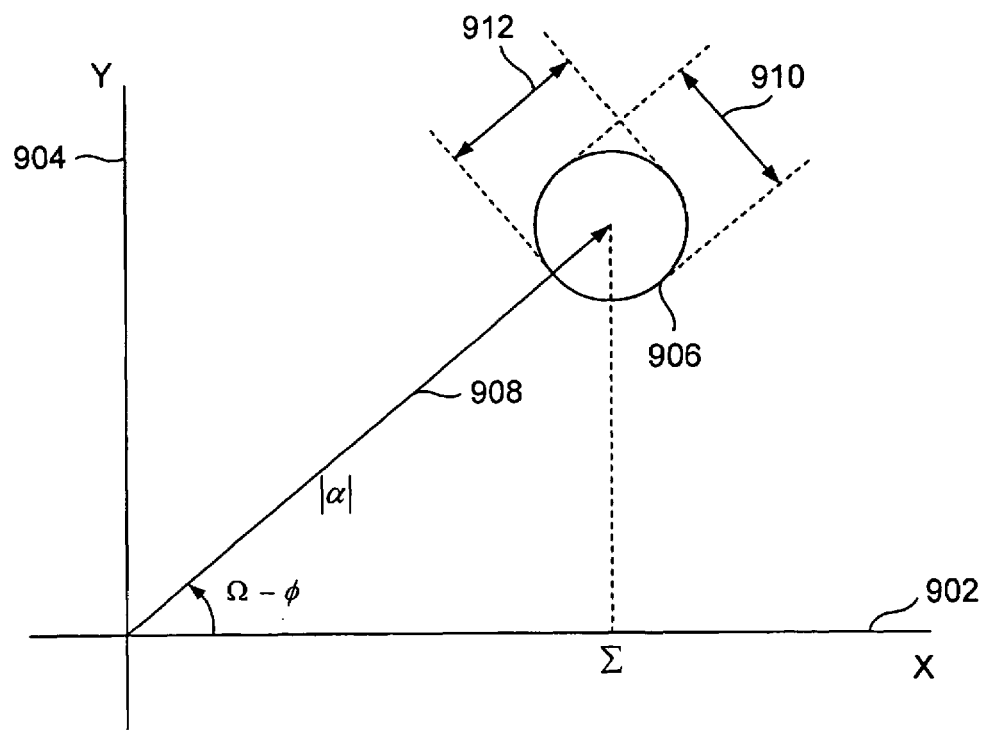
FIG. 9 is a phase-space diagram of a coherent state.

FIG. 9 is a phase-space diagram of a coherent state. Horizontal axis 902 is the X quadrature axis, and vertical axis 904 is the Y quadrature axis. Disk 906 represents an area of uncertainty associated with the phase and average number of photons of a coherent state $|\alpha\rangle$, the fluctuations being equal in all directions of phase space. Directional arrow 908 represents the amplitude $|\alpha|$, or the mean number of photons, and ($\Omega-\phi$) is the angle above the X quadrature axis. The uncertainty disk is resolved into a photon-number uncertainty and phase uncertainty, as indicated by directional arrows 910 and 912, respectively. Directional arrow 910 represents uncertainty in the phase angle $\phi$, which diminishes as $|\alpha|$ increases according to:

$$\Delta\phi = \frac{1}{2|\alpha|}$$

Because the phase uncertainty is inversely proportional to $|\alpha|$, the coherent state becomes better defined as the average number of photons is increased. Directional arrow 912 represents the photon-number uncertainty:

$$\Delta n = |\alpha|$$

The area of the uncertainty disk is:

$$\Delta\phi \Delta n = \frac{1}{2}$$

A measurement on the coherent state outputs the coherent signal $\Sigma$, which is represented by projecting the center of the uncertainty disk 906 onto the X-quadrature axis 902.

The angle $\Omega$ is a property of the measurement that can be set equal to zero by the experimentalist, which gives an X-quadrature-expectation value:

$$\langle \alpha | \hat{X} | \alpha \rangle = |\alpha| \cos\phi = K$$

A homodyne detection measurement outputs the X-quadrature-expectation value K as a function of the phase angle $\phi$ and the amplitude $|\alpha|$. The quantity measured is the difference between the numbers of photons arriving at two different photodetectors during a period of time. The homodyne detector measures photon numbers, or photon counts, and the effect is to produce measurements proportional to an electric field quadrature, enabled through the measurement of detector currents.

A probability amplitude associated with homodyne detection of the coherent state is given by a Gaussian function:

$$f(x, \beta) = \frac{1}{(2\pi)^{1/4}} \exp\left(-\frac{(x-2\beta)^2}{4}\right),$$

where $\beta$ is equal to $\alpha \cos\phi$, and x is the value signal output from the homodyne detection.

Figure 10:
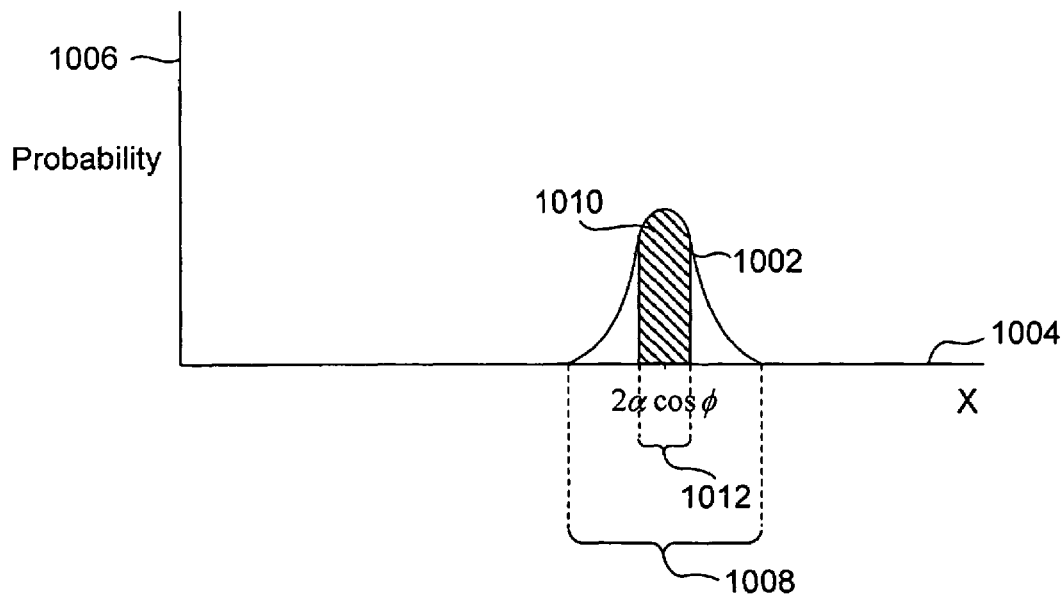
FIG. 10 is a plot of a probability distribution function associated with a coherent state.

Squaring the amplitude $f(x,\beta)$ gives the probability distribution of a homodyne measurement. FIG. 10 is a plot of a probability distribution 1002 associated with the coherent state representation shown in FIG. 9. Horizontal axis 1004 corresponds to X quadrature values, and vertical axis 1006 is a probability axis. The probability distribution 1002 is centered at $2\alpha \cos\phi$. A coherent signal output by a homodyne measurement falls within the region 1008. The probability that the coherent signal falls within a particular interval is associated with an area under the probability distribution 1002. For example, hash-marked region 1010 represents the probability that the homodyne detection gives a value in the interval 1012.

An Overview of Quantum Entanglement

A quantum system comprising a first quantum subsystem and a second quantum subsystem has a Hilbert space $H_A \otimes H_B$, where $H_A$ is a Hilbert space associated with the first quantum system, and $H_B$ is a Hilbert space associated with the second quantum system. The kets $|i\rangle_A$ represent the orthonormal eigenstates of the Hilbert space $H_A$, and the kets $|j\rangle_B$ represents the orthonormal eigenstates of the Hilbert space $H_B$, where i and j are positive integers. Any linear superposition of states in the Hilbert space $H_A \otimes H_B$ is given by:

$$|\Psi\rangle_{AB} = \sum_{i,j} c_{ij} |i\rangle_A |j\rangle_B,$$

where the amplitudes $c_{ij}$ are complex numbers satisfying the condition:

$$\sum_{ij} |c_{ij}|^2 = 1$$

Special kinds of linear superpositions of states $|\Psi\rangle_{AB}$ are called "direct product states" and are represented by the product:

$$|\Psi\rangle_{AB} = |\psi\rangle_A |\psi\rangle_B = \left(\sum_i c_i^{(A)} |i\rangle_A\right)\left(\sum_j c_j^{(B)} |j\rangle_B\right),$$

where $|\psi\rangle_A$ is a normalized linear superposition of states in the Hilbert space $H_A$;

and $|\psi\rangle_B$ is a normalized linear superposition of states in the Hilbert space $H_B$.

However, linear superpositions in the Hilbert space $H_A \otimes H_B$ that cannot be written as a product state are entangled states. In general, for a Hilbert space comprising two or more quantum subsystems, an entangled state is a linear superposition of states that cannot be written as a direct product state. The set of GHZ states are examples of entangled qubit states. For example, consider an entangled 4-qubit, GHZ state:

$$|\psi\rangle_{4004} = \frac{1}{\sqrt{2}}(|0\rangle_1|0\rangle_2|0\rangle_3|0\rangle_4 + |1\rangle_1|1\rangle_2|1\rangle_3|1\rangle_4)$$

Suppose a measurement performed on the first qubit system in the basis $\{|0\rangle_1, |1\rangle_1\}$ projects the state of the first qubit system onto the basis qubit state $|0\rangle_1$. According to the state $|\psi\rangle_{4004}$, the measurement also projects the state of the second, third, and fourth qubit systems onto the basis qubit states $|0\rangle_2$, $|0\rangle_3$, and $|0\rangle_4$, respectively. In addition, the state $|\psi\rangle_{4004}$ cannot be written as a product of the qubits $\alpha_1|0\rangle_1+\beta_1|1\rangle_1$, $\alpha_2|0\rangle_2+\beta_2|1\rangle_2$, $\alpha_3|0\rangle_3+\beta_3|1\rangle_3$, and $\alpha_4|0\rangle_4+\beta_4|1\rangle_4$, for any choice of the parameters $\alpha_1$, $\beta_1$, $\alpha_2$, $\beta_2$, $\alpha_3$, $\beta_3$, $\alpha_4$, and $\beta_4$.

Embodiments of the Present Invention

Various embodiments of the present invention are directed to methods for determining a phase shift $\phi$ acquired by entangled N-qubit systems. The entangled N-qubit systems are represented by a GHZ NOON state:

$$|\psi\rangle_{NOON} = \frac{1}{\sqrt{2}}(|N, 0\rangle + |0, N\rangle)$$

where $|N, 0\rangle$ represents the product state $|0\rangle_1 \ldots |0\rangle_N$; and $|0,N\rangle$ represents the product state $|1\rangle_1 \ldots |1\rangle_N$.

The entangled N-qubit systems accumulate a relative phase $e^{iN\phi}$ when each qubit system in the state $|1\rangle$ acquires the phase shift $\phi$, which is represented by the state:

$$|\psi_N\rangle = \frac{1}{\sqrt{2}}(|N, 0\rangle + e^{iN\varphi}|0, N\rangle)$$

The methods of the present invention separately interact each of the N-qubit systems with a probe electromagnetic field, but the N-qubit systems are kept separate to prevent qubit-system interactions. In different embodiments of the present invention, the qubit interactions with the probe electromagnetic field causes the probe electromagnetic field to acquire either a phase shift or a change in the average number of photons, which can then used to determine the phase shift $\phi$. For the sake of simplicity, methods of the present invention are described below with reference to an entangled 4-qubit system represented by the state:

$$|\psi_4\rangle = \frac{1}{\sqrt{2}}(|0000\rangle + e^{i4\varphi}|1111\rangle)$$

where the relative phase $e^{i4\phi}$ is accumulated when each qubit system in the state $|1\rangle$ of the tensor product $|1111\rangle$ acquires the unknown and sought after phase shift $\phi$.

Figure 11:
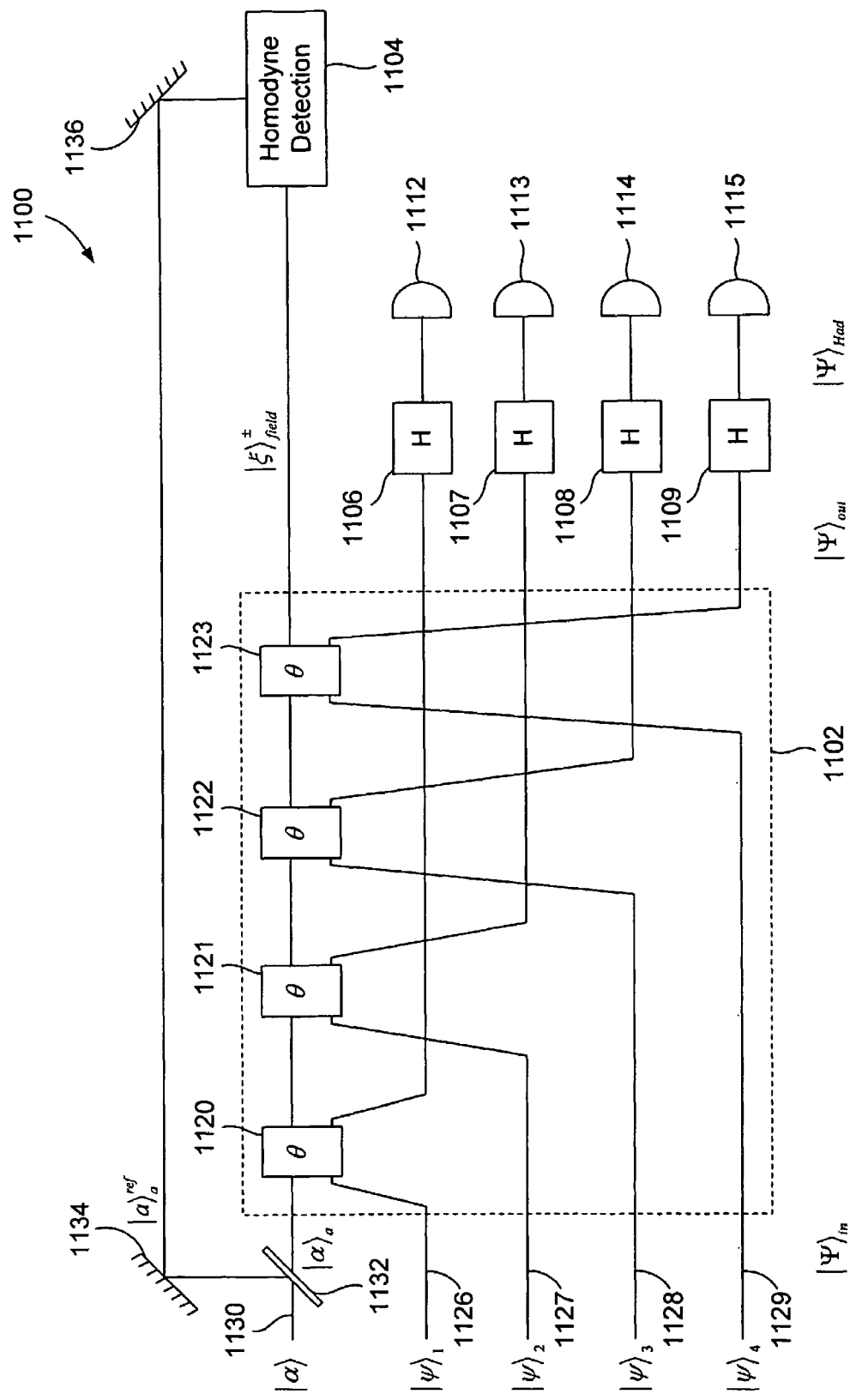
FIG. 11 illustrates a first implementation for determining a phase shift φ acquired by an entangled 4-qubit state that represents an embodiment of the present invention.

In a first embodiment of the present invention, the state $|\psi_4\rangle$ represents four entangled matter-based qubit systems that are each represented separately by the qubits $|\psi\rangle_1$, $|\psi\rangle_2$, $|\psi\rangle_3$, and $|\psi\rangle_4$. The qubits can represent, for example, two discrete energy levels of an atom or the spin-up and spin-down states of an electron. FIG. 11 illustrates a first implementation 1100 for determining the phase shift $\phi$ acquired by the state $|\psi_4\rangle$ that represents an embodiment of the present invention. The implementation 1100 comprises an interaction region 1102, homodyne detection 1104, four separate Hadamard gates 1106-1109, and four qubit detectors 1112-1115. The interaction region 1102 comprises four separate and identical interaction mediums 1120-1123 described below. Transmission channels 1126-1129 separately transmit four qubit systems to the interaction mediums 1120-1123, respectively, and to the Hadamard gates 1106-1109, respectively. The separate transmission channels 1126-1129 prevent the qubit systems from interacting with one another. A transmission channel 1130 transmits an electromagnetic field represented by a coherent state $|\alpha\rangle$ to a beamsplitter 1132, which divides the electromagnetic field into a probe electromagnetic field and a reference electromagnetic field. The probe electromagnetic field is represented by a coherent state $|\alpha\rangle_a$ of $|\alpha|^2$ and is called a "probe field." The probe field is transmitted to the interaction region 1102 and separately interacts with each of the qubit systems at each of the interaction mediums 1120-1123, respectively. The reference electromagnetic field is represented by a coherent state $|\alpha\rangle_a^{ref}$ and is called a "reference field." The reference field is directed by mirrors 1134 and 1136 to the homodyne detection 1104. The entangled 4-qubit systems and the probe field input to the interaction region 1102 are represented by an input state:

$$|\Psi\rangle_{in} = |\psi_4\rangle|\alpha\rangle_a$$
$$= \frac{1}{\sqrt{2}}(|0000\rangle|\alpha\rangle_a + e^{i4\varphi}|1111\rangle|\alpha\rangle_a)$$

The probe field and the reference field both have identical average photon numbers and identical phases. The probe field acquires a phase shift, represented by $g(\theta)$, as a result of interacting separately with each of the qubit systems at the interaction mediums 1120-1123. A resultant phase-shifted probe field, represented by the state $|\alpha e^{ig(\theta)}\rangle_a$, is output from the interaction region 1102. The phase shift $g(\theta)$ can be determined by comparing the state $|\alpha e^{ig(\theta)}\rangle_a$ of the phase-shifted probe field to the state $|\alpha\rangle_a^{ref}$ of the reference field at the homodyne detection 1104. As a result, the probe field input to the interaction region 1102 is initially thought of as having a phase angle equal to "0."

Figure 12:
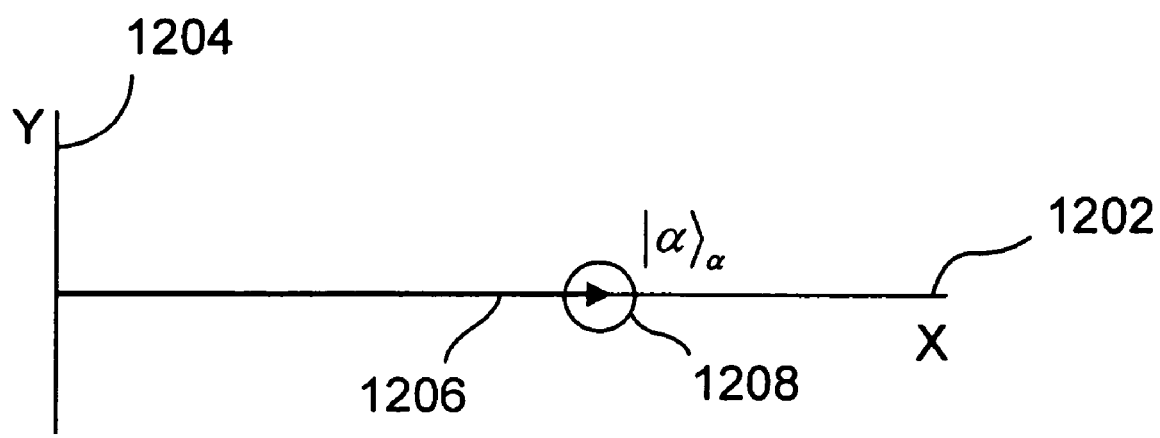
FIG. 12 is a phase space diagram of a probe field that represents an embodiment of the present invention.

FIG. 12 is a phase space diagram of the probe field input to the interaction region 1102, in FIG. 11, that represents an embodiment of the present invention. In FIG. 12, horizontal axis 1202 represents the continuous spectrum of X-quadrature expectation values, vertical axis 1204 represents the continuous spectrum of Y-quadrature expectation values, directional arrow 1206 represents the probe field, and disk 1208 represents the uncertainty in the phase angle and the uncertainty in the average number of photons in the state $|\alpha\rangle_a$ of the probe field. Note that the amplitude $|\alpha|$, or length, of the directional arrow 1206 represents an average number of photons in the probe field state $|\alpha\rangle_a$.

In FIG. 11, the interaction mediums 1120-1123 couple the probe field and the corresponding qubit system. The interaction mediums 1120-1123 each produce an electric, or magnetic, dipole interaction between the probe field and the corresponding qubit system that is represented by an interaction Hamiltonian:

$$\hat{H}_j^{(1)} = \hbar\chi(\hat{a}^\dagger\hat{a})\hat{\sigma}_{z,j}$$

where ($\hat{a}^\dagger\hat{a}$) is a number operator that operates on the number states of the probe field;

$\chi$ is a constant that represents the coupling strength between the probe field and the qubit system;

superscript "1" refers to the first embodiment;

subscript j is a qubit index; and $\hat{\sigma}_{z,j} = |0\rangle_{j\,j}\langle 0| - |1\rangle$ is an inversion operator.

The inversion operator $\hat{\sigma}_{z,j}$ operates on the qubit basis states as follows:

$$\hat{\sigma}_{z,j}|0\rangle_i = \delta_{ij}|0\rangle_i, \text{ and } \hat{\sigma}_{z,j}|1\rangle_i = -\delta_{ij}|1\rangle_i$$

The dipole interaction at each of the interaction mediums 1120-1123 occurs for a period of time t. Each dipole interaction is mathematically represented by a dipole time-evolution operator:

$$\hat{U}_j^{(1)} = \exp(-i\hat{H}_j^1 t/\hbar)$$
$$= \exp(-i\theta(\hat{a}^\dagger\hat{a})\hat{\sigma}_{z,j})$$

where $\theta$ is equal to the product $\chi t$.

The qubit systems pass unchanged through each of the interaction mediums 1120-1123. However, the dipole interaction between a single qubit system and the probe field, at an interaction medium, causes the probe field to acquire either a positive or a negative phase shift $\theta$ depending on whether the corresponding qubit system transmitted to the interaction medium is in the state $|0\rangle$ or in the state $|1\rangle$. For example, at the interaction medium 1120, a dipole interaction between a qubit system in the state $|0\rangle_1$ and the probe field in the state $|\alpha\rangle_a$ produces a phase-shifted probe field is the state $|\alpha e^{i\theta}\rangle_a$, which is mathematically represented by applying the dipole time-evolution operator $\hat{U}_1^{-1}$ as follows:

$$\hat{U}_1^{(1)}|0\rangle_1|\alpha\rangle_a = |0\rangle_1|\alpha e^{i\theta}\rangle_a$$

The dipole interaction between the qubit system in the state $|1\rangle_1$ and the probe field in the state $|\alpha\rangle_a$ at the interaction medium 1120 produces a phase-shifted probe field in the state $|\alpha e^{-i\theta}\rangle_a$, which is also mathematically represented by:

$$\hat{U}_1^{(1)}|1\rangle_1|\alpha\rangle_a = |1\rangle_1|\alpha e^{-i\theta}\rangle_a$$

Note that the dipole time-evolution operator $\hat{U}_1^{-1}$ does not change the state of the qubit basis states $|0\rangle$ and $|1\rangle$.

The interaction region 1102 receives a quantum system represented by the input state $|\Psi\rangle_{in}$ and outputs an entangled probe-qubit system represented by an entangled output state $|\Psi\rangle_{out}$. The output state $|\Psi\rangle_{out}$ is determined by successively applying the dipole time-evolution operator corresponding to each dipole interaction at the interaction mediums 1120-1123 as follows. First, the dipole interaction at the interaction medium 1120 produces a first entangled probe-qubit system whose state is determined as follows:

$$\hat{U}_1^{(1)}|\Psi\rangle_{in} = \frac{1}{\sqrt{2}}(\hat{U}_1^{(1)}|0000\rangle|\alpha\rangle_a + e^{i4\varphi}\hat{U}_1^{(1)}|1111\rangle|\alpha\rangle_a)$$

$$= \frac{1}{\sqrt{2}}\begin{pmatrix}(\hat{U}_1^{(1)}|0\rangle_1|\alpha\rangle_a)|0\rangle_2|0\rangle_3|0\rangle_4 + \\ e^{i4\varphi}(\hat{U}_1^{(1)}|1\rangle_1|\alpha\rangle_a)|1\rangle_2|1\rangle_3|1\rangle_4\end{pmatrix}$$

$$= \frac{1}{\sqrt{2}}(|0000\rangle|\alpha e^{i\theta}\rangle_a + e^{i4\varphi}|1111\rangle|\alpha e^{-i\theta}\rangle_a)$$

Next, in a similar manner, the first entangled probe-qubit system is input to the interaction medium 1121 produces a second entangled probe-qubit system whose state is represented by:

$$\hat{U}_2^{(1)}\hat{U}_1^{(1)}|\Psi\rangle_{in} = \frac{1}{\sqrt{2}}(|0000\rangle|\alpha e^{i2\theta}\rangle_a + e^{i4\varphi}|1111\rangle|\alpha e^{-i2\theta}\rangle_a)$$

Next, the second entangled probe-qubit system is input to the interaction medium 1122, which produces a third entangled probe-qubit quantum system whose state is represented by:

$$\hat{U}_3^{(1)}\hat{U}_2^{(1)}\hat{U}_1^{(1)}|\Psi\rangle_{in} = \frac{1}{\sqrt{2}}(|0000\rangle|\alpha e^{i3\theta}\rangle_a + e^{i4\varphi}|1111\rangle|\alpha e^{-i3\theta}\rangle_a)$$

Finally, the third entangled probe-qubit quantum system is input to the interaction medium 1123, which produces a fourth entangled probe-qubit system whose state is represented by:

$$|\Psi\rangle_{out} = \hat{U}_4^{(1)}\hat{U}_3^{(1)}\hat{U}_2^{(1)}\hat{U}_1^{(1)}|\Psi\rangle_{in}$$

$$= \frac{1}{\sqrt{2}}(|0000\rangle|\alpha e^{i4\theta}\rangle_a + e^{i4\varphi}|1111\rangle|\alpha e^{-i4\theta}\rangle_a)$$

Figure 13:
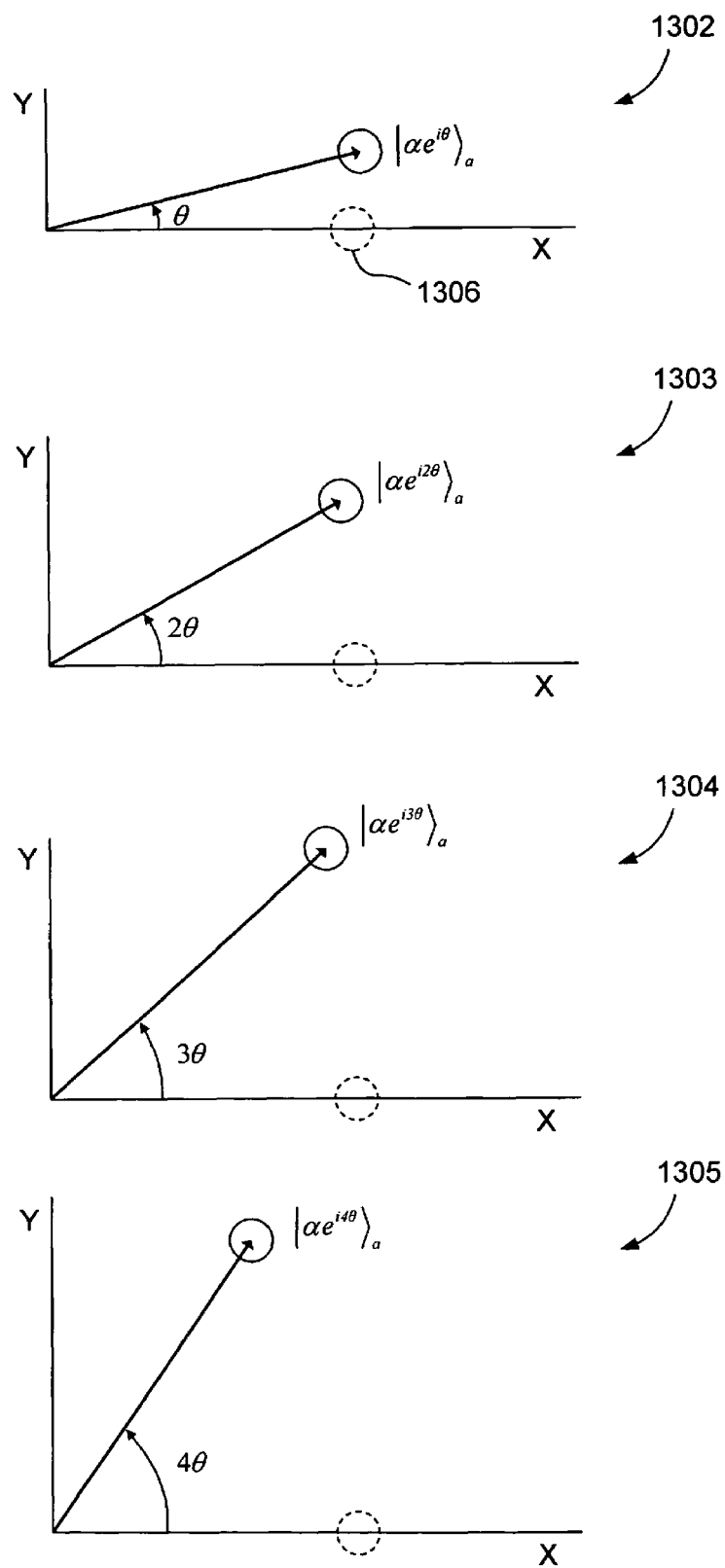
FIG. 13 shows four phase-space diagrams associated with each positive phase shift θ acquired by a probe field input to the first implementation, in FIG. 11, that represent embodiments of the present invention.

FIG. 13 shows four successive and separate phase-space diagrams 1302-1305 associated with a positive phase shift 9 acquired by the probe field at each of the interaction mediums 1120-1123, in FIG. 11, that represent an embodiment of the present invention. Each diagram, in FIG. 13, includes a dashed-line disk, such as disk 1306 in diagram 1302, that represents the uncertainty disk 1208 associated with the probe field initially in the state $|\alpha\rangle_a$, in FIG. 12. Diagrams 1302-1305 shows successive phase changes in the state of the probe field as a result of each dipole interaction between the probe field and the qubit systems in the tensor product state $|0000\rangle$ at the interaction mediums 1120-1123, respectively, in FIG. 11. For example, the probe field input to the interaction medium 1120 is initially in the state $|\alpha\rangle_a$ and is output from the interaction medium 1120 in the phase-shifted state $|\alpha e^{i\theta}\rangle_a$ as shown in diagram 1302.

Figure 14:
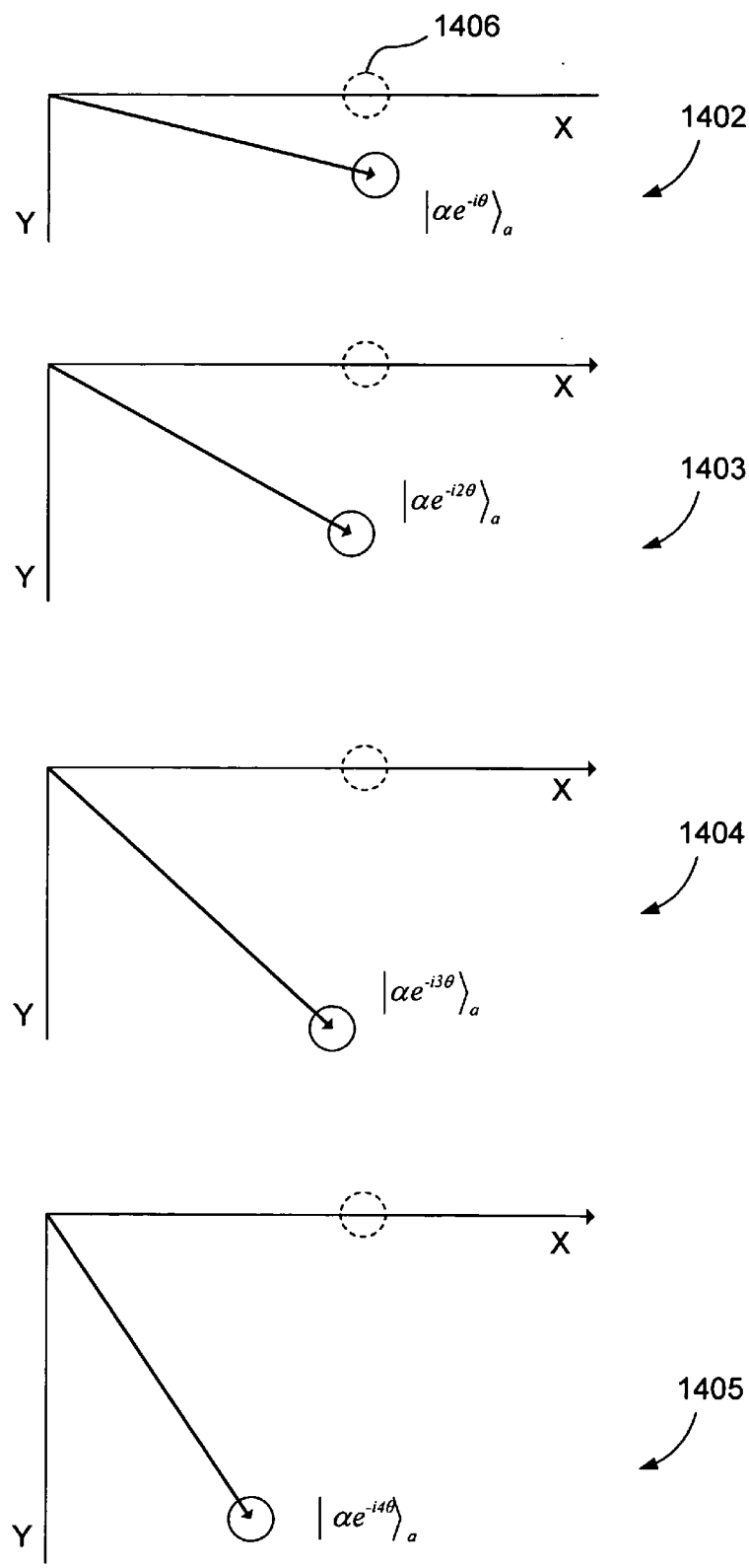
FIG. 14 shows four phase-space diagrams associated with each negative phase shift θ acquired by a probe field input to the implementation, in FIG. 11, that represent embodiments of the present invention.

FIG. 14 shows four successive and separate phase-space diagrams 1402-1405 associated with a negative phase shift θ acquired by the probe field at each interaction medium, in FIG. 11, that represent embodiments of the present invention. Each diagram, in FIG. 14, includes a dashed-line disk, such as disk 1406 in diagram 1402, that represents the uncertainty disk 1208 associated with the probe field initially in the state $|\alpha a\rangle_a$, in FIG. 12. Diagrams 1402-1405 shows successive phase changes in the state of the probe field as a result of each dipole interaction between the probe field and the qubit systems in the tensor product state $|1111\rangle$ at the interaction mediums 1120-1123, respectively, in FIG. 11. For example, the probe field input to the interaction medium 1120 is initially in the state $|\alpha\rangle_a$ and is output from the interaction medium 1120 in the phase-shifted state $|\alpha e^{-i\theta}\rangle_a$ as shown in diagram 1402.

The interaction region 1102, in FIG. 11, outputs an entangled probe-qubit system represented by the output state:

$$|\Psi\rangle_{out} = \frac{1}{\sqrt{2}}(|0000\rangle|\alpha e^{i4\theta}\rangle_a + e^{i4\varphi}|1111\rangle|\alpha e^{-i4\theta}\rangle_a)$$

The qubit systems are input to the Hadamard gates 1106-1109. Each of the Hadamard gates 1106-1109 performs a qubit system operation that is mathematically represented by the Hadamard operator:

$$\hat{H}_{Had} = \frac{1}{\sqrt{2}}(|0\rangle\langle 0| + |1\rangle\langle 0| + |0\rangle\langle 1| - |1\rangle\langle 1|)$$

The Hadamard gate operator operates on the qubit basis states $|0\rangle$ and $|1\rangle$ as follows:

$$\hat{H}_{Had}|0\rangle = \frac{1}{\sqrt{2}}(|0\rangle + \langle 1|), \text{ and}$$

$$\hat{H}_{Had}|1\rangle = \frac{1}{\sqrt{2}}(|0\rangle - \langle 1|)$$

The Hadamard gates 1106-1109 are used, with subsequent qubit measurements, to disentangle the probe field in the phase-shifted probe field states $|\alpha e^{i4\theta}\rangle$ and $|\alpha e^{i4\theta}\rangle_a$ from the qubit systems and transfer the phase shift φ to a linear superposition of the phase-shifted probe field states $|\alpha e^{-i4\theta}\rangle_a$ and $|e^{i4\theta}\rangle_a$. A Hadamard output state, $|\Psi\rangle_{Had}$, represents the quantum system output from the Hadamard gates 1106-1109 and is obtained as follows:

$$|\Psi\rangle_{Had} = \hat{H}_{Had}^{\otimes 4}|\Psi\rangle_{out}$$
$$= \frac{1}{\sqrt{2}}(\hat{H}_{Had}^{\otimes 4}|0000\rangle|\alpha e^{i4\varphi}\rangle_a + e^{i4\varphi}\hat{H}_{Had}^{\otimes 4}|1111\rangle|\alpha e^{i4\theta}\rangle_a)$$

Expanding the Hadamard gate operations $\hat{H}_{Had}^{\otimes 4}|0000\rangle$ and $\hat{H}_{Had}^{\otimes 4}|0000\rangle$ and rearranging the product states gives the Hadamard output state:

$$|\Psi\rangle_{Had} = \left(\frac{1}{4}|\Gamma\rangle_1 + \frac{\sqrt{6}}{4}|\Gamma\rangle_3 + \frac{1}{4}|\Gamma\rangle_5\right)|\xi\rangle_{field}^+ + \left(\frac{1}{2}|\Gamma\rangle_2 + \frac{1}{2}|\Gamma\rangle_4\right)|\xi\rangle_{field}^-$$

where $|\Gamma\rangle_1 = |0000\rangle$, $|\Gamma\rangle_2 = \frac{1}{2}(|1000\rangle + |0100\rangle + |0010\rangle + |0001\rangle)$, $|\Gamma\rangle_3 = \frac{1}{\sqrt{6}}(|1100\rangle + |1010\rangle + |1001\rangle + |0110\rangle + |0101\rangle + |0011\rangle)$, $|\Gamma\rangle_4 = \frac{1}{2}(|1110\rangle + |1101\rangle + |1011\rangle + |0111\rangle)$, $|\Gamma\rangle_5 = |1111\rangle$, $|\xi\rangle_{field}^{1+} = \frac{1}{\sqrt{2}}(|\alpha e^{i4\theta}\rangle + e^{i4\varphi}|\alpha e^{-i4\theta}\rangle)$, and $|\xi\rangle_{field}^{1-} = \frac{1}{\sqrt{2}}(|\alpha e^{i4\theta}\rangle - e^{i4\varphi}|\alpha e^{-i4\theta}\rangle)$ The states $|\xi\rangle_{field}^{1+}$ and $|\xi\rangle_{field}^{1-}$ are called "field states," and each field state represents the probe field in a different coherent linear superposition of the states $|\alpha e^{-i4\theta}\rangle_a$ and $|\alpha e^{i4\theta}\rangle_a$. Note that as a result of the Hadamard gate operations on the qubit systems in the output state $|\Psi\rangle_{out}$, the field states $|\xi\rangle_{field}^{1+}$ and $|\xi\rangle_{field}^{1-}$ have acquired the phase shift φ.

Whether the probe field is in the field state $|\xi\rangle_{field}^{1+}$ or in the field state $|\xi\rangle_{field}^{1-}$ when it reaches the homodyne detection 1104 is entirely random. However, the field state of the probe field that reaches the homodyne detection 1104 is determined by performing qubit measurements at the qubit detectors 1112-1115. The qubit measurements project the state of the probe field onto either the field state $|\xi\rangle_{field}^{1+}$ or the field state $|\xi\rangle_{field}^{1-}$. For example, suppose the quantum system represented by the Hadamard output state $|\Psi\rangle_{Had}$ reaches the qubit detectors 1112-1115, and the qubit measurements reveal that the qubits are in the tensor product state $|0100\rangle$ of the state $|\Gamma\rangle_2$ above. According to the Hadamard output state $|\Psi\rangle_{Had}$, the qubit measurements project the Hadamard output state $|\Psi\rangle_{Had}$ onto the state $|1010\rangle|\xi\rangle_{field}^{1+}$, which means that the state of the probe field just after the qubit measurements is the field state $|\xi\rangle_{field}^{1+}$. The homodyne detection 1104 measures the electric field intensity, or X-quadrature-expectation value, of the probe field as functions of the phase angle associated with the phase-shifted probe fields $|\alpha e^{-i4\theta}\rangle_a$ and $|\alpha e^{i4\theta}\rangle_a$.

In order to determine the phase shift p acquired by the probe field in the field states $|\xi\rangle_{field}^{1+}$ and $|\xi\rangle_{field}^{1-}$, a large number of input states $|\Psi\rangle_{in}$ are input to the implementation 1100. After each of the qubit measurements, the homodyne detection 1104 X-quadrature-expectation values are stored in two of different data sets according to whether the probe field is in the field state $|\xi\rangle_{field}^{1+}$ or in the field state $|\xi\rangle_{field}^{1-}$. For example, when a qubit measurement projects the state of the probe field onto the field state $|\xi\rangle_{field}^{1+}$, the corresponding X-quadrature-expectation value is stored in a first data set, and when a subsequent qubit measurement projects the state of the probe field onto the field state $|\xi\rangle_{field}^{1-}$, the corresponding X-quadrature-expectation value is stored in a second data set. The homodyne detection 1104 X-quadrature-expectation values can be stored electronically, magnetically, or optically and can be processed using logical operations encoded in computer programs.

Figure 15A:
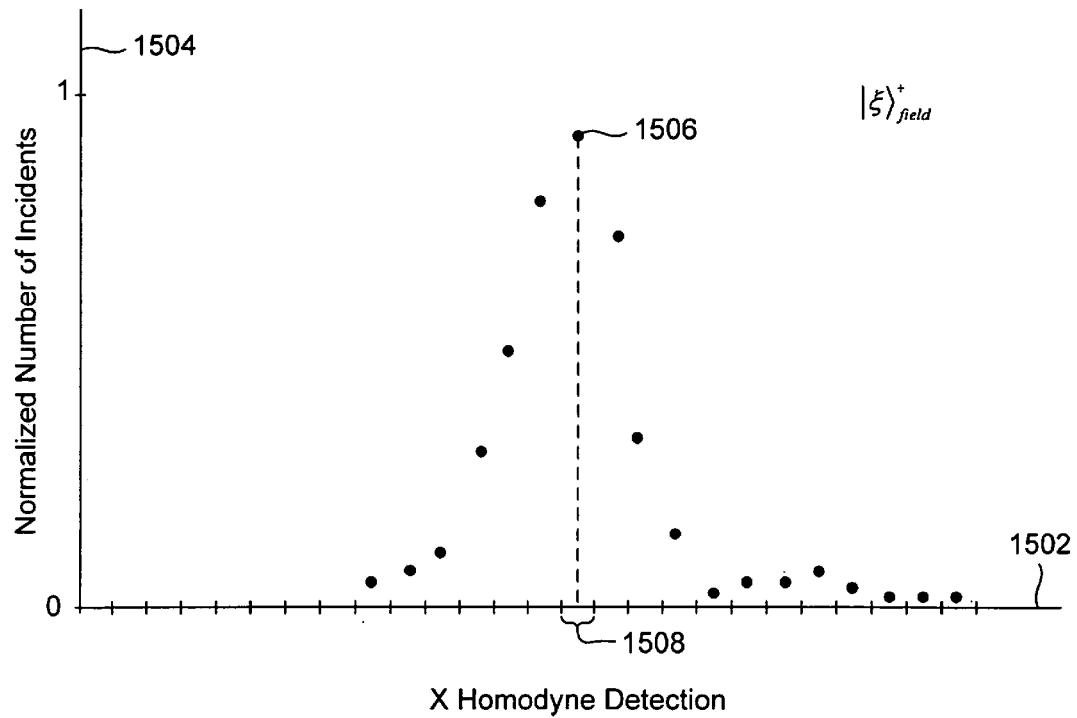
FIGS. 15A-15B are diagrams of example frequency distributions associated with a large number of hypothetical homodyne-detection results that represent embodiments of the present invention.
Figure 15B:
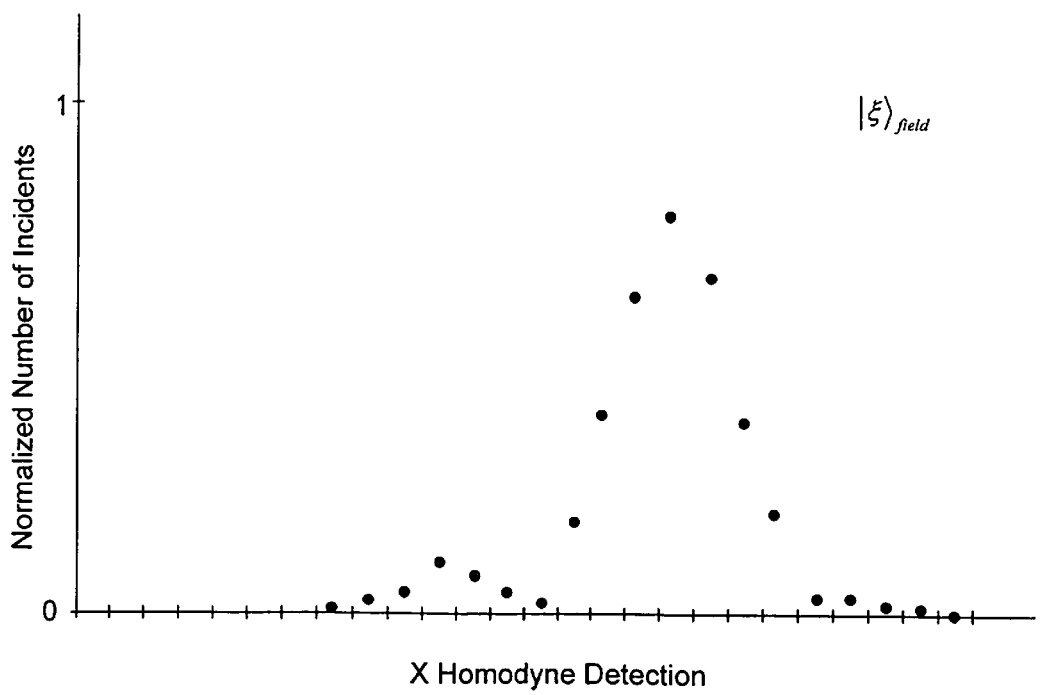

The first data set and the second data set are used to produce a first frequency distribution and a second frequency distribution, respectively. FIGS. 15A-15B are diagrams of example frequency distributions associated with a large number of hypothetical homodyne-detection results obtained for the probe field in the field states $|\xi\rangle_{field}^{1+}$ and $|\xi\rangle_{field}^{1-}$, respectively, that represent embodiments of the present invention. The example frequency distributions are obtained from a large number of hypothetical executions of the implementation 1100 described above with reference to FIG. 11. In FIGS. 15A-15B, horizontal axes, such as horizontal axis 1502 in FIG. 15A, represent continuous spectrums of X-quadrature-expectation values, and vertical axes, such as vertical axis 1504 in FIG. 15A, are normalized number of incidents axes. Each point represents a fraction of X-quadrature-expectation values that fall within a particular X-quadrature-expectation-value interval. The value associated with each point can be determined by averaging the number of the X-quadrature-expectation values that fall within each of the X-quadrature-expectation-value intervals. For example, point 1506 represents the fraction of X-quadrature-expectation values that fall within X-quadrature-expectation-value interval 1508. After a large number of hypothetical executions of the implementation 1100, the fraction associated with each point can also be thought of as the probability of a subsequent X-quadrature-expectation value falling within a particular X-quadrature-expectation-value interval. For example, the fraction associated with the point 1506 is the probability that a subsequent X-quadrature-expectation value associated with a probe field in the field state $|\xi\rangle_{field}^{1+}$ falls within the X-quadrature-expectation-value interval 1508.

Either of the frequency distributions shown in FIGS. 15A-15B can be used to determine the phase shift φ. Consider using the first frequency distribution in FIG. 15A. Applying the homodyne-detection operator $|x\rangle\langle x|$ to the field state $|\xi\rangle_{field}^{1+}$ gives:

$$|x\rangle\langle x|\xi\rangle_{field}^+ = F^+(x)|x\rangle$$
$$= \frac{1}{\sqrt{2}} f(x)(e^{i\phi(x)} + e^{i4\phi}e^{-i\phi(x)})|x\rangle,$$

where $$f(x) = \frac{1}{(2\pi)^{1/4}} \exp\left(-\frac{(x-2\alpha\cos 4\theta)^2}{4}\right), \text{ and}$$

$$\phi(x) = \alpha \sin 4\theta(x - 2\alpha \cos 4\theta) \mod 2\pi.$$

The coefficient $F^+(x)$ is called a "probability amplitude," which can be used to determine the probability distribution associated with the field state $|\xi\rangle_{field}^{1+}$ as follows:

$$P^+(x) = F^+(x) \cdot F^{+*}(x)$$
$$= f^2(x)(1 + \cos(2\phi(x) - 4\varphi))$$

A least squares method, or other data fitting methods, can be used to fit the probability distribution $P^+(x)$ to the corresponding frequency distribution, in FIG. 15A, as function of the phase shift q). The probability distribution $P^+(x)$ is least squares fit to the points in the first frequency distribution by minimizing the sum of the squares of the distances between the frequency-distribution points and the probability distribution $P^+(x)$ as a function of the phase shift φ. The optimal phase shift φ determined by the least squares method gives a best fit probability distribution $P^+(x)$ to the frequency-distribution points. The least squares method, or other data fitting methods, can be used to determine the optimal phase shift φ using the probability distribution $P^-(x)$ and the second frequency distribution, in FIG. 15B.

Figure 16:
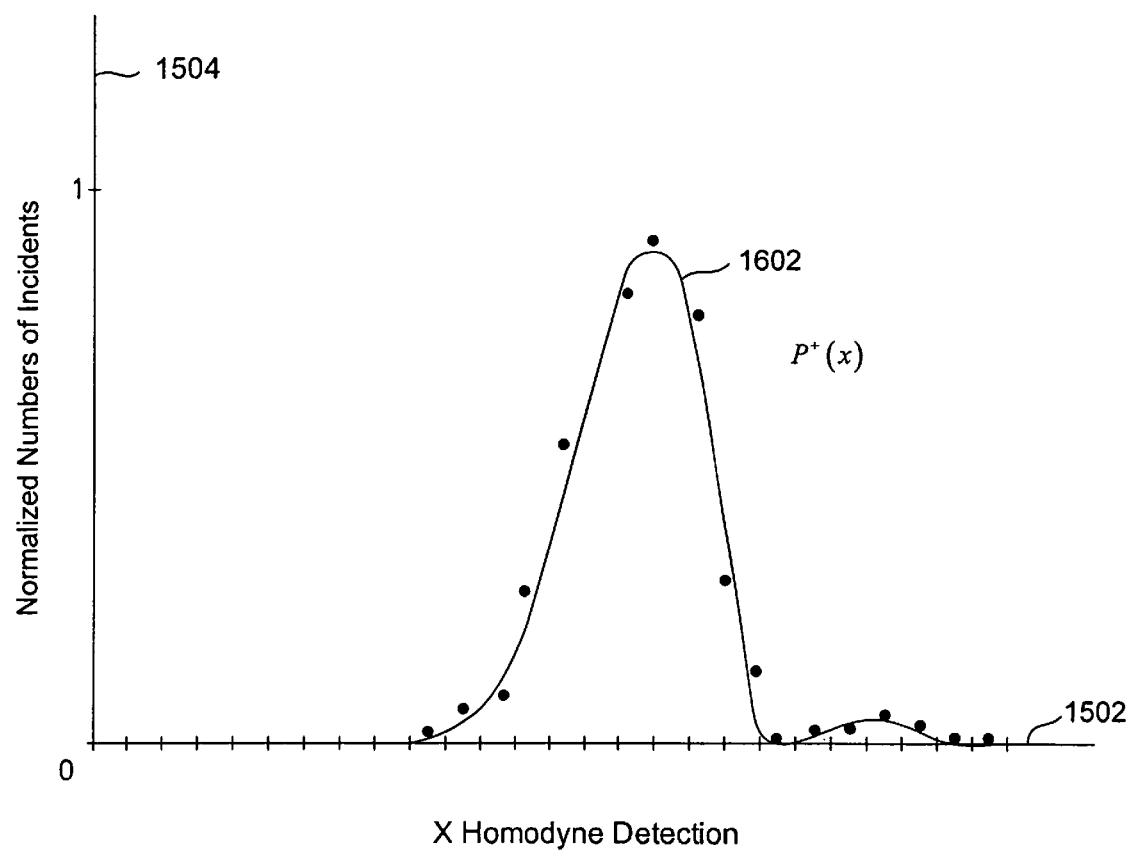
FIG. 16 is a diagram of a probability distribution fit to the frequency distribution shown in FIG. 15A that represents an embodiment of the present invention.

FIG. 16 is a diagram of the probability distribution $P^+(x)$ fit to the frequency distribution shown in FIG. 15A that represents an embodiment of the present invention. In FIG. 16, curve 1602 represents the probability distribution $P^+(x)$ fit to the points of the frequency distribution in FIG. 15A for a hypothetical optimal phase shift φ.

Figure 17:
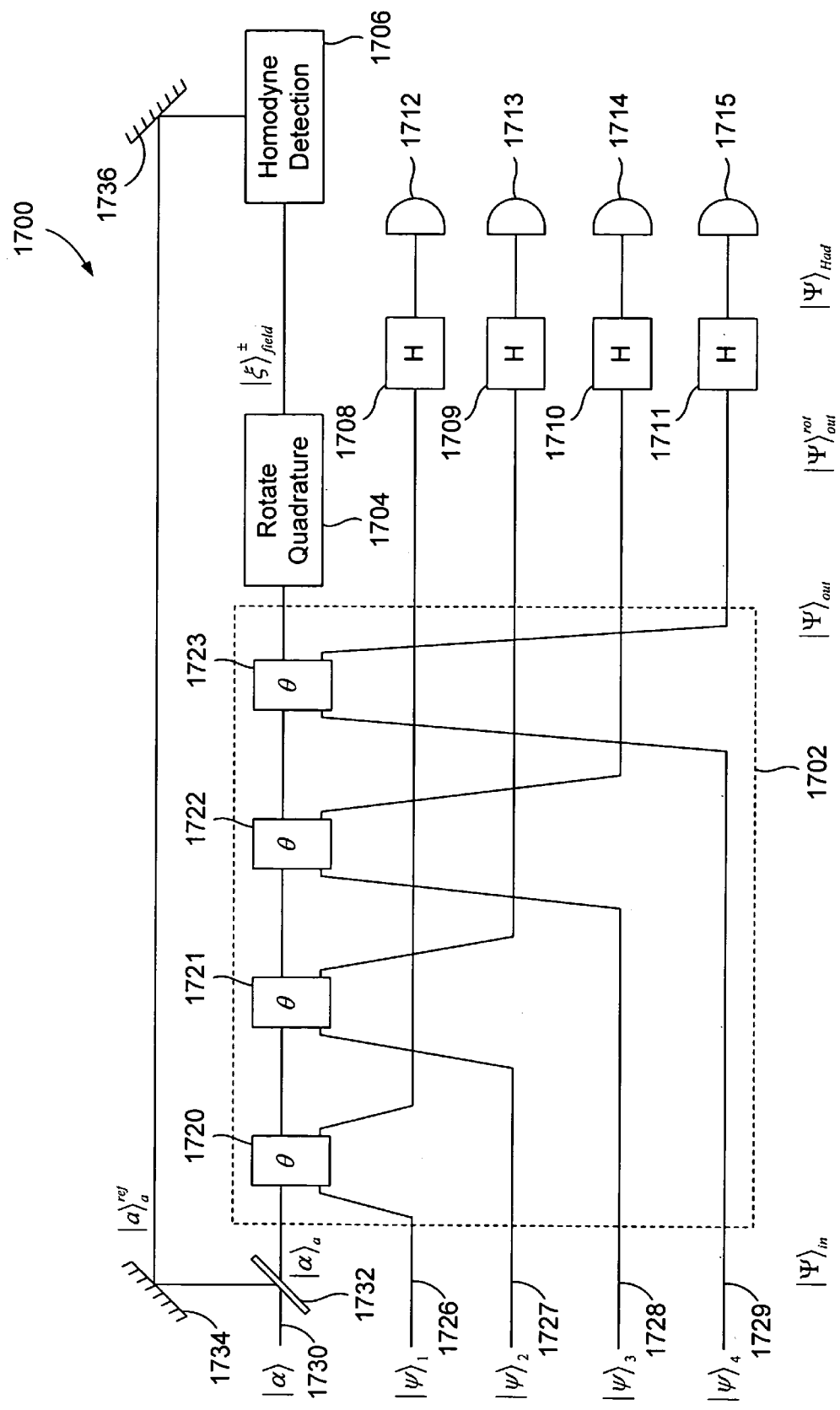
FIG. 17 illustrates a second implementation for determining the phase shift φ acquired by an entangled 4-qubit state that represents an embodiment of the present invention.

In a second embodiment of the present invention, the state $|\psi_4\rangle$ represents four entangled optical qubit systems, each represented separately by the qubits $|\psi\rangle_1, |\psi\rangle_2, |\psi\rangle_3,$ and $|\psi\rangle_4$. An optical qubit system can, for example, represent the two photon states of an electromagnetic field or vertically and horizontally polarized photons. FIG. 17 illustrates a second implementation 1700 for determining the phase shift φ acquired by the state $|\psi_4\rangle$ that represents an embodiment of the present invention. The implementation 1700 comprises an interaction region 1702, rotate quadrature operation 1704, homodyne detection 1706, four separate Hadamard gates 1708-1711, and four qubit detectors 1712-1715. The interaction region 1702 comprises four separate and identical cross-Kerr interaction mediums 1720-1723 described below. Transmission channels 1726-1729 separately transmit the four qubit systems to the interaction mediums 1720-1723 and to the Hadamard gates 1708-1711, respectively. The separate transmission channels 1726-1729 prevent the qubit systems from interacting with one another. A transmission channel 1730 receives an electromagnetic field represented by a coherent state $|\alpha\rangle$. A beamsplitter 1732 divides the electromagnetic field into a probe field and a reference field as described above with reference to FIG. 11. The probe field is represented by coherent state $|\alpha\rangle_a$, and the reference field is represented by the coherent state $|\alpha\rangle_a^{ref}$. The reference field is directed by mirrors 1734 and 1736 to the homodyne detection 1706. The four qubit systems and the probe field are input to the interaction region 1702 and are represented by the input state $|\Psi\rangle_{in}$ described above with reference to FIG. 11. The probe field interacts separately with each of the qubit systems at each of the interaction mediums 1720-1723, respectively. As described above with reference to FIG. 12, the probe field input to the interaction region 1702 is initially thought of as having a phase angle equal to "0."

The interaction mediums 1720-1723 separately couple the probe field to each qubit system. The interaction at each of the cross-Kerr interaction mediums 1720-1723 is represented by a cross-Kerr interaction Hamiltonian:

$$\hat{H}_j^{(2)} = \hbar\chi(\hat{a}^\dagger\hat{a})(\hat{b}^\dagger\hat{b})_j$$

where
superscript "2" refers to the second embodiment; and
$(\hat{b}^\dagger\hat{b})$ is a number operator that operates on the qubits.

The number operator $(\hat{b}^\dagger\hat{b})_j$ operates on the photon basis states as follows:

$$(\hat{b}^\dagger\hat{b})_j|0\rangle_j = 0, \text{ and } (\hat{b}^\dagger\hat{b})_j|1\rangle_j = 1\cdot|1\rangle_j$$

The cross-Kerr interaction at each of the interaction mediums 1720-1723 occurs for a period of time t and is mathematically represented by a cross-Kerr time-evolution operator:

$$\hat{U}_j^{(2)} = \exp(-i\hat{H}_j^2 t/\hbar)$$
$$= \exp(-i\theta(\hat{a}^\dagger\hat{a})(\hat{b}^\dagger\hat{b})_j)$$

where

θ is equal to the product χt.

The qubit systems pass unchanged through each of the interaction mediums 1720-1723. However, the cross-Kerr interaction between a qubit system in the state $|0\rangle$ and the probe field leaves both the qubit $|0\rangle$ and the probe field in the coherent state $|\alpha\rangle_a$ unchanged, but the cross-Kerr interaction between a qubit system in the state $|1\rangle$ and the probe field causes the probe field to acquire a negative phase shift θ. For example, at the interaction medium 1120, a cross-Kerr interaction between a qubit system in the state $|1\rangle_1$ and the probe field in the coherent state $|\alpha\rangle_a$ produces a phase-shifted probe field state $|\alpha e^{-i\theta}\rangle_a$ which is mathematically determined by:

$$\hat{U}_1^{(2)}|1\rangle_1|\alpha\rangle_a = |1\rangle_1|\alpha e^{-i\theta}\rangle_a$$

Note that the cross-Kerr time-evolution operator $\hat{U}_j^2$ does not change the state of the qubit basis states.

The interaction region 1702 outputs an entangled probe-qubit system represented by the output state:

$$|\Psi\rangle_{out} = \frac{1}{\sqrt{2}}(|0000\rangle|\alpha\rangle_a + e^{i4\varphi}|1111\rangle|\alpha e^{-i4\theta}\rangle_a)$$

The output state $|\Psi\rangle_{out}$ can be determined mathematically by successively and separately applying the cross-Kerr time-evolution operators associated with each of the cross-Kerr interaction mediums 1720-1723, as described above with reference to the interaction region 1102 in FIG. 11.

The probe fields $|\alpha\rangle_a$ and $|\alpha e^{-i4\theta}\rangle_a$ in the output state $|\Psi\rangle_{out}$ are transmitted to the rotate quadrature operation 1704, which produces a probe field phase shift of 2θ. The rotate quadrature operation 1704 is mathematically represented by a rotation operator, $\exp(i2\theta\hat{a}^\dagger\hat{a})$, which when applied to the output state $|\Psi\rangle_{out}$ gives the state:

$$|\Psi\rangle_{out}^{rot} = \exp(i2\theta\hat{a}^\dagger\hat{a})|\Psi\rangle_{out}$$
$$= \frac{1}{\sqrt{2}}\begin{pmatrix} |0000\rangle\exp(i2\theta\hat{a}^\dagger\hat{a})|\alpha\rangle_a + \\ e^{i4\varphi}|1111\rangle\exp(i2\theta\hat{a}^\dagger\hat{a})|\alpha e^{-i4\theta}\rangle_a \end{pmatrix}$$
$$= \frac{1}{\sqrt{2}}(|0000\rangle|\alpha e^{i2\theta}\rangle_a + e^{i4\varphi}|1111\rangle|\alpha e^{-i2\theta}\rangle_a)$$

Figure 18A:
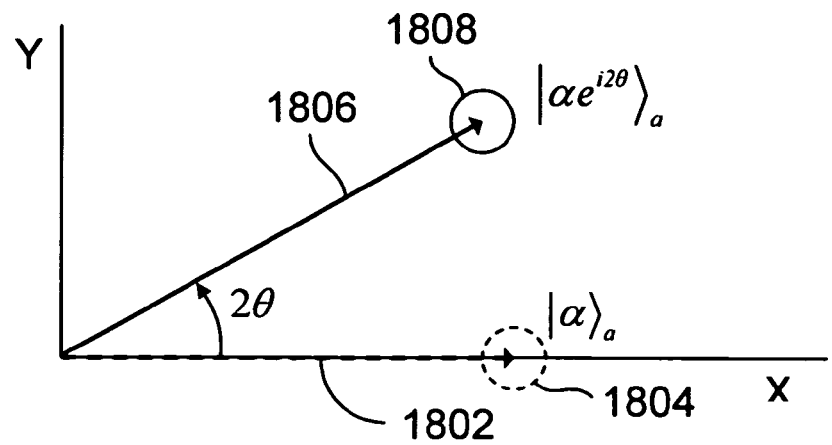
FIGS. 18A-18B are phase-space diagrams of a phase-shifted probe field output from a rotate quadrature operation, in FIG. 17, that represents an embodiment of the present invention.
Figure 18B:
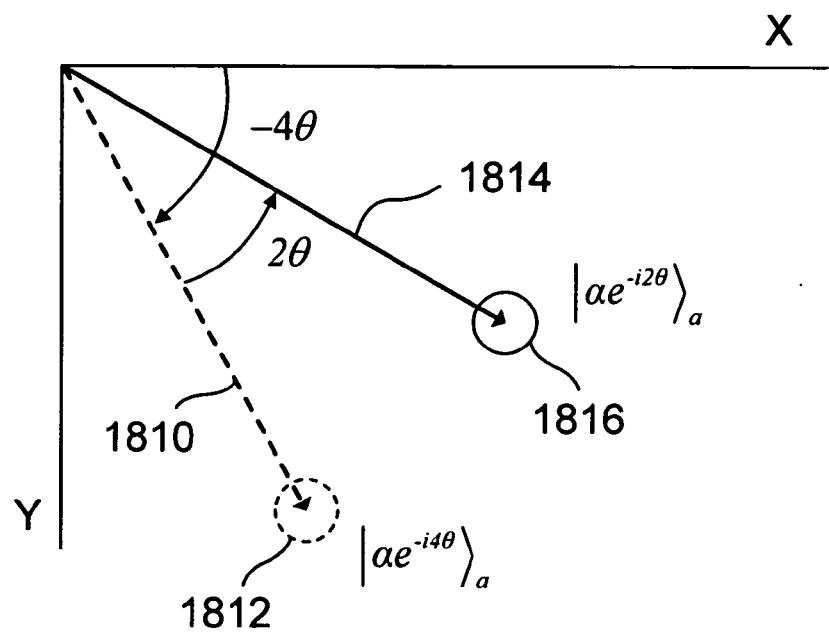

FIGS. 18A-18B are phase-space diagrams of 2θ phase-shifted probe fields output from the rotate quadrature operation 1704, in FIG. 17, that represents an embodiment of the present invention. In FIG. 18A, the probe field, represented by a dashed-line directional arrow 1802 and uncertainty disk 1804, is transformed into phase-shifted probe field state $|\alpha e^{i2\theta}\rangle_a$, which is represented by directional arrow 1806 and uncertainty disk 1808. In FIG. 18B, the phase-shifted probe field state $|\alpha e^{-i4\theta}\rangle_a$, represented by a dashed-line directional arrow 1810 and uncertainty disk 1812, is transformed into a phase-shifted probe field state $|\alpha e^{i2\theta}\rangle_a$, which is represented by directional arrow 1814 and uncertainty disk 1816.

The qubits represented in the output state $|\Psi\rangle_{out}^{rot}$ are input to the Hadamard gates 1708-1711. The Hadamard gates 1708-1711, with subsequent qubit measurements, disentangle the phase-shifted probe fields from the entangled qubit systems represented by the output state $|\Psi\rangle_{out}^{rot}$. A Hadamard output state output from the Hadamard gates 1708-1711 is mathematically determined as described above with reference to FIG. 11 and is given by:

$$|\Psi\rangle_{Had} = \hat{H}_{Had}^{\otimes 4}|\Psi\rangle_{out}^{rot}$$
$$= \left(\frac{1}{4}|\Gamma\rangle_1 + \frac{\sqrt{6}}{4}|\Gamma\rangle_3 + \frac{1}{4}|\Gamma\rangle_5\right)|\xi\rangle_{field}^{2+} + \begin{pmatrix} \frac{1}{2}|\Gamma\rangle_2 + \\ \frac{1}{2}|\Gamma\rangle_4 \end{pmatrix}|\xi\rangle_{field}^{2-}$$

where $$|\xi\rangle_{field}^{2+} = \frac{1}{\sqrt{2}}(|\alpha e^{i2\theta}\rangle + e^{i4\varphi}|\alpha e^{-i2\theta}\rangle), \text{ and}$$

$$|\xi\rangle_{field}^{2-} = \frac{1}{\sqrt{2}}(|\alpha e^{i2\theta}\rangle - e^{i4\varphi}|\alpha e^{-i2\theta}\rangle).$$

The field states $|\xi\rangle_{field}^{2+}$ and $|\xi\rangle_{field}^{2-}$ represent two coherent linear superpositions of the probe field states, which have both acquired the phase shift (P. The field state that reaches the homodyne detection 1104 is determined by the qubit measurements performed at the qubit detectors 1712-1715. The qubit measurements project the state of the probe field onto either the field state $|\xi\rangle_{field}^{2+}$ or onto the field state $|\xi\rangle_{field}^{2-}$, as described above with reference to FIG. 11.

In order to determine the phase shift φ acquired by the probe field in the states $|\xi\rangle_{field}^{2+}$ and $|\xi\rangle_{field}^{2-}$, a large number of identically prepared input states $|\Psi\rangle_{in}$ are successively input to the implementation 1700. After each of the qubit measurements, X-quadrature-expectation values collected from the homodyne detection 1706 are stored in a first data set when the probe field is found in the field state $|\xi\rangle_{field}^{2+}$, and X-quadrature-expectation values are stored in a second data set when the probe field is found in the field state $|\xi\rangle_{field}^{2-}$. The first data set is used to produce a first frequency distribution associated with the field state $|\xi\rangle_{field}^{2+}$, and the second data set is used to produce a second frequency distribution associated with the field state $|\xi\rangle_{field}^{2-}$, as described above with reference to FIGS. 15A-15B.

As described above with reference to FIGS. 15A-16, either the first or the second frequency distribution can be used to determine the phase shift φ. For example, the probability amplitudes associated with the probe field in the field state $|\xi\rangle_{field}^{2+}$ is:

$$F^+(x) = \frac{1}{\sqrt{2}} f(x)(e^{i\phi(x)} + e^{i4\varphi} e^{-i\phi(x)})$$

where $$f(x) = \frac{1}{(2\pi)^{1/4}} \exp\left(-\frac{(x - 2\alpha\cos 2\theta)^2}{4}\right), \text{ and}$$

$$\phi(x) = \alpha\sin 2\theta(x - 2\alpha\cos 2\theta) \bmod 2\pi.$$

The probability distribution associated with the probe field in the field state $|\xi\rangle_{field}^{2+}$ is:

$$P^+(x) = f^2(x)(1 + \cos(2\phi(x) - 4\varphi)).$$

An optimal phase shift $\phi$ value can be determined by applying a least squares method, or other curve fitting method, to fit the probability distribution $P^+(x)$ to the data points of the first frequency distribution, as describe above with reference to FIG. 16. Note also the probability distribution $P^-(x)$ associated with the second frequency distribution can also be used to determine the optical phase shift (value.

Figure 19:
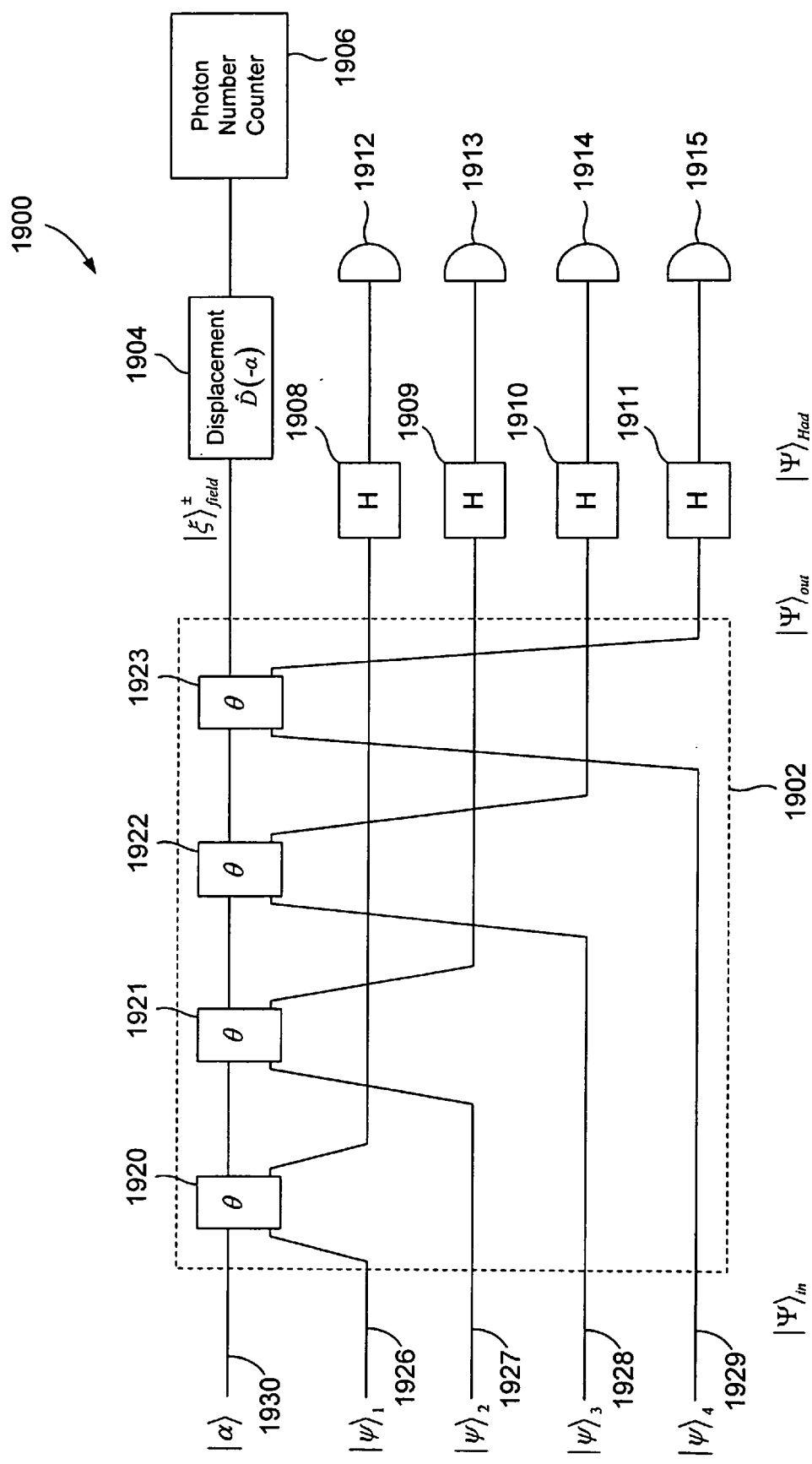
FIG. 19 illustrates a third implementation for determining a phase shift φ acquired by an entangled 4-qubit state that represents an embodiment of the present invention.

FIG. 19 illustrates a third implementation 1900 for determining the phase shift $\phi$ acquired by qubit systems represented by the state $|\psi_4\rangle$ that represents an embodiment of the present invention. The implementation 1900 comprises an interaction region 1902, displacement operation 1904, photon number counter 1906, four separate Hadamard gates 1908-1911, and four qubit detectors 1912-1915. The interaction region 1902 comprises four separate and identical interaction mediums 1920-1923 described below. Transmission channels 1926-1929 separately transmit four qubit systems to the interaction mediums 1920-1923, respectively. The separate transmission channels 1926-1929 prevent the qubit systems from interacting with one another. A transmission channel 1930 transmits a probe field represented by the coherent state $|\alpha\rangle_a$ to the interaction region 1902. The four entangled qubit systems and the probe field input to the interaction region 1902 are represented by the input state $|\Psi\rangle_{in}$. The input state $|\psi_4\rangle$ represents four entangled two-state, matter-based qubit systems that are each represented by the qubits $|\psi\rangle_1$, $|\psi\rangle_2$, $|\psi\rangle_3$, and $|\psi\rangle_4$. The probe field separately interacts with each of the qubit systems at each of the interaction mediums 1920-1923, respectively. The probe field input to the interaction region 1902 is initially thought of as having a phase angle equal to "0" as shown in FIG. 12.

The interaction mediums 1920-1923 separately couple the probe field to each qubit system and produce an electric, or magnetic, dipole interaction between the probe field and each of the qubit systems at each of the interaction mediums. The dipole interaction at each interaction medium is characterized by an interaction Hamiltonian:

$$\hat{H}_{a,j}^{(\gamma)} = \hbar\chi\hat{\sigma}_{z,j}(\hat{a}^\dagger e^{i\gamma} + \hat{a}e^{-i\gamma})$$

where $\hat{a}^\dagger e^{i\gamma} + \hat{a}e^{-i\gamma}$ is a quadrature operator that operates on the probe field $|\alpha\rangle_a$; and $\gamma$ is a dipole interaction parameter.

When the dipole interaction parameter $\gamma$ equals "$-\pi/2$," the quadrature operator is a Y-quadrature operator, and when the parameter $\gamma$ equals "0," the quadrature operator is an X-quadrature operator.

The dipole interaction at each of the interaction mediums 1920-1923 occurs for a period of time t and, in general, is mathematically represented by a dipole time-evolution operator:

$$\hat{U}_j^{(\gamma)} = \exp(-i\hat{H}_{a,j}^\gamma t/\hbar)$$
$$= \hat{D}(\hat{\sigma}_{z,j}\eta(\gamma))$$

where $\hat{D}(\hat{\sigma}_{z,j}\eta(\gamma)) = \exp(\hat{\sigma}_{z,j}\eta(\gamma)\hat{a}^\dagger - \hat{\sigma}_{z,j}\eta^*(\gamma)\hat{a})$ is also called the "displacement operator;" and $\eta(\gamma) = \theta e^{i(\gamma - \pi/2)}$.

In a third embodiment of the present invention, the dipole interaction parameter $\gamma$ associated with each of the interaction mediums 1920-1923 equals "$-\pi/2$." As a result, the dipole-time evolution operator is mathematically represented by the displacement operator:

$$\hat{U}_j^{(\pi/2)} = \hat{D}\left(\hat{\sigma}_{z,j}\eta\left(-\frac{\pi}{2}\right)\right) = \exp(\theta\hat{\sigma}_{z,j}(\hat{a} - \hat{a}^\dagger))$$

The qubit systems pass unchanged through each of the interaction mediums 1920-1923. The dipole interaction at the interaction mediums changes the average number of photons associated with the probe field depending on whether the qubit system transmitted to the interaction medium is in the state $|0\rangle$ or in the state $|1\rangle$. For example, at the interaction medium 1920, a dipole interaction between a qubit system in the state $|0\rangle_1$ and the probe field in the state $|\alpha\rangle_a$ produces a displaced probe field state $|\alpha+\theta\rangle_a$, which is mathematically determined by applying the displacement operator $\hat{U}_1^{(\pi/2)}$ as follows:

$$\hat{U}_1^{(\pi/2)}|0\rangle_1|\alpha\rangle_a = |0\rangle_1|\alpha+\theta\rangle_a$$

The dipole interaction between the qubit system in the state $|1\rangle_1$ and the probe field in the state $|\alpha\rangle_a$ at the interaction medium 1120 produces a displaced probe field in the state $|\alpha-\theta\rangle_a$, which is also mathematically determined by:

$$\hat{U}_1^{(\pi/2)}|1\rangle_1|\alpha\rangle_a = |1\rangle_1|\alpha-\theta\rangle_a$$

Note that the displacement operator $\hat{U}_1^{(\pi/2)}$ does not change the state of the qubit basis states.

The interaction region 1902 receives a quantum system represented by the input state $|\Psi\rangle_{in}$ and outputs an entangled probe-qubit system represented by an entangled output state $|\Psi\rangle_{out}$. The output state $|\Psi\rangle_{out}$ is determined by successively applying the displacement operator associated with each interaction medium as follows. First, the dipole interaction at the interaction medium 1920 produces a first entangled probe-qubit system whose state is represented by:

$$\hat{U}_1^{(\pi/2)}|\Psi\rangle_{in} = \frac{1}{\sqrt{2}}\begin{pmatrix}(\hat{U}_1^{(\pi/2)}|0\rangle_1|\alpha\rangle_a)|0\rangle_2|0\rangle_3|0\rangle_4 + \\ e^{i4\varphi}(\hat{U}_1^{(\pi/2)}|1\rangle_1|\alpha\rangle_a)|1\rangle_2|1\rangle_3|1\rangle_4\end{pmatrix}$$

$$= \frac{1}{\sqrt{2}}(|0000\rangle|\alpha+\theta\rangle_a + e^{i4\varphi}|1111\rangle|\alpha-\theta\rangle_a)$$

The first entangled probe-qubit system is input to the interaction medium 1921, which produces a second entangled probe-qubit system whose state is represented by:

$$\hat{U}_2^{(\pi/2)} \hat{U}_1^{(\pi/2)} |\Psi\rangle_{in} = \frac{1}{\sqrt{2}} (|0000\rangle |\alpha + 2\theta\rangle_a + e^{i4\varphi} |1111\rangle |\alpha - 2\theta\rangle_a)$$

The second entangled probe-qubit system is input to the interaction medium 1922, which produces a third entangled probe-qubit system whose state is represented by:

$$\hat{U}_3^{(\pi/2)} \hat{U}_2^{(\pi/2)} \hat{U}_1^{(\pi/2)} |\Psi\rangle_{in} = \frac{1}{\sqrt{2}} \begin{pmatrix} |0000\rangle |\alpha + 3\theta\rangle_a + \\ e^{i4\varphi} |1111\rangle |\alpha - 3\theta\rangle_a \end{pmatrix}$$

Finally, the third entangled probe-qubit system is input to the interaction medium 1923, which produces a fourth entangled probe-qubit system whose state is represented by:

$$|\Psi\rangle_{out} = \hat{U}^{(\pi/2)} \hat{U}_3^{(\pi/2)} \hat{U}_2^{(\pi/2)} \hat{U}_1^{(\pi/2)} |\Psi\rangle_{in}$$

$$= \frac{1}{\sqrt{2}} \begin{pmatrix} |0000\rangle |\alpha + 4\theta\rangle_a + \\ e^{i4\varphi} |1111\rangle |\alpha - 4\theta\rangle_a \end{pmatrix}$$

Figure 20:
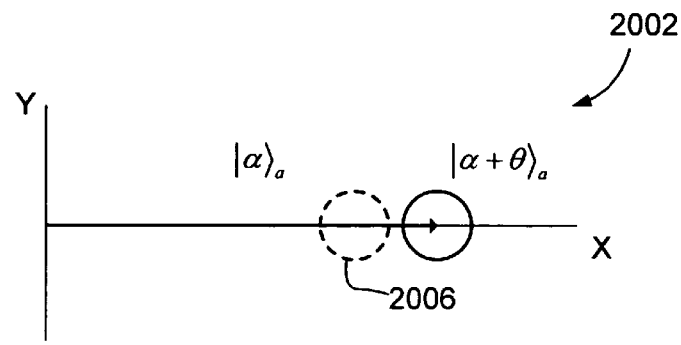
FIG. 20 shows four phase-space diagrams associated with each increase in the average number of photons acquired by a probe field input to the third implementation, in FIG. 19, that represent an embodiment of the present invention.
Figure 20:
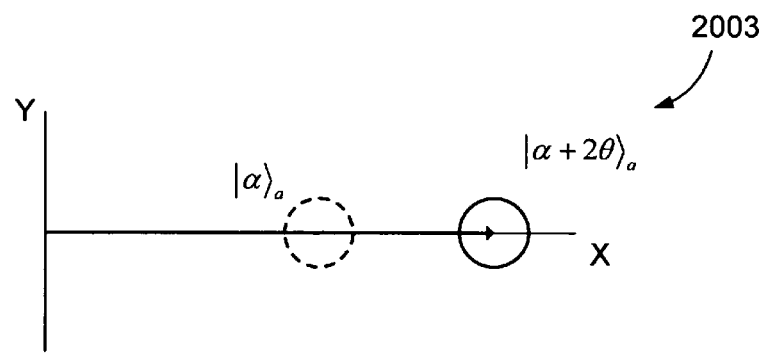
Figure 20:
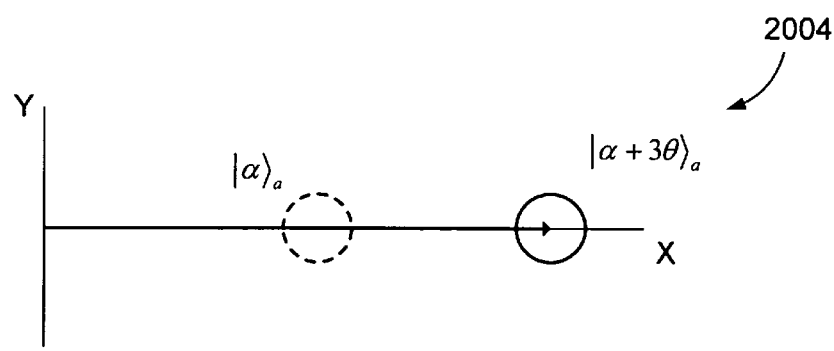
Figure 20:
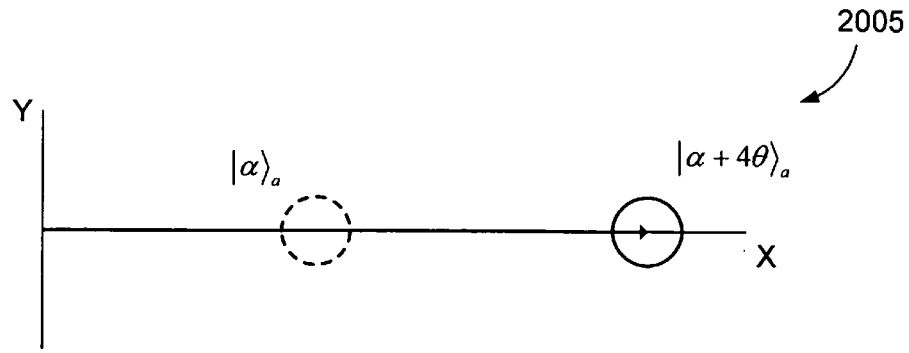

FIG. 20 shows four successive and separate phase-space diagrams 2002-2005 associated with each increase in the average number of photons acquired by the probe field at each of the interaction mediums 1920-1923, in FIG. 19, that represent an embodiment of the present invention. Each phase-space diagram in FIG. 20 includes a dashed-line disk, such as disk 2006 in diagram 2002, that represents the uncertainty disk 1208 associated with the probe field initially in the state $|\alpha\rangle_a$, in FIG. 12. Diagrams 2002-2005 show successive increases in the average number of photons in the probe field as a result of each dipole interaction between the probe field and the qubit systems in the tensor product state |0000⟩ at the interaction mediums 1920-1923, respectively, in FIG. 19. For example, the interaction medium 1920 receives the probe field in the state $|\alpha\rangle_a$ and outputs the prove field in the state $|\alpha+\theta\rangle_a$ as shown in diagram 2002.

Figure 21:
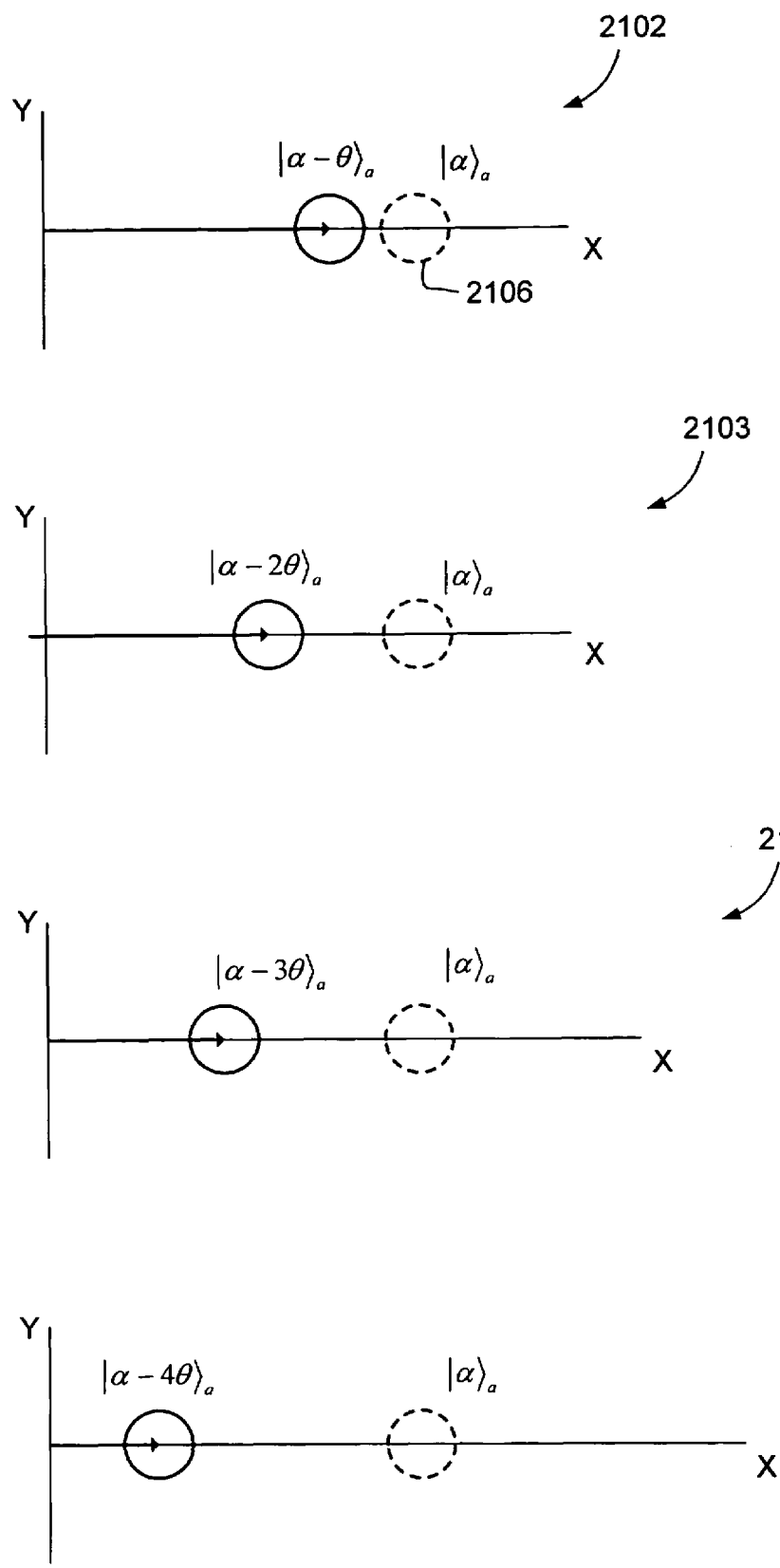
FIG. 21 shows four phase-space diagrams associated with each decrease in the average number of photons acquired by a probe field input to the implementation, in FIG. 19, that represent an embodiment of the present invention.

FIG. 21 shows four successive and separate phase-space diagrams 2102-2105 associated with each decrease in the average number of photons acquired by the probe field at each interaction medium, in FIG. 19, that represent embodiments of the present invention. Each phase-space diagram includes a dashed-line disk, such as disk 2106 in diagram 2102, that represents the uncertainty disk 1208 associated with the probe field, in FIG. 12. Diagrams 2102-2105 shows successive phase changes in the probe field as a result of each dipole interaction between the probe field and the qubits in the tensor product state |1111⟩ at the interaction mediums 1920-1923, respectively, in FIG. 19. For example, the interaction medium 2020 receives the probe field in the state $|\alpha\rangle_a$ and outputs the prove field in the state $|\alpha-\theta\rangle_a$, as shown in diagram 2021.

In FIG. 19, the interaction region 1902 outputs an entangled probe-qubit system represented by the output state:

$$|\Psi\rangle_{out} = \frac{1}{\sqrt{2}} (|0000\rangle |\alpha + 4\theta\rangle_a + e^{i4\varphi} |1111\rangle |\alpha - 4\theta\rangle_a)$$

The Hadamard gates 1908-1911, with subsequent qubit measurements, disentangle the displaced probe fields $|\alpha+4\theta\rangle_a$ and $|\alpha-4\theta\rangle_a$ from the entangled qubit systems represented by the output state $|\Psi\rangle_{out}$. A Hadamard output state representing a quantum system output from the Hadamard gates 1908-1911 is mathematically determined as described above with reference to FIG. 11 and is given by:

$$|\Psi\rangle_{Had} = \hat{H}_{Had}^{\otimes 4} |\Psi\rangle_{out}$$

$$= \left( \frac{1}{4} |\Gamma\rangle_1 + \frac{\sqrt{6}}{4} |\Gamma\rangle_3 + \frac{1}{4} |\Gamma\rangle_5 \right) |\zeta\rangle_{field}^{\pi/2-} + \left( \frac{1}{2} |\Gamma\rangle_2 + \frac{1}{2} |\Gamma\rangle_4 \right) |\zeta\rangle_{field}^{\pi/2-}$$

where $$|\zeta\rangle_{field}^{\pi/2+} = \frac{1}{\sqrt{2}} (|\alpha + 4\theta\rangle + e^{i4\varphi} |\alpha - 4\theta\rangle), \text{ and}$$

$$|\zeta\rangle_{field}^{\pi/2-} = \frac{1}{\sqrt{2}} (|\alpha + 4\theta\rangle - e^{i4\varphi} |\alpha - 4\theta\rangle).$$

Both of the field states $|\theta\rangle_{field}^{\pi/2+}$ and $|\theta\rangle_{field}^{\pi/2-}$ have acquired the phase shift $\phi$ and are coherent linear superposition of the probe field states output from the interaction region 1902.

The displacement operation 1904 is applied to the probe field in order to remove the average number of photons corresponding to the initial state $|\alpha\rangle_a$ of the probe field. The displacement operation 1904 is mathematically represented by the displacement operator:

$$\hat{D}(-\alpha) = \hat{D}^*(\alpha) = \exp(-\alpha \hat{a} + \alpha^* \hat{a})$$

The field states of the probe field output from the displacement operation 1904 are determined by applying the displacement operator $\hat{D}(-\alpha)$ to the field states and $|\zeta\rangle_{field}^+$ to give:

$$\hat{D}(-\alpha) |\zeta\rangle_{field}^{\pi/2+} \frac{1}{\sqrt{2}} (|4\theta\rangle + e^{i4\varphi} |-4\theta\rangle), \text{ and}$$

$$\hat{D}(-\alpha) |\zeta\rangle_{field}^{\pi/2-} = \frac{1}{\sqrt{2}} (|4\theta\rangle - e^{i4\varphi} |-4\theta\rangle),$$

respectively.

Figure 22:
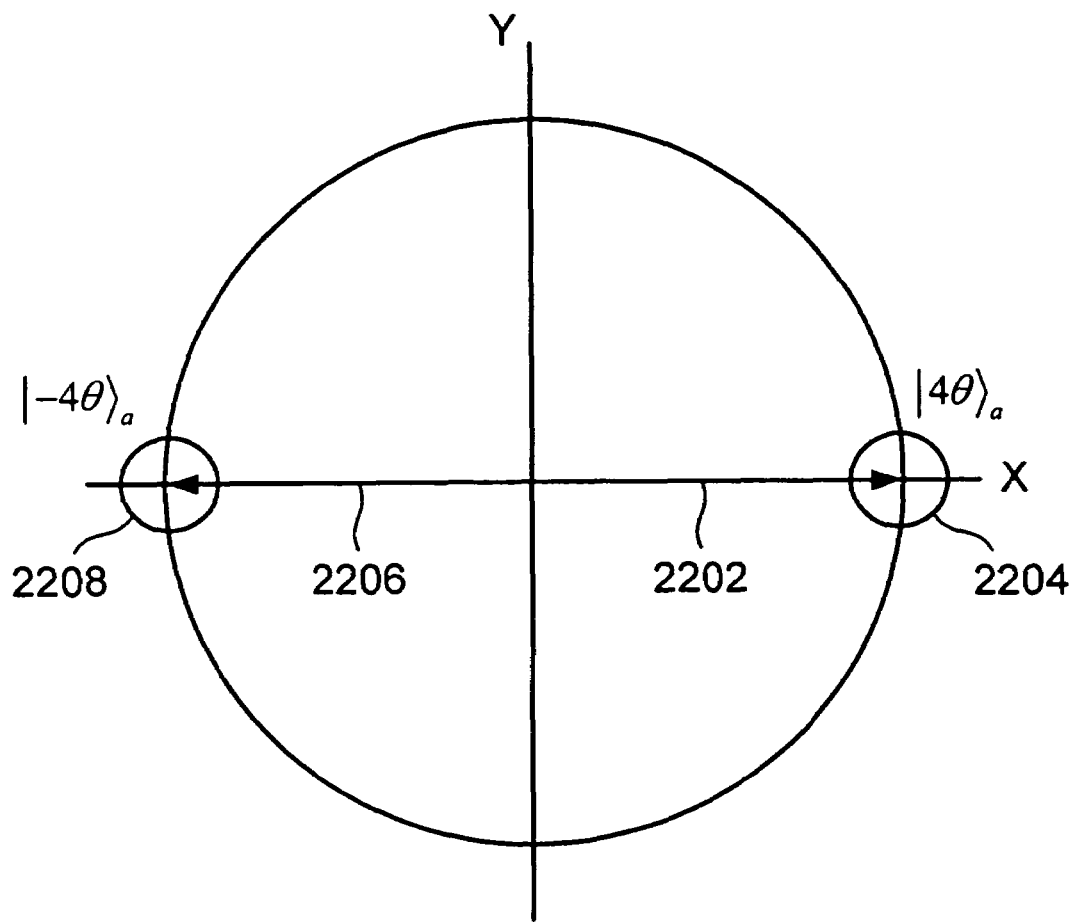
FIG. 22 is a phase-space diagram of field states output from a displacement operation, in FIG. 19, that represents an embodiment of the present invention.

FIG. 22 is a phase-space diagram of the field states output from the displacement operation 1904, in FIG. 19, that represents an embodiment of the present invention. The displaced probe field, in diagram 2005 of FIG. 20, is translated to the probe field in the state $|4\theta\rangle_a$, which is represented by directional arrow 2202 and uncertainty disk 2204. The displaced probe field, in diagram 2105 of FIG. 21, is translated to the probe field in the state $|-4\theta\rangle_a$, which is represented by directional arrow 2206 and uncertainty disk 2208.

Qubit measurements performed at the qubit detectors 1912-1915 project the state of the probe field onto either the field state $\hat{D}(-\alpha)|\zeta\rangle_{field}^{\pi/2+}$ or onto the field state $\hat{D}(-\alpha)|\zeta\rangle_{field}^{\pi/2-}$, as described above with reference to the qubit detectors 1112-1115, in FIG. 11. In order to determine the phase shift φ acquired by the state of the probe field, a large number of quantum systems prepared in the input states $|\Psi\rangle_{in}$ are successively input to the implementation 1900. After each of the qubit measurements, when the probe field is in the state $\hat{D}(-\alpha)|\zeta\rangle_{field}^{\pi/2+}$, data collected from the photon number counter 1906 are stored in a first data set, and when the probe field state is in the state $\hat{D}(-\alpha)|\zeta\rangle_{field}^{\pi/2-}$, data collected from the photon number counter 1906 are stored in a second data set. The first data sets is used to produce a first frequency distribution associated with the field state $\hat{D}(-\alpha)|\zeta\rangle_{field}^{\pi/2+}$, and the second data set is used to produce a second frequency distribution associated with the field state $\hat{D}(-\alpha)|\zeta\rangle_{field}^{\pi/2-}$ as described above with reference to FIGS. 15A-15B. Note that the photon number counter 1904 absorbs the photons, and outputs a signal that can be processed by digital circuits. Photomultiplier tubes, avalanche photodiodes, and high efficiency photon detection devices, such as a visible light photon counter, can be used to determine the number of photons in the probe field.

Either the first or the second frequency distributions can be used to determine the phase shift φ. Consider, for example, using the first frequency distribution. The probability distributions associated with the probe field in the field state $\hat{D}(-\alpha)|\zeta\rangle_{field}^{\pi/2+}$ is:

$$P^{\pi/2+}(n) = |\langle n|\hat{D}(-\alpha)|\zeta\rangle_{field}^{\pi/2+}|^2$$
$$= \frac{1}{2}\exp(-|4\theta|^2/2)\frac{(4\theta)^n}{\sqrt{n!}}(2+(-1)^n\cos(4\varphi))$$

where n is the photon number. An optimal phase shift φ value can be determined by applying a least squares method, or other curve fitting method, to fit the probability distribution $P^{\pi/2+}(n)$ to the data points of the first frequency distribution as a function of the phase shift φ, as described above with reference to FIG. 16. A probability distribution $P^{\pi/2-}(n)$ associated with the second frequency distribution can also be used to determine the optimal phase shift φ.

In a fourth embodiment of the present invention, the parameter γ associated with each of the interaction mediums 1920-1923 equals "0." As a result, the dipole-time evolution operator is mathematically represented by the displacement operator:

$$\hat{U}_j^{(0)} = \hat{D}(\hat{\sigma}_{z,j}\eta(0)) = \exp(-\theta\hat{\sigma}_{z,j}(\hat{a}+\hat{a}^\dagger))$$

The qubit systems pass unchanged through each of the interaction mediums 1920-1923. The dipole interaction at the interaction mediums changes the average number of photons associated with the probe field depending on whether the qubit system transmitted to the interaction medium is in the state $|0\rangle$ or in the state $|1\rangle$. For example, at the interaction medium 1920, a dipole interaction between a qubit system in the state $|0\rangle_1$, and the probe field in the state $|\alpha\rangle_a$ produces a displaced probe field in the state $|\alpha+i\theta\rangle_a$, which is mathematically determined by applying the displacement operator $\hat{U}_1^0$ as follows:

$$\hat{U}_1^{(0)}|0\rangle_1|\alpha\rangle_a = |0\rangle_1|\alpha+i\theta\rangle_a$$

The dipole interaction between the qubit system in the state $|1\rangle_1$ and the probe field in the state $|\alpha\rangle_a$, at the interaction medium 1120 produces a displaced probe field in the state $|\alpha-i\theta\rangle_a$, which is also mathematically determined by:

$$\hat{U}_1^{(0)}|1\rangle_1|\alpha\rangle_a = |1\rangle_1|\alpha-i\theta\rangle_a$$

Note that the displacement operator $\hat{U}_j^0$ does not change the state of the qubit basis states.

The interaction region 1902 receives a quantum system represented by the input state $|\Psi\rangle_{in}$ and outputs an entangled probe-qubit system represented by an entangled output state:

$$|\Psi\rangle_{out} = \frac{1}{\sqrt{2}}(|0000\rangle|\alpha+i4\theta\rangle^a + e^{i4\varphi}|1111\rangle|\alpha-i4\theta\rangle^a)$$

The output state $|\Psi\rangle_{out}$ is determined by successively applying the displacement operator associated with each interaction medium as described above.

Figure 23:
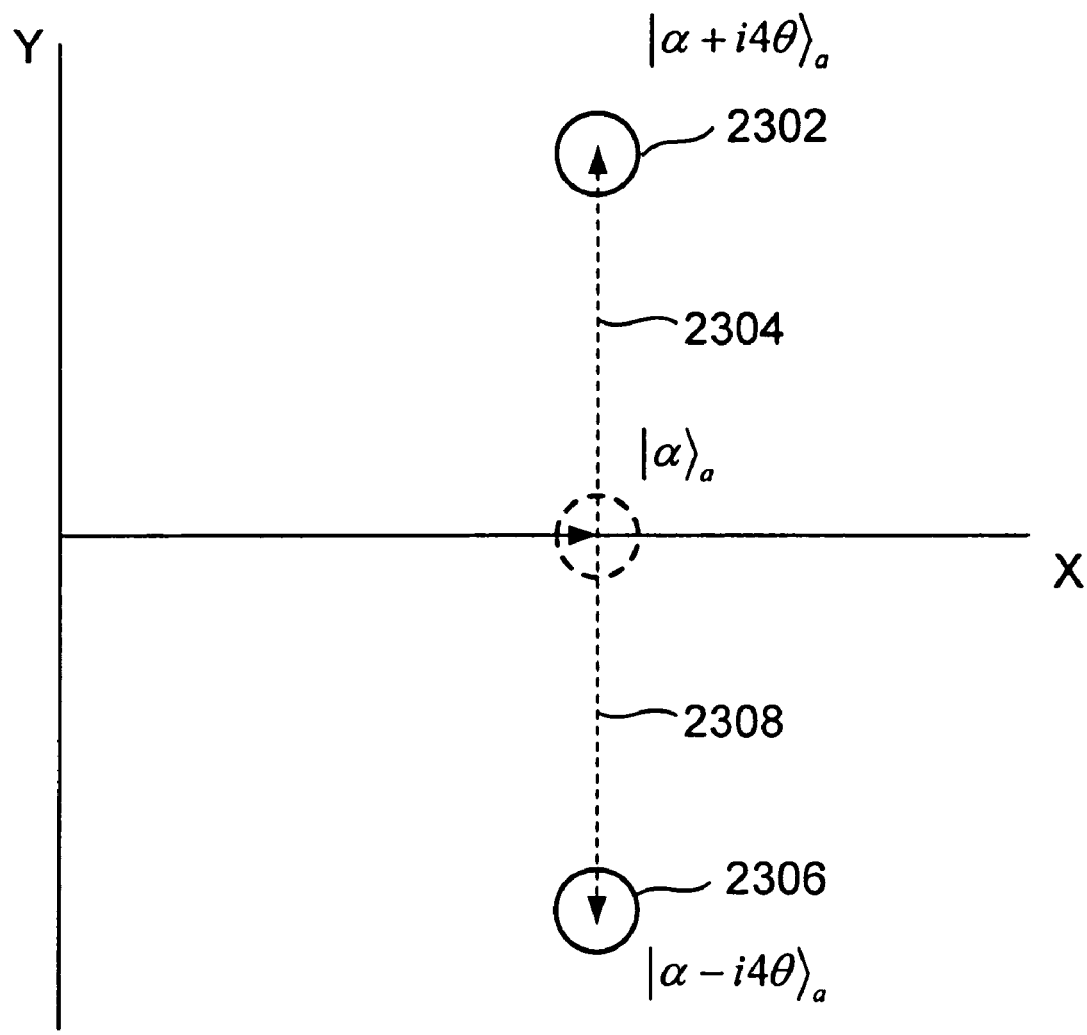
FIG. 23 is a phase-space diagram of field states output from the interaction region, in FIG. 19, that represent an embodiment of the present invention.

FIG. 23 is a phase-space diagram showing the resulting displaced probe fields output from the interaction region 1902, in FIG. 19, that represent an embodiment of the present invention. Uncertainty disk 2302 and dashed-line directional arrow 2304 represent the displace probe field in the state $|\alpha\alpha+i4\theta\rangle$, and uncertainty disk 2306 and dashed-line directional arrow 2308 represent the displace probe field in the state $|\alpha-i4\theta\rangle$.

In FIG. 19, the Hadamard gates 1908-1911, with subsequent qubit measurements, disentangle the displaced probe field from the entangled qubit systems represented by the output state $|\Psi\rangle_{out}$. A Hadamard output state is mathematically determined as described above with reference to FIG. 11 and is given by:

$$|\Psi\rangle_{Had} = \hat{H}_{Had}^{\otimes 4}|\Psi\rangle_{out}$$
$$= \left(\frac{1}{4}|\Gamma\rangle_1 + \frac{\sqrt{6}}{4}|\Gamma\rangle_3 + \frac{1}{4}|\Gamma\rangle_5\right)|\zeta\rangle_{field}^{0+} +$$
$$\left(\frac{1}{2}|\Gamma\rangle_2 + \frac{1}{2}|\Gamma\rangle_4\right)|\zeta\rangle_{field}^{0-}$$

where $$|\zeta\rangle_{field}^{0+} = \frac{1}{\sqrt{2}}(|\alpha+i4\theta\rangle + e^{i4\varphi}|\alpha-i4\theta\rangle), \text{ and}$$

$$|\zeta\rangle_{field}^{0-} = \frac{1}{\sqrt{2}}(|\alpha+i4\theta\rangle - e^{i4\varphi}|\alpha-i4\theta\rangle).$$

The probe field, represented by the field states $|\zeta\rangle_{field}^{0+}$ and $|\zeta\rangle_{field}^{0-}$, has acquired the phase shift φ.

In FIG. 19, the displacement operation 1904 is applied to the probe field in order to remove the average number of photons associated with the initial state $|\alpha\rangle_a$ of the probe field. The field states of the probe field output from the displacement operation 1904 are determined by applying the displacement operator $\hat{D}'(-\alpha)$ to the field states $|\zeta\rangle_{field}^{0+}$ and $|\zeta\rangle_{field}^{0-}$ gives:

$$\hat{D}(-\alpha)|\zeta\rangle_{field}^{0+} = \frac{1}{\sqrt{2}}(|i4\theta\rangle + e^{i4\varphi}|-i4\theta\rangle), \text{ and}$$

$$\hat{D}(-\alpha)|\zeta\rangle_{field}^{0+} = \frac{1}{\sqrt{2}}(|i4\theta\rangle + e^{i4\varphi}|-i4\theta\rangle),$$

respectively.

Figure 24:
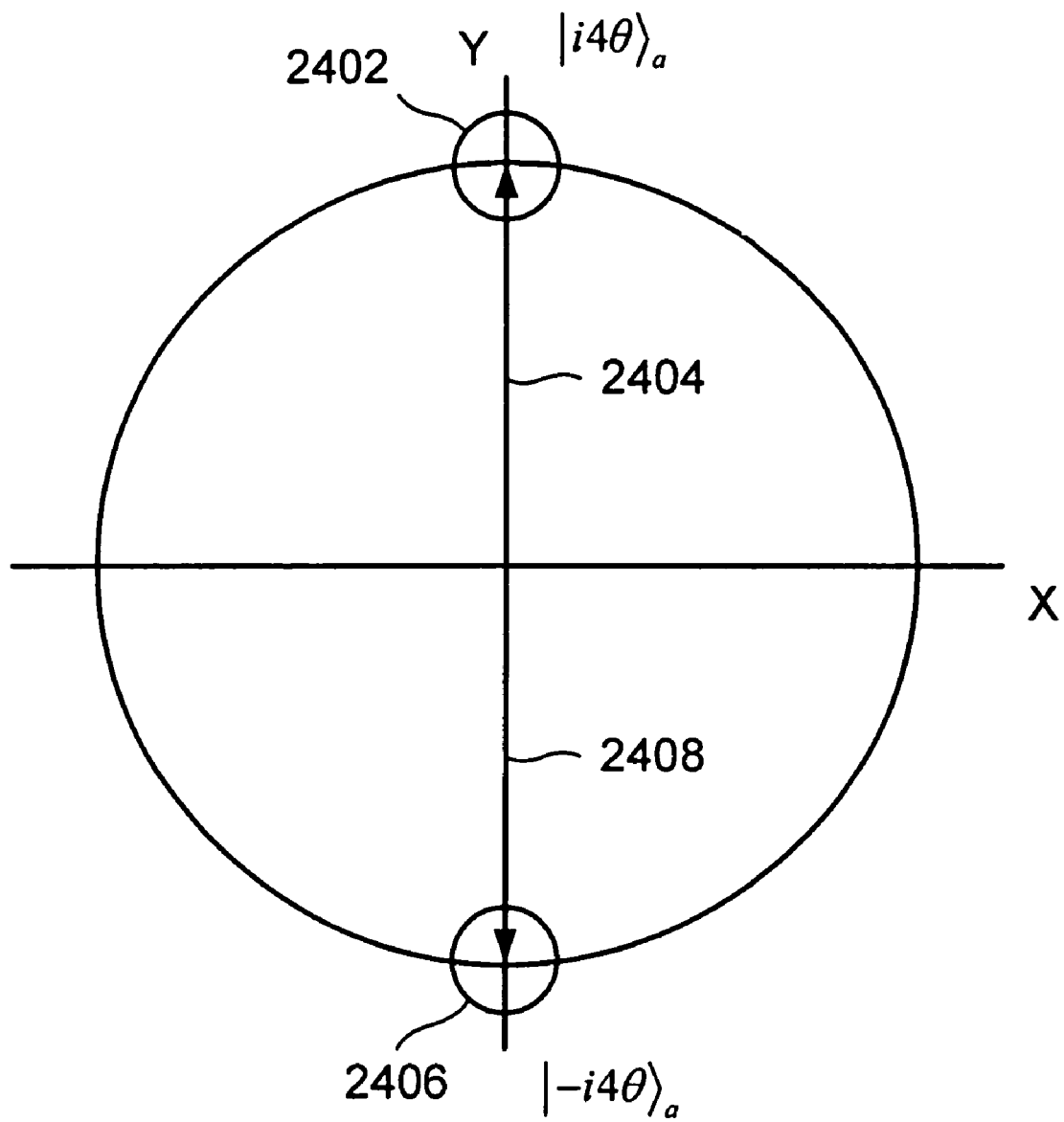
FIG. 24 is a phase-space diagram of field states output from the displacement operation, in FIG. 19, that represents an embodiment of the present invention.

FIG. 24 is a phase-space diagram of the field states output from the displacement operation 1904, in FIG. 19, that represents an embodiment of the present invention. The displaced probe field, in FIG. 23, is translated to the probe field represented by the state $|i4\theta\rangle_a$, which is represented by uncertainty disk 2402 and directional arrow 2404. The displaced probe field, in FIG. 23, is translated to the probe field represented by the state $|-i4\theta\rangle_a$, which is represented by uncertainty disk 2406 and directional arrow 2408.

Qubit measurements performed at the qubit detectors 1912-1915 project the probe field output from the displacement operation 1904 onto either the field state $\hat{D}(-\alpha)|\zeta\rangle_{field}^{0+}$ or onto the field state $\hat{D}(-\alpha)|\zeta\rangle_{field}^{0-}$, as described above with reference to the qubit detectors 1112-1115, in FIG. 11. In order to determine the phase shift $\phi$ acquired by the probe field in the field state $\hat{D}(-\alpha)|\zeta\rangle_{field}^{0+}$ or in the field state $\hat{D}(-\alpha)|\zeta\rangle_{field}^{0-}$, a large number of identically prepared input states $|\Psi\rangle_{in}$ are successively input to the implementation 1900. After each of the qubit measurements, when the probe field is in the field state $\hat{D}(-\alpha)|0\rangle_{field}^{0+}$, data collected from the photon number counter 1906 is stored in a first data set, and when the probe field is in the field state $\hat{D}(-\alpha)|\zeta\rangle_{field}^{0-}$, data collected from the photon number counter 1906 is stored in a second data set. The first data sets is used to produce a first frequency distribution associated with the field state $\hat{D}(-\alpha)|\zeta\rangle^{field0+}$, and the second data set is used to produce a second frequency distribution associated with the field state $\hat{D}(-\alpha)|\zeta\rangle_{field}^{0-}$, as described above with reference to FIGS. 15A-15B.

The first frequency distribution can be used to determine the phase shift $\phi$ by fitting a corresponding probability distribution to the first frequency distribution data set. The probability distributions associated with the field state $\hat{D}(-\alpha)|\zeta\rangle_{field}^{0+}$ is:

$$P^{0+}(n) = |\langle n|\hat{D}(-\alpha)|\zeta\rangle_{field}^{0+}|^2$$
$$= \frac{1}{2}\exp(-|4\theta|^2/2)\frac{(4\theta)^n}{\sqrt{n!}}(2+(-1)^n\cos(4\varphi))$$

where n is the number of photons. An optimal phase shift $\phi$ value can be determined by applying a least squares method, or other curve fitting method, to fit the probability distribution $P^{0+}(n)$ to the first frequency distribution as a function of the phase shift $\phi$ as described above with reference to FIG. 16. A probability distribution $P^{0-}(n)$ associated with the second frequency distribution can also be used to determine the optical phase shift $\phi$.

Figure 25:
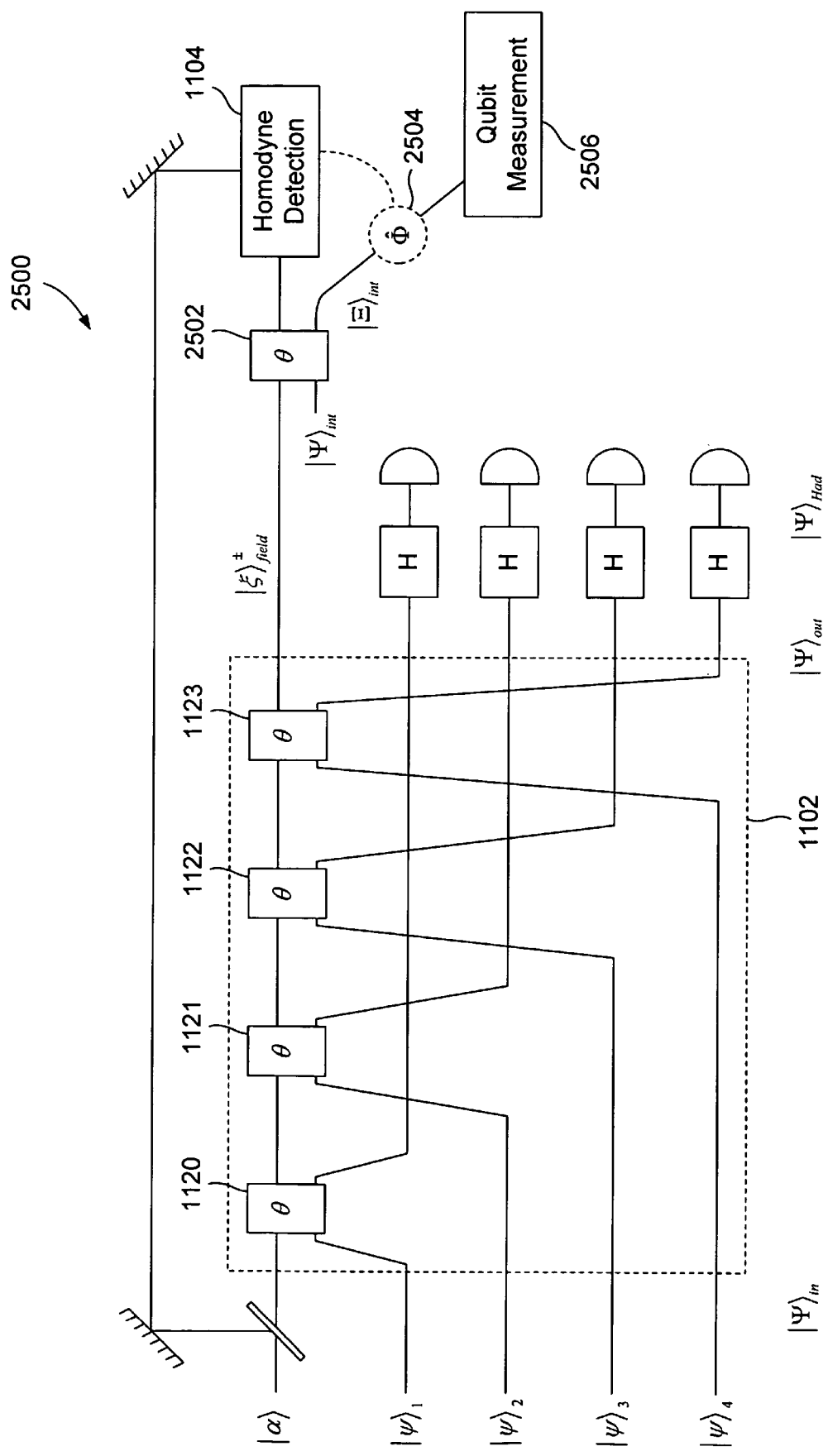
FIG. 25 illustrates a fifth implementation for determining a phase shift $\phi$ acquired by an entangled 4-qubit state that represents an embodiment of the present invention.

In an alternate embodiment of the present invention, the phase shift $\phi$ can be extracted from a qubit system that interferes with the probe field after the Hadamard gates. FIG. 25 illustrates a fifth implementation 2500 for determining the phase shift $\phi$ acquired by the state $|\Psi\rangle_{4004}$ that represents an embodiment of the present invention. The implementation 2500 comprises the components described above with reference to FIG. 11 plus an interaction medium 2502, phase shift operation 2504, and qubit measurement 2506. The interaction medium 2502 is identical to the interaction mediums 1120-1123 in the interaction region 1102. At the interaction medium 2502, a qubit system in the qubit $(|0\rangle+|1\rangle)/\sqrt{2}$, interacts with the probe field in the field states $|\xi\rangle_{field}^{1+}$ and $|\xi\rangle_{field}^{1-}$ to output an entangled probe-qubit system represented by the state:

$$|\Xi\rangle_{int} = \frac{1}{2}(|0\rangle|\alpha e^{i5\theta}\rangle_a \pm e^{i4\varphi}|1\rangle|\alpha e^{-i5\theta}\rangle_a \pm e^{i4\varphi}|0\rangle|\alpha e^{-i3\theta}\rangle_a + |1\rangle|\alpha e^{i3\theta}\rangle_a)$$

The homodyne detection 1104 projects the entangled state of the entangled probe-qubit system onto a state that contains the phase shift $\phi$. Note that the projection is an entirely random process, but the output state is determined by the homodyne detection 1104. For example, when the homodyne detection 1104 reveals the states $|\alpha e^{i5\theta}\rangle_a$ and $|\alpha e^{-i5\theta}\rangle_a$, the output state is:

$$|\Xi\rangle_{int} = \frac{1}{2}(e^{i\phi(x)}|0\rangle \pm e^{i4\phi}e^{-i\phi(x)}|1\rangle),$$

or when the homodyne detection 1104 reveals the states $|\alpha ae^{i3\theta}\rangle_a$ and $|\alpha e^{-i3\theta}\rangle_a$, the output state is:

$$|\Xi\rangle_{int} = \frac{1}{2}(\pm e^{i4\varphi}e^{-i\phi(x)}|0\rangle + e^{i\phi(x)}|1\rangle)$$

In either case, the phase $\phi(x)$ is identified by the homodyne detection 1104 and removed by the phase shift operation 2504. The phase shift operation 2504 is mathematically represented by the operator $\hat{\Phi}=\exp(-i\phi(x)\sigma_z/2)$, which produces the states:

$$\hat{\Phi}|\Xi\rangle_{int} = \frac{1}{2}(|0\rangle \pm e^{i4\varphi}|1\rangle), \text{ and}$$

$$\hat{\Phi}|\Xi\rangle_{int} = \frac{1}{2}(\pm e^{i4\varphi}|0\rangle + |1\rangle)$$

The phase shift $\phi$ can then be determined via a standard single qubit interference experiment at the qubit measurement 2508.

Figure 26:
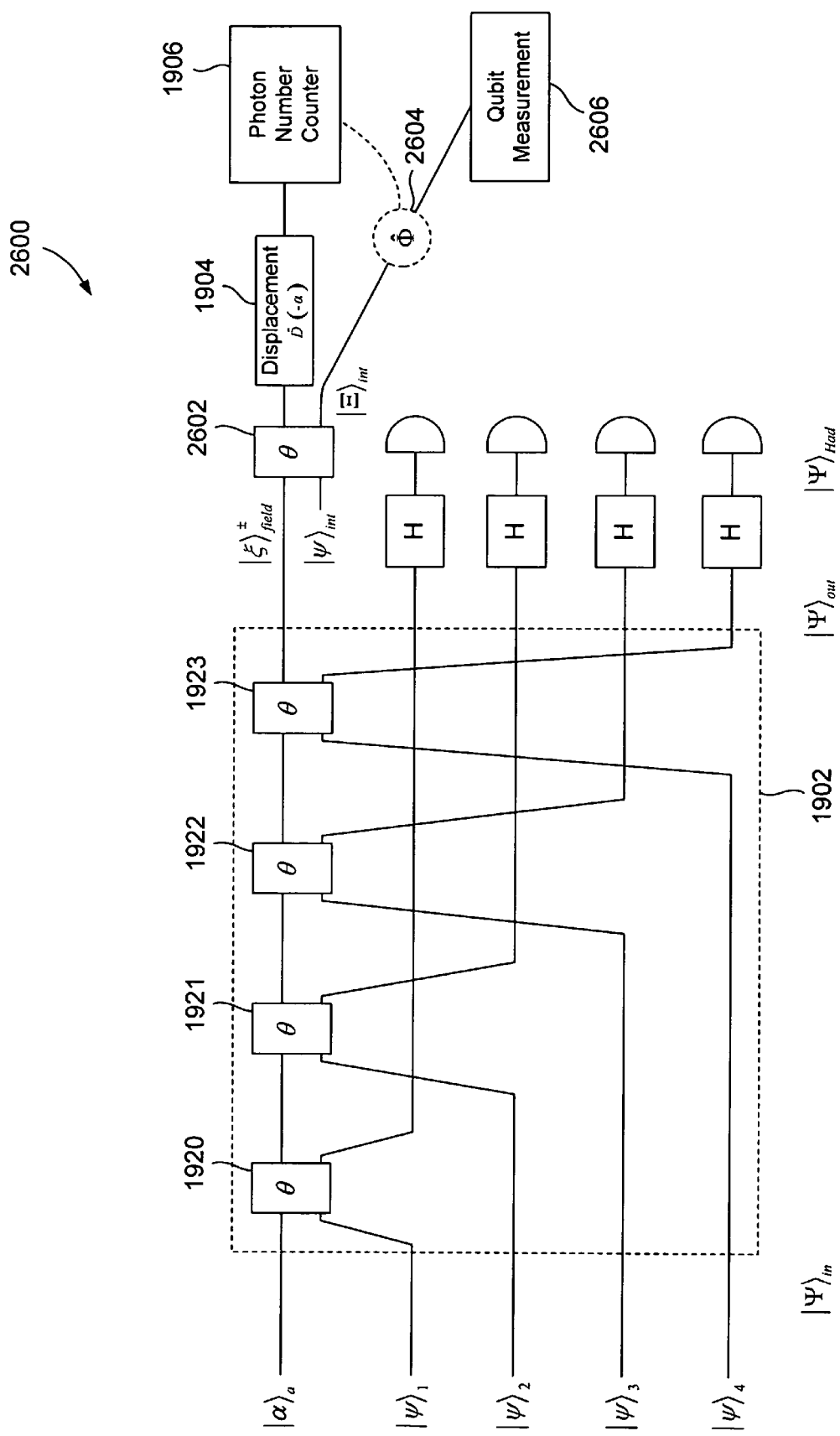
FIG. 26 illustrates a sixth implementation for determining a phase shift $\phi$ acquired by an entangled 4-qubit state that represents an embodiment of the present invention.

In an alternate embodiment of the present invention, the phase shift $\phi$ can be extracted from a qubit system that interferes with the probe field after the Hadamard gates. FIG. 26 illustrates a sixth implementation 2600 for determining the phase shift $\phi$ acquired by the state $|\psi_4\rangle$ that represents an embodiment of the present invention. The implementation 2600 comprises the components described above with reference to FIG. 19 plus an interaction medium 2602, phase shift operation 2604, and qubit measurement 2606. The interaction medium 2602 is identical to the interaction mediums 1920-1923 in the interaction region 1902. At the interaction medium 2602, a qubit system in the qubit $(|0\rangle+|1\rangle)/\sqrt{2}$, interacts with the probe field in the field states $|\xi\rangle_{field}^{1+}$ and $|\xi\rangle_{field}^{1-}$ to output an entangled probe-qubit system represented by the state:

$$|\Xi\rangle_{int} = \frac{1}{2}(|0\rangle|\alpha+5\theta\rangle_a \pm e^{i4\varphi}|1\rangle|\alpha-5\theta\rangle_a \pm e^{i4\varphi}|0\rangle|\alpha-3\theta\rangle_a + |1\rangle|\alpha+3\theta\rangle_a)$$

The photon number counter 1906 projects the entangled state onto a state that contains the phase shift $\phi$. Note that the projection is also an entirely random process, but the output state is determined by the photon number counter 1906. For example, when the photon number counter reveals an intensity of N~25θ², the output state is:

$$|\Xi\rangle_{int} = \frac{1}{2}(|0\rangle \pm e^{i4\varphi}(-1)^N|1\rangle),$$

or when the photon number counter 1906 reveals an intensity of N~9θ², the output state is:

$$|\Xi\rangle_{int} = \frac{1}{2}((-1)^N|0\rangle \pm e^{i4\varphi}|1\rangle)$$

In either case, the phase factor $(-1)^N$ is identified by the photon number counter 1906 and removed by the phase shift operation 2604. The phase shift operation 2604 is mathematically represented by the operator $\hat{\Omega}=\exp(-iN\pi/2)\exp(iN\pi\hat{\sigma}_z/2)$, which produces the states:

$$\hat{\Omega}|\Xi\rangle_{int} = \frac{1}{2}(|0\rangle \pm e^{i4\varphi}|1\rangle), \text{ and}$$

$$\hat{\Omega}|\Xi\rangle_{int} = \frac{1}{2}(\pm e^{i4\varphi}|0\rangle + |1\rangle)$$

The phase shift $\phi$ can then be determined via a standard single qubit interference experiment at the qubit measurement 2608.

Figure 27:
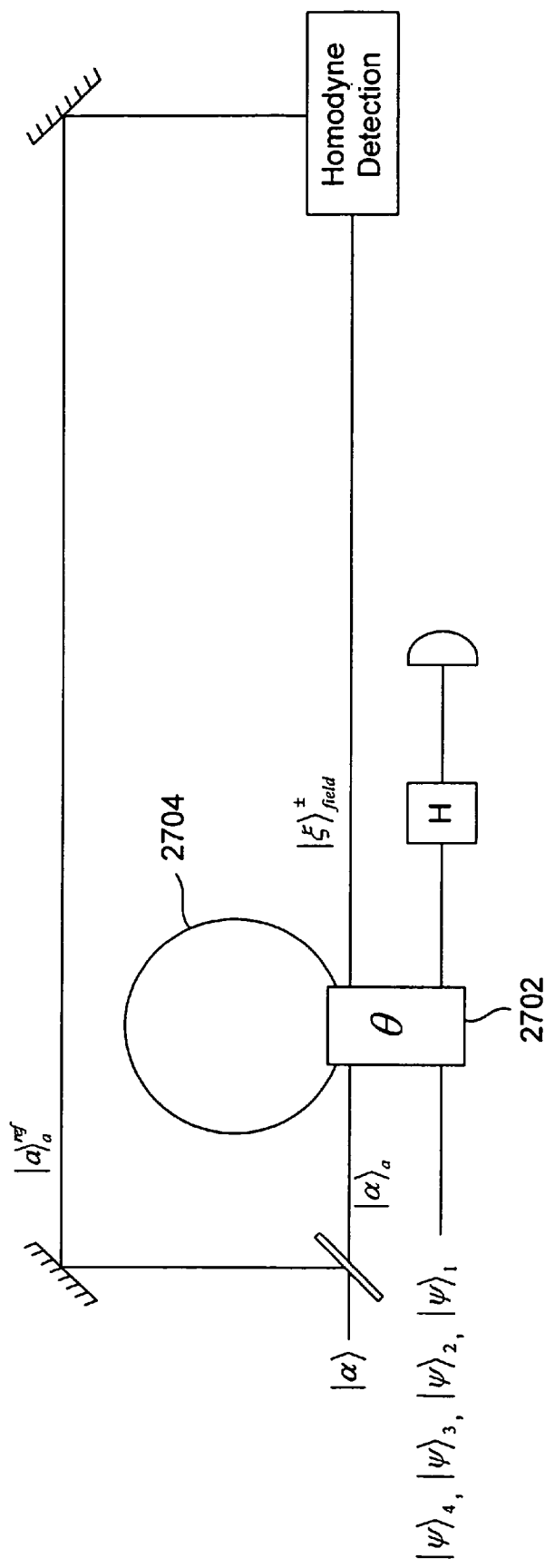
FIG. 27 illustrates a seventh implementation comprising a single interaction region that represents an embodiment of the present invention.

Although the present invention has been described in terms of particular embodiments, it is not intended that the invention be limited to these embodiments. Modifications within the spirit of the invention will be apparent to those skilled in the art. For example, in an alternate embodiment of the present invention, rather than employing interaction regions having two or more interaction mediums as described above with reference to FIGS. 11, 17, and 19, the interaction region can comprise a single interaction medium. For example, FIG. 27 illustrates an interaction region comprising a single interaction medium that represents one of many embodiments of the present invention. In FIG. 27, the probe field is repeatedly transmitted into an interaction medium 2702 via a loop transmission channel 2704. Transmission of the probe field into the interaction medium 2702 is synchronized with the transmission of the qubit systems so that the probe interacts separately with each qubit system. In an alternate embodiment of the present invention, rather than performing the displacement operation 1904 on the probe field after the interaction region 1902, in FIG. 19, the displacement operation 1904 can be performed before the probe field is input to the interaction region 1902. In an alternate embodiment of the present invention, the displacement operation 1904 can be eliminated by using the probe field in the vacuum state $|0\rangle_a$. In an alternate embodiment of the present invention, the use of other interaction mediums characterized by different interaction Hamiltonians can be used. In an alternate embodiment of the present invention, the Hadamard gates can be replaced by x-Pauli and y-Pauli gates. In alternate embodiments of the present invention, multiple probe beams can be used to interact with subsets of qubits and then interfere at a beam-splitter prior to a measurement. In alternate embodiments of the present invention, the entangled qubit systems can be quantum dots, magnetic moments, such as superconducting flux or magnetic spin qubits, or nanoelectromechanical systems. In alternate embodiments of the present invention, each of the N matter-based qubits can be trapped within one of the N separate interaction mediums in the interaction region. The probe field $|\alpha\rangle_a$ is transmitted to each of the N interaction mediums to separately interact with the N qubits. In an alternate embodiment of the present invention, an interaction region comprises numerous different kinds of interaction mediums. For example, an interaction region comprises a combination of interaction mediums for coupling matter-based qubits to a probe and Kerr interaction mediums for coupling photon-based qubits to the probe.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for determining a phase shift acquired by an entangled N-qubit system represented by a NOON state, the method comprising:

for M trials,
producing an entangled probe-qubit system by coupling a probe electromagnetic field with each qubit system in the entangled N-qubit system,
transferring a phase shift from the qubit systems to the probe electromagnetic field by transforming each qubit system state in the entangled probe-qubit system into a linear superposition of qubit basis states,
performing a measurement on the probe electromagnetic field in order to obtain an associated measurement result, and
based on the measurement result falling within a measurement-result interval of a larger continuous spectrum of measurement results, incrementing a counter associated with the measurement-result interval;

producing a frequency distribution by normalizing a set of counters, each counter associated with each measurement result interval; and determining the phase shift by fitting a probability distribution associated with the probe electromagnetic field to the frequency distribution as a function of the phase shift.

2. The method of claim 1 further comprising projecting the probe electromagnetic field onto either a first field state or a second field state by performing qubit detection measurements on each of the qubit systems.

3. The method of claim 1 wherein the qubit systems further comprises one of:
   matter-based qubit systems;
   photon-based qubit systems;
   a linear superpositions of two quantum dot states; and
   a linear superposition of two magnetic states.

4. The method of claim 1 wherein the coupling further comprises dipole interactions at an interaction medium represented by an interaction Hamiltonian:

$$\hat{H} = \hbar\chi \hat{a}^\dagger \hat{a} \hat{\sigma}_z$$

where
   $\chi$ is a constant that represents the coupling strength between the probe field and qubit systems;
   $\hat{a}^\dagger \hat{a}$ is a number operator that operates on the probe; and
   $\hat{\sigma}_z = |0\rangle\langle 0| - |1\rangle\langle 1|$.

5. The method of claim 1 wherein the coupling further comprises a cross-Kerr interaction at an interaction medium represented by a cross-Kerr interaction Hamiltonian:

$$\hat{H} = \hbar\chi \hat{a}^\dagger \hat{a} \hat{b}^\dagger \hat{b}$$

where
   $\hat{a}^\dagger \hat{a}$ is a number operator that operates on the probe field; and
   $\hat{b}^\dagger \hat{b}$ is a number operator that operates on a photon basis state.

6. The method of claim 1 wherein the coupling further comprises an interaction at an interaction medium represented by an interaction Hamiltonian:

$$\hat{H} = \hbar\chi \hat{\sigma}_z (\hat{a}^\dagger e^{i\gamma} + \hat{a} e^{-i\gamma})$$

where
   $\hat{a}^\dagger e^{i\gamma} + \hat{a} e^{-i\gamma}$ is a quadrature operator of the probe and is determined by the parameter $\gamma$.

7. The method of claim 1 wherein transferring the phase shift from the qubit systems to the probe electromagnetic field further comprises transmitting each qubit system through one of the following:
   a Hadamard gate;
   an $\chi$-Pauli gate; or
   a $\gamma$-Pauli gate.

8. The method of claim 1 wherein performing the measurement on the probe electromagnetic field further comprises a homodyne detection measurement.

9. The method of claim 1 wherein performing the measurement on the probe electromagnetic field further comprises a photon number counter.

10. The method of claim 1 wherein determining the phase shift further includes employing a least squares method to fit the probability distribution to the frequency distribution as a function of the phase shift $\phi$.

11. A method for transferring a phase shift acquired by an entangled N-qubit system represented by a NOON state to a probe electromagnetic field, the method comprising:
   producing an entangled probe-qubit system by coupling a probe electromagnetic field with each qubit system in the entangled N-qubit system; and
   transferring a phase shift from the qubit systems to the probe electromagnetic field by transforming each qubit system state of the entangled probe-qubit system into a qubit system represented by a linear superposition of qubit basis states.

12. The method of claim 11 further comprising projecting the probe electromagnetic field onto either a first field state or a second field state by performing qubit detection measurements on each of the qubit systems.

13. The method of claim 11 wherein the qubit systems further comprise one of:
   matter-based qubit systems;
   photon-based qubit systems;
   a linear superposition of two quantum dot states; and
   a linear superposition of two magnetic states.

14. The method of claim 11 wherein the coupling further comprises dipole interactions at an interaction medium represented by an interaction Hamiltonian:

$$\hat{H} = \hbar\chi \hat{a}^\dagger \hat{a} \hat{\sigma}_z$$

where
   $\chi$ is a constant that represents the coupling strength between the probe field and qubit systems;
   $\hat{a}^\dagger \hat{a}$ is a number operator that operates on the probe; and
   $\hat{\sigma}_z = |0\rangle\langle 0| - |1\rangle\langle 1|$.

15. The method of claim 11 wherein the coupling further comprises a cross-Kerr interaction at an interaction medium represented by a cross-Kerr interaction Hamiltonian:

$$\hat{H} = \hbar\chi \hat{a}^{554} \hat{a} \hat{b}^\dagger \hat{b}$$

where
   $\hat{a}^\dagger \hat{a}$ is a number operator that operates on the probe field; and
   $\hat{b}^\dagger \hat{b}$ is a number operator that operates on a photon basis state.

16. The method of claim 11 wherein the coupling further comprises an interaction at an interaction medium represented by an interaction Hamiltonian:

$$\hat{H} = \hbar\chi \hat{\sigma}_z (\hat{a}^\dagger e^{i\gamma} + \hat{a} e^{-i\gamma})$$

where
   $\hat{a}^\dagger e^{i\gamma} + \hat{a} e^{-i\gamma}$ is a quadrature operator of the probe and is determined by the parameter $\gamma$.

17. The method of claim 11 wherein transferring the phase shift from the qubit systems to the probe electromagnetic field further comprises transmitting each qubit system through one of the following:
   a Hadamard gate;
   an $\chi$-Pauli gate; or
   a $\gamma$-Pauli gate.

18. A method for measuring a phase shift acquired by a probe electromagnetic field entangled with N qubit systems, the method comprising:
   for M trials,
      performing a measurement on the probe electromagnetic field in order to obtain an associated measurement result, and
      based on the measurement result falling within a measurement-result interval of a larger continuous spectrum of measurement results, incrementing a counter associated with each measurement-result interval;
   producing a frequency distribution by normalizing a set of counters, each counter associated with each measurement result interval; and
   determining the phase shift by fitting a probability distribution associated with the probe electromagnetic field to the frequency distribution as a function of the phase shift.

19. The method of claim 18 wherein performing the measurement on the probe electromagnetic field further comprises a homodyne detection measurement.

20. The method of claim 18 wherein performing the measurement on the probe electromagnetic field further comprises a photon number counter.

21. The method of claim 18 wherein determining the phase shift further includes employing a least squares method to fit the probability distribution to the frequency distribution as a function of the phase shift $\phi$.

* * * * *

UNITED STATES PATENT AND TRADEMARK OFFICE
CERTIFICATE OF CORRECTION

PATENT NO.        : 7,426,444 B2
APPLICATION NO.   : 11/407600
DATED             : September 16, 2008
INVENTOR(S)       : Raymond G. Beausoleil et al.

It is certified that error appears in the above-identified patent and that said Letters Patent is hereby corrected as shown below:

In column 2, line 20, delete " $\{|0\rangle,|0\rangle\}$ " and insert -- $\{|0\rangle,|1\rangle\}$ --, therefor.

In column 2, line 45, delete " $|\psi\rangle_2$ " and insert -- $|\psi\rangle_{12}$ --, therefor.

In column 2, line 54, delete $|0\rangle_1, |0\rangle_2, |0\rangle_1|1\rangle_2, |1\rangle_1|0\rangle_2,$ " " and insert -- $|0\rangle_1|0\rangle_2, |0\rangle_1|1\rangle_2, |1\rangle_1|0\rangle_2,$ --, therefor.

In column 3, line 24, delete " $|0\rangle$ " and insert -- $|0\rangle_1$ --, therefor.

In column 9, line 50, delete " "$\tilde{I}$" " and insert -- "$\hat{I}$" --, therefor.

In column 12, line 28, delete " $(\hat{\Psi}\otimes\hat{\Xi})(|\psi\rangle\otimes|\xi\rangle)=(\hat{\Psi}|\psi\rangle)\otimes(\hat{\Xi}|\xi\rangle)$ " and insert -- $(\hat{\Psi}\otimes\hat{\Xi})(|\psi\rangle\otimes|\xi\rangle)=(\hat{\Psi}|\psi\rangle)\otimes(\hat{\Xi}|\xi\rangle)$ --, therefor.

In column 12, line 40, delete " $|\uparrow\rangle_1\otimes|\uparrow\rangle_2=|\uparrow\rangle_1|\uparrow\rangle_2=|\uparrow,\uparrow\rangle_{12}$ " and insert -- $|\uparrow\rangle_1\otimes|\uparrow\rangle_2=|\uparrow\rangle_1|\uparrow\rangle_2=|\uparrow,\uparrow\rangle_{12}=|\uparrow\uparrow\rangle_{12}$ --, therefor.

In column 18, line 24, delete " $\hat{a}|n\rangle=\sqrt{n}\,|n-1\rangle,$ " and insert -- $\hat{a}|n\rangle=\sqrt{n}|n-1\rangle,$ --, therefor.

In column 19, line 16, delete "has" and insert -- $\hbar\omega$ --, therefor.

In column 21, line 1, delete "time to" and insert -- time $t_0$ --, therefor.

In column 21, line 29, delete "time $t_O$" and insert -- time $t_0$ --, therefor.

In column 22, line 29, delete " at $\hat{a}^\dagger$ " and insert -- $\hat{a}^\dagger|\alpha\rangle$ --, therefor.

In column 27, line 20, delete " $(\hat{a}^\backslash\hat{a})$ " and insert -- $(\hat{a}^\dagger\hat{a})$ --, therefor.

In column 27, line 28, delete " $\hat{\sigma}_{z,j}=|0\rangle_{j\,j}\langle0|-|1$ " and insert -- $\hat{\sigma}_{z,j}=|0\rangle_{j\,j}\langle0|-|1\rangle_{j\,j}\langle1|$ --, therefor.

UNITED STATES PATENT AND TRADEMARK OFFICE
CERTIFICATE OF CORRECTION

PATENT NO. : 7,426,444 B2
APPLICATION NO. : 11/407600
DATED : September 16, 2008
INVENTOR(S) : Raymond G. Beausoleil et al.

It is certified that error appears in the above-identified patent and that said Letters Patent is hereby corrected as shown below:

In column 27, line 59, delete " $\hat{U}_1^{-1}$ " and insert -- $\hat{U}_1^\dagger$ --, therefor.

In column 28, line 1, delete " $\hat{U}_1^{-1}$ " and insert -- $\hat{U}_1^\dagger$ --, therefor.

In column 28, line 56, delete "shift 9" and insert -- shift θ --, therefor.

In column 29, line 2, delete " $|\alpha_a$ " and insert -- $|\alpha\rangle_a$ --, therefor.

In column 29, line 13, delete " $|\alpha a\rangle_a$ " and insert -- $|\alpha\rangle_a$ --, therefor.

In column 29, lines 45-48, delete " $\hat{H}_{Had}|0\rangle = \frac{1}{\sqrt{2}}(|0\rangle + \langle 1|)$, and $\hat{H}_{Had}|1\rangle = \frac{1}{\sqrt{2}}(|0\rangle - \langle 1|)$ " and insert -- $\hat{H}_{Had}|0\rangle = \frac{1}{\sqrt{2}}(|0\rangle + |1\rangle)$, and $\hat{H}_{Had}|1\rangle = \frac{1}{\sqrt{2}}(|0\rangle - |1\rangle)$ --, therefor.

In column 29, line 54, delete " $|\alpha e^{i4\theta}\rangle$ " and insert -- $|\alpha e^{-i4\theta}\rangle_a$ --, therefor.

In column 29, line 57, delete " $|e^{i4\theta}\rangle_a$ " and insert -- $|\alpha e^{i4\theta}\rangle_a$ --, therefor.

In column 29, line 65, delete " $= \frac{1}{\sqrt{2}}(\hat{H}_{Had}^{\otimes 4}|0000\rangle|\alpha e^{i4\varphi}\rangle_a + e^{i4\varphi}\hat{H}_{Had}^{\otimes 4}|1111\rangle|\alpha e^{i4\theta}\rangle_a)$ " and insert -- $= \frac{1}{\sqrt{2}}(\hat{H}_{Had}^{\otimes 4}|0000\rangle|\alpha e^{i4\theta}\rangle_a + e^{i4\varphi}\hat{H}_{Had}^{\otimes 4}|1111\rangle|\alpha e^{-i4\theta}\rangle_a)$ --, therefor.

In column 30, line 2, delete " $\hat{H}_{Had}^{\otimes 4}|0000\rangle$ " and insert -- $\hat{H}_{Had}^{\otimes 4}|1111\rangle$ --, therefor.

In column 30, line 49, delete " $|1010\rangle|\xi\rangle_{field}^{1+}$ " and insert -- $|0100\rangle|\xi\rangle_{field}^{1+}$ --, therefor.

In column 30, line 56, delete "shift p" and insert -- shift φ --, therefor.

In column 32, line 4, delete "shift q)" and insert -- shift φ --, therefor.

UNITED STATES PATENT AND TRADEMARK OFFICE
CERTIFICATE OF CORRECTION

PATENT NO. : 7,426,444 B2
APPLICATION NO. : 11/407600
DATED : September 16, 2008
INVENTOR(S) : Raymond G. Beausoleil et al.

It is certified that error appears in the above-identified patent and that said Letters Patent is hereby corrected as shown below:

In column 32, line 67, delete " $(\hat{b}^\dagger \hat{b})$ " and insert -- $(\hat{b}^\dagger \hat{b})_j$ --, therefor.

In column 34, line 9, delete " $|\alpha e^{i2\theta}\rangle_a$ " and insert -- $|\alpha e^{-i2\theta}\rangle_a$ --, therefor.

In column 34, line 39, delete "shift (P" and insert -- shift φ --, therefor.

In column 35, line 23, delete "shift (value" and insert -- shift φ value --, therefor.

In column 37, line 27, delete " $|\Psi\rangle_{out} = \hat{U}^{(\pi/2)} \hat{U}_3^{(\pi/2)} \hat{U}_2^{(\pi/2)} \hat{U}_1^{(\pi/2)} |\Psi\rangle_{in}$ " and insert -- $|\Psi\rangle_{out} = \hat{U}_4^{(\pi/2)} \hat{U}_3^{(\pi/2)} \hat{U}_2^{(\pi/2)} \hat{U}_1^{(\pi/2)} |\Psi\rangle_{in}$ --, therefor.

In column 37, line 46, delete "10000)" and insert -- $|0000\rangle$ --, therefor.

In column 38, line 21, delete " $= \left(\frac{1}{4}|\Gamma\rangle_1 + \frac{\sqrt{6}}{4}|\Gamma\rangle_3 + \frac{1}{4}|\Gamma\rangle_5\right)|\zeta\rangle_{field}^{\pi/2-} + \left(\frac{1}{2}|\Gamma\rangle_2 + \frac{1}{2}|\Gamma\rangle_4\right)|\zeta\rangle_{field}^{\pi/2-}$ " and insert -- $= \left(\frac{1}{4}|\Gamma\rangle_1 + \frac{\sqrt{6}}{4}|\Gamma\rangle_3 + \frac{1}{4}|\Gamma\rangle_5\right)|\zeta\rangle_{field}^{\pi+} + \left(\frac{1}{2}|\Gamma\rangle_2 + \frac{1}{2}|\Gamma\rangle_4\right)|\zeta\rangle_{field}^{\pi-}$ --, therefor.

In column 38, line 32, delete " $|\theta\rangle_{field}^{\pi/2+}$ and $|\theta\rangle_{field}^{\pi/2-}$ " and insert -- $|\zeta\rangle_{field}^{\pi+}$ and $|\zeta\rangle_{field}^{\pi-}$ --, therefor.

In column 38, line 45, delete " and $|\zeta\rangle_{field}^+$ " and insert -- $|\zeta\rangle_{field}^+$ and $|\zeta\rangle_{field}^-$ --, therefor.

In column 38, lines 49-52, delete " $\hat{D}(-\alpha)|\zeta\rangle_{field}^{\pi/2+} \frac{1}{\sqrt{2}}(|4\theta\rangle + e^{i4\varphi}|-4\theta\rangle)$, and $\hat{D}(-\alpha)|\zeta\rangle_{field}^{\pi/2-} = \frac{1}{\sqrt{2}}(|4\theta\rangle - e^{i4\varphi}|-4\theta\rangle)$, " and insert -- $\hat{D}(-\alpha)|\zeta\rangle_{field}^{\pi+} = \frac{1}{\sqrt{2}}(|4\theta\rangle + e^{i4\varphi}|-4\theta\rangle)$, and $\hat{D}(-\alpha)|\zeta\rangle_{field}^{\pi-} = \frac{1}{\sqrt{2}}(|4\theta\rangle - e^{i4\varphi}|-4\theta\rangle)$, --, therefor.

UNITED STATES PATENT AND TRADEMARK OFFICE
CERTIFICATE OF CORRECTION

PATENT NO. : 7,426,444 B2
APPLICATION NO. : 11/407600
DATED : September 16, 2008
INVENTOR(S) : Raymond G. Beausoleil et al.

It is certified that error appears in the above-identified patent and that said Letters Patent is hereby corrected as shown below:

In column 39, line 33, delete "$P^{\kappa/2+}(n) = \left|\langle n|\hat{D}(-\alpha)|\zeta\rangle_{field}^{\kappa/2+}\right|^2$" and insert -- $P^{\kappa/2+}(n) = \left|\langle n|\hat{D}(-\alpha)|\zeta\rangle_{field}^{\kappa/2+}\right|^2$ --, therefor.

In column 40, line 17, delete "$|\Psi\rangle_{out} = \frac{1}{\sqrt{2}}(|0000\rangle|\alpha + i4\theta\rangle_a + e^{i4\varphi}|1111\rangle|\alpha - i4\theta\rangle_a)$" and insert -- $|\Psi\rangle_{out} = \frac{1}{\sqrt{2}}(|0000\rangle|\alpha + i4\theta\rangle_a + e^{i4\varphi}|1111\rangle|\alpha - i4\theta\rangle_a)$ --, therefor.

In column 40, line 29, delete "$|\alpha a+i4\theta\rangle$" and insert -- $|\alpha + i4\theta\rangle$ --, therefor.

In column 41, line 6, delete "$\hat{D}(-\alpha)|\zeta\rangle_{field}^{0+} = \frac{1}{\sqrt{2}}(|i4\theta\rangle + e^{i4\varphi}|-i4\theta\rangle),$" and insert -- $\hat{D}(-\alpha)|\zeta\rangle_{field}^{0-} = \frac{1}{\sqrt{2}}(|i4\theta\rangle - e^{i4\varphi}|-i4\theta\rangle),$ --, therefor.

In column 41, line 38, delete "$\hat{D}(-\alpha)|\zeta^{field0+}$" and insert -- $\hat{D}(-\alpha)|\zeta\rangle_{field}^{0+}$ --, therefor.

In column 42, line 35, delete "$|\alpha a e^{i3\theta}\rangle_a$" and insert -- $|\alpha e^{i3\theta}\rangle_a$ --, therefor.

In column 45, line 40, in Claim 6, delete "$\hat{a}^\dagger e^{i\gamma} + \hat{a} e^{-hu\,t\,\gamma}$" and insert -- $\hat{a}^\dagger e^{i\gamma} + \hat{a} e^{-i\gamma}$ --, therefor.

In column 45, line 48, in Claim 7, delete "$\chi$-Pauli" and insert -- $x$-Pauli --, therefor.

In column 45, line 49, in Claim 7, delete "$\gamma$-Pauli" and insert -- $y$-Pauli --, therefor.

In column 46, line 28, in Claim 15, delete "$\hat{H} = \hbar\chi \hat{a}^{554} \hat{a} \hat{b}^\dagger b$" and insert -- $\hat{H} = \hbar\chi \hat{a}^\dagger \hat{a} \hat{\sigma}_x$ --, therefor.

UNITED STATES PATENT AND TRADEMARK OFFICE
CERTIFICATE OF CORRECTION

PATENT NO. : 7,426,444 B2 Page 5 of 5
APPLICATION NO. : 11/407600
DATED : September 16, 2008
INVENTOR(S) : Raymond G. Beausoleil et al.

It is certified that error appears in the above-identified patent and that said Letters Patent is hereby corrected as shown below:

In column 46, line 30, in Claim 15, delete " $\hat{a}^{\dagger}\hat{a}$is " and insert -- $\bar{a}^{\dagger}\bar{a}$ is --, therefor.

In column 46, line 47, in Claim 17, delete " $\chi$-Pauli " and insert -- $x$-Pauli --, therefor.

In column 46, line 48, in Claim 17, delete " $\gamma$-Pauli " and insert -- $y$-Pauli --, therefor.

Signed and Sealed this

Fourteenth Day of July, 2009

JOHN DOLL
*Acting Director of the United States Patent and Trademark Office*